United States Patent

Ogata et al.

Patent Number: 5,980,849
Date of Patent: Nov. 9, 1999

[54] MESOPORE MATERIAL, LAMINAR SILICIC ACID, AND METHOD OF MANUFACTURING MESOPORE MATERIAL AND LAMINAR SILICIC ACID

[75] Inventors: Shin-ichi Ogata; Yoshiaki Fukushima, both of Aichi-ken; Shinji Inagaki, Nagoya, all of Japan

[73] Assignee: Kabushiki Kaisha Toyota Chuo Kenkyusho, Aichi-ken, Japan

[21] Appl. No.: 08/925,649

[22] Filed: Sep. 9, 1997

[30] Foreign Application Priority Data

Sep. 9, 1996 [JP] Japan .................................. 8-261471
Sep. 9, 1996 [JP] Japan .................................. 8-261472

[51] Int. Cl.$^6$ .......................... C01B 33/38; C01B 33/44
[52] U.S. Cl. ...................... 423/332; 423/328.2; 423/335; 502/81; 502/232
[58] Field of Search ...................... 423/700, 702, 423/705, 332, 328.1, 328.2, 335; 502/232, 81

[56] References Cited

U.S. PATENT DOCUMENTS

| | | | |
|---|---|---|---|
| 4,968,652 | 11/1990 | Johnson et al. | 423/328.2 |
| 5,382,558 | 1/1995 | Inagaki et al. | 502/11 |
| 5,508,081 | 4/1996 | Inagaki et al. | |
| 5,538,710 | 7/1996 | Guo et al. | 423/701 |
| 5,599,759 | 2/1997 | Inagaki et al. | 502/80 |
| 5,622,684 | 4/1997 | Pinnavaia et al. | 423/702 |
| 5,672,556 | 9/1997 | Pinnavaia et al. | 423/328.2 |
| 5,750,085 | 5/1998 | Yamada et al. | 423/328.2 |
| 5,786,294 | 7/1998 | Sachtler et al. | 502/349 |

FOREIGN PATENT DOCUMENTS

| | | |
|---|---|---|
| 62-36015 | 2/1987 | Japan . |
| 63-147818 | 6/1988 | Japan . |

OTHER PUBLICATIONS

Antonelli et al., "Synthesis of a Stable Hexagonally Packed Mesoporous Niobium Oxide Molecular Sieve Through a Novel Ligand–Assisted Templating Mechanism," Angew. Chem. Int. Ed. Engl., vol. 35 No. 4, pp. 426–430, 1996.

Antonelli et al., "Synthesis and Characterization of Hexagonally Packed Mesoporous Tantalum Oxide Molecular Sieves," Chem. Mater., vol. 8, pp. 874–881, 1996.

Beck et al., "A New Family of Mesoporous Molecular Sieves Prepared with Liquid Crystal Templates," J. Am. Chem. Soc., vol. 114, 10834–10843, 1992.

*Primary Examiner*—Mark L. Bell
*Assistant Examiner*—David Sample
*Attorney, Agent, or Firm*—Oblon, Spivak McClelland, Maier & Neustadt, P.C.

[57] ABSTRACT

Provided is a mesopore material and the manufacturing method thereof characterized by having uniform diameter of each pore as well as a high crystallographic regularity, comprising primary particles having a small axe with uniformity, allowing for synthesizing the primary particles with the size freely controlled, and allowing for simple manufacturing at a reduced cost. The mesopore material comprising: pores having a diameter in a range of 2 to 10 nm; and a primary particle having a major axe in a range of 10 nm to 1 $\mu$m. The diameter range is defined at a maximum peak in a pore distribution curve, and 75% or more of the pores is in a diameter range of –40% to +40% of the pore diameter at the maximum peak. Further provided is a laminar silicic acid composed of the uninvertible tetrahedral sheet and has a uniform shape and size. Also provided is a laminar silicic acid salt composed of the uninvertible tetrahedral sheet and has a uniform shape and size. The laminar silicic acid comprising a laminar silicon dioxide having a laminar six-membered ring skeleton and having a crystallographic regularity. A skeleton of a clay mineral having a 1:1 laminar structure or a 2:1 laminar structure consisting of an uninvertible tetrahedral sheet of a silicon dioxide and an octahedral sheet of an oxide of a metal remains in the laminar silicic acid. Acid acts on the clay mineral to form the laminar silicic acid.

17 Claims, 27 Drawing Sheets

FS-2

FV-7

○ Oxygen
⊕ Hydroxide ion
● Aluminum
●○ Silicon

MESOPORE MATERIAL, LAMINAR SILICIC ACID, AND METHOD OF MANUFACTURING MESOPORE MATERIAL AND LAMINAR SILICIC ACID

FIELD OF THE INVENTION

The present invention relates to a mesopore material which can be used as a carrier of catalyst, a material for adsorbing hydrocarbon and the like thereto, a carrier for fixing oxygen and the like thereto, and a place in which functional substances and the like are synthesized; and a method of manufacturing the mesopore material.

The present invention also relates to silicic acid manufactured from clay mineral; a method of manufacturing the silicic acid; and laminar silicate having a structure similar to that of the silicic acid.

DESCRIPTION OF RELATED ART

Those skilled in the art know the mesopore material having mesopores which can be used as the carrier of catalyst, the material for adsorbing hydrocarbon and the like thereto, the carrier for fixing oxygen and the like thereto, and a place in which the functional substances and the like are synthesized. The mesopore material is a substance composed of aggregated submicron order-primary particles each having much amount of mesopores.

As the material of the mesopore material, substances containing silicon are utilized. As the substances containing the silicon, various laminar silicates and various silicon-contained substances other than the laminar silicates are disclosed in Laid-Open Japanese Patent Publication No. 8-067578 and U.S. Pat. No. 5,382,558, which are herein incorporated by reference.

As the laminar silicate, the laminar silicic acids are kanemite, disodium silicate crystal, makatite, ilerite, magadiite,kenyaite are disclosed. As the silicon-contained substances other than the laminar silicates include powdered sodium silicate, tetraethyl orthosilicate, water-glass, glass, amorphous sodium silicate, silica, silica-alumina, mixture of silica and alumina, oxide of silica, silica-metal composite oxide.

As the material of the mesopore material, it is known that sheet-shaped laminar silicate is more favorable than any other kind of silicate for obtaining the mesopore material having uniform diameter particles and a high degree of crystallizability.

As the sheet-shaped laminar silicate, three kinds of laminar silicates, namely,kanemite, disodium silicate crystal, and makatite are materials suitable for manufacturing the mesopore material because they have a structure composed of a bendable tetrahedral sheet of silicon dioxide.

The mesopore material having uniform-diameter mesopores and a high degree of crystallizability has a superior property of "shape selectivity" such as "selective catalytic reaction" and "selective adsorbing/desorbing function". The "selective catalytic reaction" means that when the mesopore material is used as a carrier and a synthesizing place, only reaction molecules having diameters smaller than that of the mesopore are allowed to selectively react or only reaction product having diameters smaller than that of the mesopore are allowed to be formed.

Such a mesopore material allows only desired reactive molecules to react and only a desired product to be formed.

The "selective adsorption separation function" means that when a gas is adsorbed to the mesopore material, desorbed therefrom or fixed thereto, only a specified gas contained in a mixed gas is adsorbed thereto or desorbed therefrom according to the size of gas molecules relative to the diameter of the mesopore.

Because the mesopore material has mesopores having a specific diameter in a range of 2 nm–10 nm, it can display a superior performance of "shape selectivity" for molecules having diameters smaller than that of the mesopore. Thus, the mesopore material can be utilized as a catalyst carrier in a catalytic reaction and an adsorbing agent having adsorbing/desorbing function.

However, the mesopore material manufactured from the laminar silicate has the following problems.

That is, the size, namely, the diameter of a tetrahedral sheet of silicon dioxide constituting the above-described three kinds of laminar silicates is as great as 1 $\mu$m. Thus, the major axes of the primary particles of the mesopore material manufactured from the laminar silicate are as great as about 2 $\mu$m or more.

Further, it is difficult to widely utilize natural laminar silicate consisting of silicon dioxide sheets of a uniform size and obtain it.

Generally, kanemite synthesized from water-glass and disodium silicate crystal are used as the laminar silicate. Because the tetrahedral sheets of the silicon dioxide of the synthesized laminar silicate are not uniform in size, it is difficult to obtain the mesopore material having size-uniform primary particles. Thus, the major axes of the primary particles of the mesopore material obtained from the laminar silicate are in a wide range of 10 nm–5 $\mu$m (photographically observed by transparent type electron microscope.)

The synthesized tetrahedral sheets of the silicon dioxide of the synthesized laminar silicate are as large as 1 $\mu$m. As described above, the conventional mesopore material is composed of primary particles not uniform in size, and the ratio of the outer surface area of each particle to the inner surface area of each mesopore is not uniform. Further, the lengths of the mesopores are nonuniform. Therefore, it is difficult to use the conventional mesopore material stably as a catalyst carrier and an adsorbing agent.

Furthermore, the mesopore material obtained from the laminar silicate is apt to have primary particles having different sizes. Thus, the uniformity of the mesopores are liable to deteriorate and have a low degree of crystallizability.

It is conceivable to divide the primary particles of the laminar silicate into fine ones by hydrolyzing above-described three kinds of the laminar silicates in manufacturing the mesopore material therefrom. According to this operation, even though the diameter of the laminar silicate sheet is great, it seems that small primary particles having the same size can be obtained.

However, the pH of a dispersion liquid consisting of water and any one of the above-described three kinds of laminar silicates is 11 or more. Thus, in order to hydrolyze the laminar silicates, it is necessary to add alkali to the dispersion liquid and use a particular reaction device.

Therefore, it is difficult to manufacture the mesopore material from the above-described three kinds of the laminar silicates and it costs high to manufacture the mesopore material by using the above-described three kinds of the laminar silicates.

As apparent from the foregoing description, using the conventional laminar silicate, it is difficult to synthesize the mesopore material having mesopores uniform in diameter, a high degree of crystallizability, and small primary particles equal to each other in size.

A larger number of short mesopores are present per weight when the primary particles are small. That is, the mesopore material is utilized to carry catalyst or adsorb hydrocarbon or the like by forming a large number of entrances (mesopore) in the small primary particles and allowing molecules which have entered thereinto to go out therefrom promptly. On the other hand, a smaller number of long mesopores are present per weight when the primary particles are large. That is, the mesopore material is utilized to carry catalyst or adsorb hydrocarbon or the like by forming a small number of entrances (mesopores) and causing molecules which have entered thereinto to go out therefrom for a long time. Method of manufacturing mesopore material composed of primary particles having a size according to a purpose have not been disclosed.

As the laminar silicate having the six-membered ring skeleton consisting of the silicon dioxide, the followings are known: kanemite ($NaHSi_2O_5 \cdot 3H_2O$), makatite ($Na_2Si_4O_9 \cdot 5H_2O$), ilerite ($Na_2Si_8O_{17} \cdot xH_2O$), magadiite ($Na_2Si_4O_{29} \cdot xH_2O$), and kenyaite ($Na_2Si_{20}O_{41} \cdot xH_2O$).

As synthesized laminar silicates similar to the above, $\alpha$-/$\beta$-$Na_2Si_2O_5$, $Li_2Si_2O_5$, and $KHSi_2O_5$ are known.

It is easy to obtain the laminar silicic acid by contacting the above-described laminar silicates with acid. It is also easy to obtain laminar silicate by contacting the laminar silicic acid with an alkali metal compound. The laminar silicate is obtained by replacing protons of silanol connected with each other in the laminar silicic acid with positive ions of the alkali metal compound. The basic skeletons of the structures of both are almost the same.

Of the laminar silicic acid and that of the laminar silicate are known the crystalline structures of $\alpha$-/$\beta$-$Na_2Si_2O_5$, $KHi_2Si_2O_5$ and makatite. But the crystalline structure of other laminar silicic acids and laminar silicates have not been determined.

The properties of the above-described laminar silicic acids and laminar silicates are similar to each other. That is, as shown in FIG. 27, a large number of tetrahedrons of silicon dioxide are connected with one another planely in the form of six-membered ring, thus forming layers, and the apexes of the tetrahedral sheets of silicon dioxide are oriented to the same direction alternately.

Accordingly, the upper and lower surfaces of the layer have the same polarity.

It is known that the laminar silicate is contained as a constituent in clay mineral shown below. That is, as shown in FIGS. 28 and 29, the clay mineral is a substance having a 1:1 laminar structure or a 2:1 laminar structure consisting of a tetrahedral sheet of silicon dioxide and an octahedral sheet of oxide of a metal.

When the clay mineral reacts with acid, metal ions forming the octahedral sheet elute, and thus the laminar silicate composed of the tetrahedral sheet of silicon dioxide is obtained.

For example, a clay mineral composed mainly of montmorillonite is treated with acid. The octahedral sheet contained in the clay mineral is removed to some extent to manufacture active china clay. The active china clay has an increased surface area and is superior in adsorbing property and in carrying catalyst to the clay mineral from which active china clay is obtained.

In Laid-Open Japanese Patent Publication No. 62-36015, it is disclosed that magnesium silicic acid-contained clay mineral such as sepiolite is treated with a strong acid.

In this case, almost all of metal ions in the octahedral sheet of the clay mineral elute and thus amorphous silicic acid is obtained.

The skeleton of the magnesium silicate clay mineral remains in the amorphous silicic acid and the shape thereof is laminar or band-shaped.

According to a recent report (Chem. Mater., 1995, 7, 2241), antigorite which is a magnesium silicate clay mineral is treated with 3-5M sulfuric acid to obtain silicic acids. silicic acid thus obtained and containing five % by weight of MgO has a laminar structure similar to that of the antigorite and has a crystallographic regularity.

However, the silicic acid and the laminar silicate thus obtained are not known in detail in shape, property, application, and synthesizing method. Laminar silicic acid in which the polarity on the upper surface of the layer is different from that on the lower surface thereof has not been developed. That is, laminar silicic acid in which the apexes of the tetrahedron of silicon dioxide are oriented in the same direction has not been developed. Thus, the laminar silicic acid obtained from a clay can be utilized effectively in industry.

In the laminar silicic acid, the apexes of the tetrahedraon of silicon dioxide are oriented in one direction. Thus, the orientations of the polarities between adjacent layers are coincident with each other in the direction in which layers are laminated or an interlaminar space having a high polarity alternates with an interlaminar space having a low polarity. Thus, when the laminar silicic acid is used as a host for carrying a compound, a guest compound is carried by orienting the guest compound to a specific direction or alternate interlaminar spaces. In this respect, the laminar silicic acid can be utilized efficiently in industry.

In the conventional method of obtaining the laminar silicic acid from the clay minerals exemplified previously by treating it with acid, magnesium silicate such as sepiolite andantigorite are used as the clay minerals. The apexes of the tetrahedral sheet of the silicon dioxide contained in these clay minerals are not oriented in the same direction relative to the octahedral sheet.

In the above-described clay mineral, oxide of metal of the octahedral sheet is liable to contact acid. Thus, the clay mineral can be treated with the acid easily. But in the laminar silicic acid obtained from these clay minerals, the to apexes of the tetrahedral sheet of the silicon dioxide are not oriented in the same direction.

That is, though the obtained laminar silicic acid is composed of laminar silicon dioxide having a laminar six-membered ring skeleton of the silicon dioxide in the structure of the laminar silicic acid, three or more continuous tetrahedrons of the silicon dioxide on one crystallographic axis are inverse cyclically with the apexes thereof coincident with each other.

That is, in the laminar silicic acid, the polarity on the upper surface of the layer is equal to that on the lower surface thereof.

SUMMARY OF THE INVENTION

It is an object of the present invention to provide a mesopore material useful as a carrier of catalyst, adsorbing agent, and the like; laminar silicic acid which is a material of the mesopore material; and a method of manufacturing the mesopore material.

It is an object of the present invention (first aspect) to provide a mesopore material which comprises small primary particles uniform in size and has a high degree of crystallizability. The mesopores of the mesopore material are equal to each other in the diameters thereof. Furthermore, the sizes of the primary particles can be selected as desired. In addition, the mesopore material can be manufactured at a low cost. The present invention is also intended to provide a method manufacturing the mesopore material as the first aspect.

It is an object of the present invention (second aspect) to provide laminar silicic acid which comprises uninvertible tetrahedral sheets of silicon dioxide and is uniform in shape and size; a method of manufacturing the laminar silicic acid; and laminar silicate.

The first aspect of the present invention will be described below.

A mesopore material comprising: pores having a diameter in a range of 2 to 10 nm; and a primary particle having a major axe in a range of 10 nm to 1 $\mu$m, said diameter of the pores being defined at a maximum peak in a pore distribution curve, 75% or more of the pores being in a diameter range of −40% to +40% of the pore diameter at the maximum peak.

The mesopore material of the first aspect of the present invention comprises aggregated primary particles of submicron order having a large number of mesopores.

When the major axes of the primary particles are smaller than 10 nm, the diameters of the mesopores are in the range to of 2–10 nm. Therefore, a sufficient number of mesopores are incapable of being present in each primary particle. In this case, there is a possibility that such a mesopore material is not a porous material. When the major axes of the primary particles are greater than 1 $\mu$m, there is a big difference between the major axis of the smallest primary particle and the major axes of other primary particles, which causes the size of the primary particles to be irregular.

When the diameters of the mesopores are smaller than 2 nm, i.e., when the diameters thereof are too small, there is a possibility that such a mesopore material belongs to the region of a micropore material. When the diameters of the mesopores are greater than 10 nm, there is a big difference between the diameter of the smallest mesopore and those of other mesopores, which causes the diameters of the mesopores to be nonuniform and the crystallizability of the mesopore material to be low.

If 75% or more of all the mesopores have diameters not in a range of −40%−+40% of the mesopore diameter showing a maximum peak in the mesopore distribution curve, the uniformity of the mesopore and the crystallizability of the mesopore material may deteriorate.

The operation of the first aspect of the present invention is described below.

The diameters of the mesopores and the major axes of the primary particles thereof are in the specified range, and the diameters of more than 75% of the diameters of all the mesopores satisfy the above-described condition. Accordingly, the mesopore material of the first aspect of the present invention has primary particles small and uniform in size. Thus, unlike the conventional mesopore material, the ratio of the outer surface area of each particle to the inner surface area of each mesopore is great (see embodiment 10.)

Therefore, when catalyst carried by the mesopore material closes the mesopores, the great surface area of the mesopore material can be effectively utilized for a catalytic reaction and further, a large number of mesopores serving as a reaction place or an adsorbing place are present per area or weight of the mesopore material.

Further, because the size of the primary particles is small, the lengths of the mesopores are short. Thus, molecules which have penetrated into the mesopores are allowed to go outside readily.

Moreover, because the size of the primary particles is uniform, the ratio of the outer surface area of each particle to the inner surface area of each mesopore is almost constant. Thus, the ratio of a catalytic reaction and an adsorbing reaction which occur on the outer surface of each primary particle to a catalytic reaction and an adsorbing reaction which occur on the inner surface of each mesopore is allowed to be constant. Therefore, the catalytic reaction and the adsorbing reaction can be accomplished stably. In addition, because the size of the primary particles is uniform, it is possible to prevent the primary particles from aggregating. That is, the formation of secondary particles can be prevented.

Therefore, the mesopore material in the first aspect of the present invention is superior in its dispersibility in organic solvent (see embodiment 13) and the degree of association of the primary particles in the organic solvent is low. Thus, the mesopore material acts as a superior catalyst carrier and adsorbing agent in a liquid phase reaction as well as a vapor phase reaction. Thus, the mesopore material can be utilized effectively in industry.

The mesopore material in the first aspect of the present invention is uniform in the diameters of the mesopores thereof and has a high degree of crystallizability.

Therefore, the mesopore material in the first aspect of the present invention has a high degree of heat resistance and has a superior property of "shape selectivity" such as "selective catalytic reaction" and "selective adsorbing/desorbing function". Thus, the mesopore material can be utilized in the catalytic reaction and the adsorbing reaction at a high temperature. Further, because the diameters of the mesopores of the mesopore material are uniform, the mesopore material provides "shape selectivity".

As apparent from the foregoing description, in the first aspect of the present invention, there is provided the mesopore material which comprises small primary particles uniform in size and has a high degree of crystallizability. Further, the mesopores of the mesopore material are equal to each other in the diameters thereof.

This and other objects, features and advantages of the present invention will become apparent upon reading of the following detailed description and drawings.

DETAILED DESCRIPTION OF THE INVENTION

Figure 1:
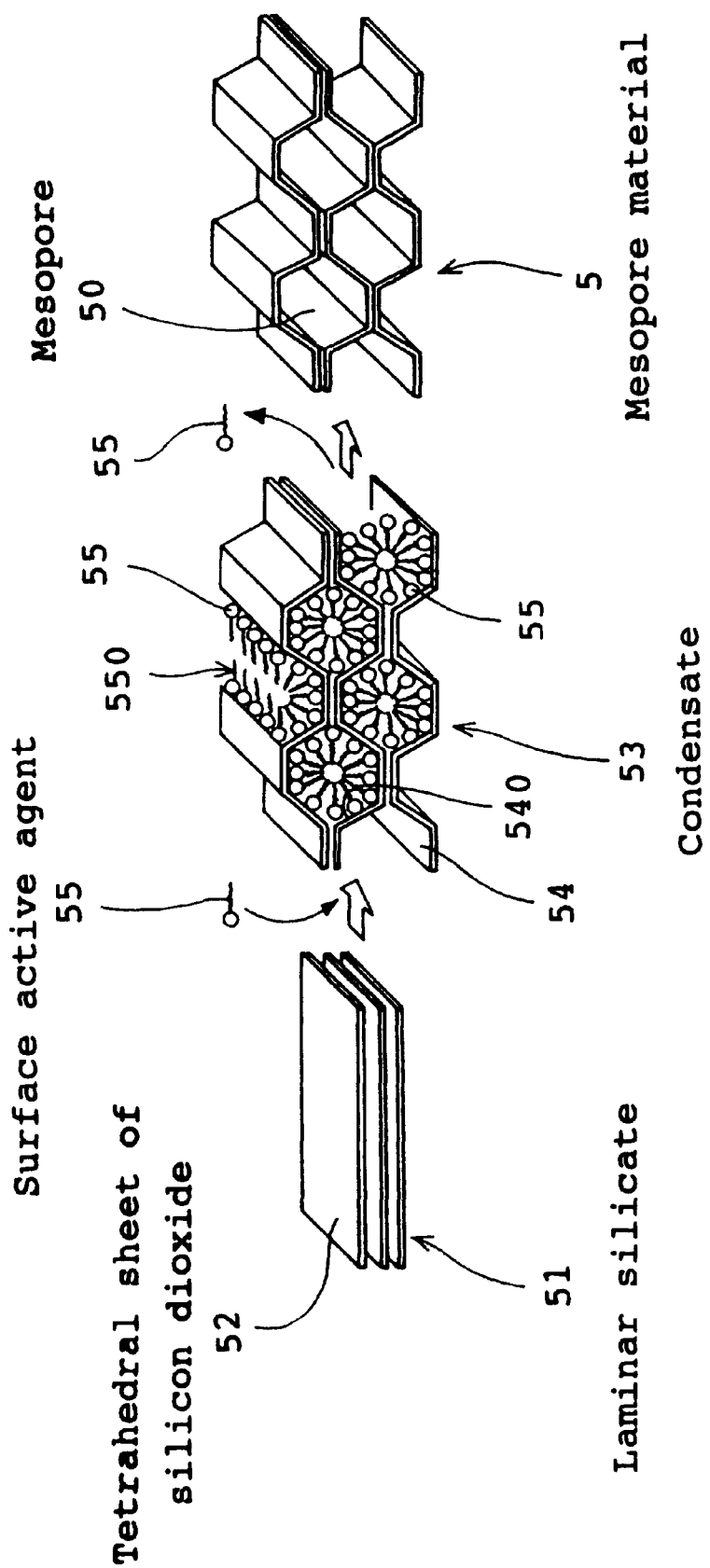
FIG. 1 is an explanatory view showing a process of forming a mesopore material through a condensate obtained from a laminar silicate.

The mesopore material according to the first aspect of the present invention can be manufactured by utilizing laminar silicic acid prepared from clay mineral, as will be described later. In this case, the mesopore material can be manufactured by accelerating the hydrolysis of the laminar silicic acid.

That is, the mesopore material of the first aspect of the present invention can be manufactured at a high concentration of an alkali metal compound relative to the laminar silicic acid, at a high reaction temperature, and in a long reaction time period.

According to a second embodiment of the invention, a mesopore material can be obtained comprising: pores having a diameter in a range of 2 to 10 nm; and a primary particle having a major axe in a range of 50 nm to 2 μm, said diameter range being defined at a maximum peak in a pore distribution curve, 60% or more of the pores being in a diameter range of −40% to +40% of the pore diameter at the maximum peak.

Similarly to the mesopore material described above, the mesopore material of this embodiment consists of small primary particles having the same size and a high degree of crystallizability. Further, the mesopores of the mesopore material are equal to each other in the diameters thereof. Thus, the mesopore material according to this embodiment has an operation and effect similar to that of the mesopore material described initially.

If the major axes of the primary particles are smaller than 50 nm, the diameters of the mesopores are in the range of 2–10 nm. Therefore a sufficient number of mesopores are incapable of being present in each primary particles. In this case, there is a possibility that such a mesopore material is not porous one. On the other hand, if the major axes of the primary particles are greater than 2 μm, there is a difference between the major axis of the smallest primary particle and other primary particles, which also leads to the formation of the mesopore material whose primary particles have different sizes. In other points, the mesopore material is similar to that described initially.

Utilizing the laminar silicic acid prepared from the clay mineral, the mesopore material of this embodiment can be manufactured as will be described later by preventing the laminar silicic acid from being hydrolyzed.

That is, the mesopore material of the second aspect of the present invention can be manufactured at a low concentration of the alkali metal compound relative to the laminar silicic acid, at a low reaction temperature, and in a short reaction time period.

A method of manufacturing a mesopore material comprises the steps of:

making an acid act on a clay mineral to form a laminar silicic acid;

making an alkali metal compound act on the laminar silicic acid to form a laminar silicate;

making a surface active agent act on the laminar silicate to form a condensate having three-dimensional structure composed of a silicate and containing the surface active agent therein; and removing the surface active agent from the condensate.

In this manufacturing method, the laminar silicic acid prepared from the clay mineral is used as the material of the mesopore material.

Figure 26A:
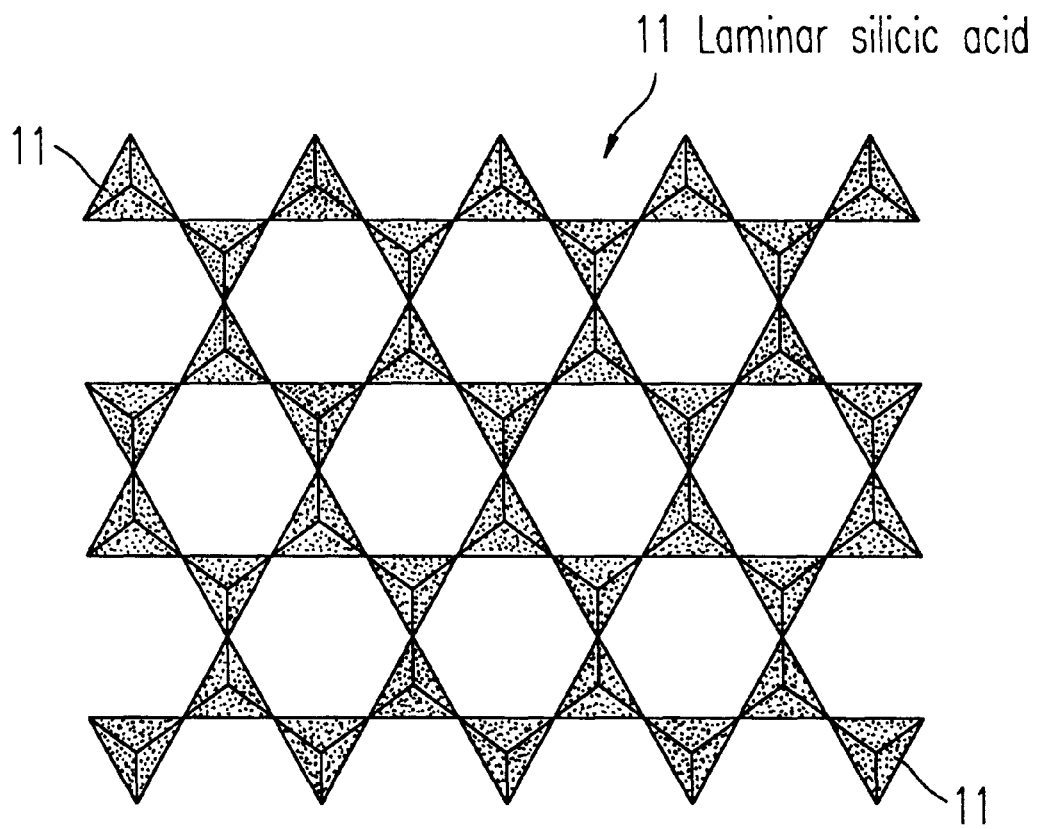
FIG. 26A is an explanatory plan view explaining the structure of an uninvertible laminar silicic acid in which apexes of a tetrahedron of silicon dioxide are oriented in one direction.
Figure 26B:
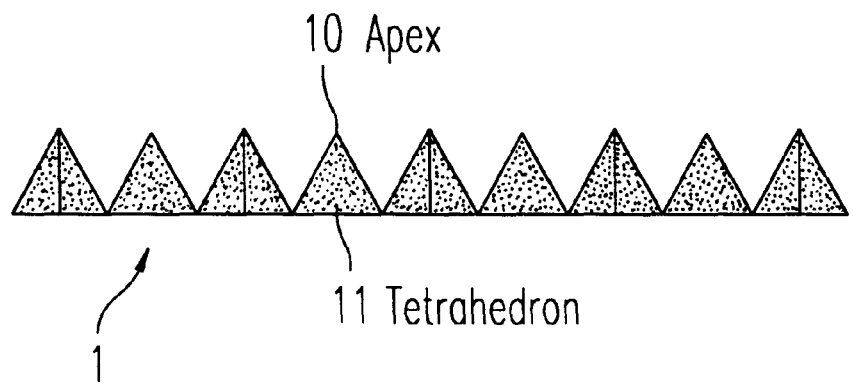
FIG. 26B is an explanatory side view explaining the structure of the laminar silicic acid.

As shown in FIG. 26, the laminar silicic acid is a substance consisting of a tetrahedral sheet of silicon dioxide and can be obtained by treating the clay mineral with acid. The skeleton of the tetrahedral sheet of the silicon dioxide present in the clay mineral remains in the laminar silicic acid.

The laminar silicic acid is processed into the laminar silicate by the action of the alkali metal compound, with the skeleton of the laminar silicic acid maintained. The laminar silicate is formed into the condensate by the action of the surface active agent. As shown in FIG. 1, the condensate comprises the laminar silicate and the surface active agent interposed between the adjacent tetrahedral sheets of the silicon dioxide of the laminar silicate, thus having the structure and size reflecting those of the laminar silicate.

In this manufacturing method, the mesopore material is manufactured as the end product from the condensate, as shown in FIG. 1.

There are many kinds of clay minerals present in various structures in nature. The laminar silicic acid of can be obtained by treating them having various structures with acid. Therefore, laminar silicic acids having various structures can be easily obtained from the clay minerals of different kinds.

According to this method, the mesopore material can be obtained, depending on the kind of the clay mineral which is the starting material thereof. Various mesopore materials comprising primary particles having desired sizes can be manufactured by selecting a desired kind of clay mineral.

In this manufacturing method, the alkali metal compound acts on the laminar silicic acid to form the laminar silicate.

Depending on the condition in manufacturing the laminar silicate, the hydrolysis of the laminar silicic acid is allowed to take place or prevented.

When the hydrolysis of the laminar silicic acid takes places, it is possible to obtain the mesopore material consisting of small primary particles having the same size and a high degree of crystallizability, as described in the first aspect of the invention. Further, the mesopores of the mesopore material are equal to each other in the diameters thereof.

On the other hand, when the hydrolysis of the laminar silicic acid is prevented, it is possible to obtain the mesopore material consisting of small primary particles having the same size and a high degree of crystallizability, as described in the second embodiment above. Further, the mesopores of the mesopore material are equal to each other in the diameters thereof.

The mesopore material according to the first aspect of the invention can be used as a catalyst carrier, an adsorbing agent, and the like. In addition, the mesopore material displays a high degree of catalytic activity in a liquid phase reaction because the primary particles of the mesopore material has a low degree of association with each other owing to the uniform diameters of the primary particles. Further a large number of mesopore are present per area or weight of the mesopore material, because the size of the primary particles is small. Accordingly even when catalyst carried by the mesopore material closes the mesopores, the mesopore material is capable of holding a great surface area.

The mesopore material according to the aforementioned second embodiment of the invention can be used as a catalyst carrier, an adsorbing agent, and the like. Although the length of the mesopore of the mesopore material according to the second aspect is greater than that of the mesopore material of first aspect, it is shorter than that of the mesopore of the conventional mesopore material synthesized from kanemite. Thus, the mesopore material according to the second aspect allows a catalyst reaction and hydrocarbon adsorption or the like to be made in an intermediate degree.

The detailed description of the manufacturing method will be made later. The operation of each process of the manufacturing method can be performed easily and by using conventional apparatuses. Accordingly, the manufacturing method can be carried out easily and does not require particular operations, which leads to the production of an inexpensive mesopore material.

As apparent from the foregoing description, the manufacturing method allows the size of the primary particle to be selected as desired and the mesopore material to be produced easily and inexpensively.

The method of manufacturing the mesopore material is described in detail below.

The laminar silicic acid obtained by treating the clay mineral with the acid is divided into the one having no crystallographic regularity and the one having crystallographic regularity. In the manufacturing method, both laminar silicic acids can be used.

The skeleton of the tetrahedral sheet of the silicon dioxide present in the clay mineral remains in the laminar silicic acid, and the laminar silicic acid has various configurations.

The specific clay mineral is not used in the present invention, but it is possible to use the clay mineral having a laminar structure composed of the tetrahedral sheet of the silicon dioxide and the octahedral sheet of oxide of metal in a ratio of 1:1 or 2:1. As such clay minerals, the following three kinds can be used.

As a first example, kaolinite, dickite, nacrite, halloysite each having the 1:1 laminar structure composed of the uninvertible tetrahedral sheet of the silicon dioxide and the octahedral sheet of oxide of aluminum; and chrysotile and lizardite each having the laminar structure composed of the uninvertible tetrahedral sheet of the silicon dioxide and the octahedral sheet of oxide of magnesium.

As a second example, pyrophyllite, muscovite, montmorillonite, beidelite, and di-octahedral-sheet-type vermiculite each having the 2:1 laminar structure composed of the uninvertible tetrahedral sheet of the silicon dioxide and the octahedral sheet of the oxide of aluminum; talc, phlogopite, saponite, hectorite, and Mg vermiculite each having the 2:1 laminar structure composed of the uninvertible tetrahedral sheet of the silicon dioxide and the octahedral sheet of the oxide of magnesium; tri-octahedral sheet type vermiculite and nontronite each having the 2:1 laminar structure composed of the uninvertible tetrahedral sheet of the silicon dioxide and the octahedral sheet of oxide of iron.

As a third example, sepiolite and palygorskite each having the 2:1 laminar structure composed of the invertible tetrahedral sheet of the silicon dioxide and the octahedral sheet of the oxide of magnesium; and antigorite having the 1:1 laminar structure composed of the invertible tetrahedral sheet of the silicon dioxide and the octahedral sheet of the oxide of magnesium.

The word "uninvertible" of the tetrahedral sheet of the silicon dioxide means that the apexes of the tetrahedrons of the tetrahedral sheet of the silicon dioxide are oriented to the same direction and that the polarity on the upper surface of the tetrahedral sheet of the silicon dioxide is different from that on the lower surface thereof. The word "invertible" means that the apexes of the tetrahedrons oriented to one direction alternate with those oriented to the other (opposite) direction and that the polarity distribution is uniform entirely on the surface of the tetrahedral sheet of the silicon dioxide.

As the acid which is used in treating the clay mineral, it is preferable to use acid whose solubility in water is so high as to allow aluminum salt and magnesium salt resulting from the reaction to be removed in a subsequent process.

Thus, it is possible to use a water solution of hydrochloric acid, sulfuric acid, nitric acid, phosphoric acid, and a water solution of a mixture thereof.

Although the concentration of the acid is not limited to a specific range, it is preferable to use one having 3N (normality) or more because it accelerates the reaction speed.

It is preferable to use a water solution containing at least two moles of acid relative to 100 g of the clay mineral in treating the clay mineral.

The clay mineral is treated with the acid at the atmospheric pressure or in a pressurized condition.

In treating the clay mineral with the acid at the atmospheric pressure, the water solution of the acid containing the clay mineral is heated and stirred in a reaction device provided with a cooling concentrator.

In treating the clay mineral with the acid in a pressurized condition, the water solution of the acid containing the clay mineral is heated and stirred. After the reaction terminates, the product formed as a result of the reaction is cleaned sufficiently with 1N hydrochloric acid and water and then freeze-dried to obtain the laminar silicic acid.

The process of obtaining the laminar silicate by acting the alkali metal compound on the laminar silicic acid prepared from the clay mineral is described below.

In this process, protons of silanol group of the laminar silicic acid is exchanged with positive ions of the alkali metal to form the laminar silicate.

In this process, the alkali hydrolysis of the tetrahedral sheet of the silicon dioxide occurs as the secondary reaction. Consequently, the laminar silicate is obtained in the form of small fragment or leaf. Such an alkali hydrolysis of the tetrahedral sheet of the silicon dioxide is not likely to take place when the alkali metal compound is acted on the laminar silicate.

It is preferable that a reaction-caused compound having protons and anions of the alkali metal compound used in the ion exchange process is sufficiently low in its acidity. More specifically, hydroxides, carbonate, hydrogen carbonate, and acetate of the alkali metal can be preferably used as the reaction-caused compound.

Because the degree of the secondary reaction can be controlled by selecting the condition of the reaction of the laminar silicic acid with the alkali metal compound, the size of the primary particle of the mesopore material can be selected by adjusting the degree of the secondary reaction.

The size of the primary particle of the obtained mesopore material depends on the kind of the laminar silicic acid.

In the reaction of the alkali metal compound with the laminar silicic acid, the laminar silicic acid in which the skeleton of the band-shaped clay mineral remains is used or the condition of the reaction of the alkali metal compound with the laminar silicic acid is limited to specific one. For example, the alkali metal compound having a high concentration is used, and both substances are allowed to react with each other at a high temperature and for a long time. In this manner, fragmentary or leaf laminar silicate small and uniform in size can be prepared.

In this manner, it is possible to allow the primary particles of the mesopore material to be small, the diameters of the mesopores thereof to be uniform, and the crystallizability of the primary particles to be high.

In order to manufacture the mesopore material of claim 1, it is preferable to react the laminar silicic acid with the alkali metal compound, as described below.

Initially, it is preferable that the hydrolysis of the skeleton of the silicon dioxide of the laminar silicic acid is accelerated to prepare small fragmentary laminar silicate.

It is preferable to set the concentration of the alkali metal compound to 1N or more; set the ratio of the alkali metal ion relative to silicon atoms to 0.3–3 mole/mole; set the reaction temperature to be higher than the room temperature and lower than 100° C.; and set the reaction time period to 30 minutes or more.

It is very favorable to use band-shaped laminar silicic acid having a width less than 200 nm. As such laminar silicic acids are exemplified laminar silicic acids obtained by treating the clay minerals such as sepiolite, chrysotile, and the like with acid.

In this manner, it is possible to allow the primary particles of the mesopore material to be small and uniform in size, the diameters of the mesopores thereof to be uniform, and the crystallizability of the primary particles to be high, as in the first aspect of the invention.

In order to manufacture the mesopore material according to the second aspect of the invention, it is preferable to react the laminar silicic acid with the alkali metal compound, as described below.

Initially, it is preferable that the hydrolysis of the skeleton of the silicon dioxide of the laminar silicic acid is restricted.

It is preferable to set the concentration of the alkali metal compound to not more than 1N; set the ratio of the alkali metal ion relative to silicon atoms to 0.1–1.2 mole/mole; set the reaction temperature to be lower than the room temperature; and set the reaction time period to not more than 30 minutes.

It is particularly favorable to use the laminar silicic acid having a width 3 μm or more. As such laminar silicic acids are exemplified laminar silicic acids obtained by treating the clay minerals such as vermiculite, kaolinite, and the like with acid.

In this manner, it is possible to allow the primary particles of the mesopore material to be small and uniform in size, as described in the second aspect of the invention.

The process of acting the surface active agent on the laminar silicate to form the condensate and removing the surface active agent from the condensate is described below.

Initially, a water solution in which the surface active agent has been dissolved is added to a water dispersion liquid of the laminar silicate at 50° C. or more to form the condensate of the laminar silicate and the surface active agent.

It is preferable to set the concentration of the water solution containing the surface active agent to 0.01–1M (mole/liter). It is also preferable to mix 8–200 g of the laminar silicate with 1000 milliliters of the 0.02M surface active agent-contained water solution.

It is preferable to heat the water solution (dispersion liquid) containing the laminar silicate and the surface active agent because the introduction of the surface active agent into the laminar silicate is accelerated. Preferably, the water solution (dispersion liquid) is heated at 40–100° C.

As the surface active agent, the following substances having ammonium group at their ends can be used: alkyl trimethyl ammonium, dimethyl dialkyl ammonium, alkyl ammonium, benzyl trimethyl ammonium. In addition, at least one of compounds having at their terminals sulfonic group ($SO_3H$), carboxyl group (—$CO_2H$), and phosphoric group (—O—$PO_3H$) can be used.

It is preferable to set the pH of the water solution (dispersion liquid) to less than 10 and set the heating temperature to 50° C. or more. In this manner, as shown in FIG. 1, dehydration and condensation occur in silanol groups present on the surfaces of the adjacent layers of the laminar silicate, thus connecting the layers with each other partly.

As a result, the laminar silicate is formed into a three-dimensional honeycomb-shaped structure consisting of silicate. That is, a condensate containing the surface active agent in the pores of the honeycomb-shaped structure is formed, as will be described later with reference to FIG. 1.

It is more favorable to set the pH of the dispersion liquid containing the laminar silicate and the surface active agent to a range of 6–8.5. The temperature of the dispersion liquid is set to 50° C. or more to accelerate the dehydration and condensation of the silanol group.

It is preferable to continue maturing of the contents contained in the dispersion liquid until an adjusted pH becomes stabilized. It is preferable to keep maturing of the contents contained in the dispersion liquid for more than two hours when the heating temperature is kept at a temperature 50° C. or more.

As will be described later with reference to FIG. 1, the surface active agent is removed from the condensate. consequently, the three-dimensional honeycomb-shaped structure is formed as the mesopore material of the present invention, and the pores from which the surface active agent has been removed are formed as the mesopores.

The surface active agent is removed from the condensate by calcination method or ion exchange method.

In the calcination method, the surface active agent contained in the condensate is decomposed at a temperature in a range of 500–1000° C.

In the ion exchange method, the surface active agent contained in the condensate is exchanged with hydrogen ions. The hydrogen ions remain in pores (mesopores) formed as a result of the removal of the surface active agent from the condensate. It is to be noted that the radius of a hydrogen ion is smaller than 0.1 nm which is much smaller than the radius of each pore. Thus, it does not occur that the hydrogen ions seal the pores.

It is possible to mix a dispersion liquid containing the laminar silicate with a water solution containing the surface active agent to form the condensate of the laminar silicate and the surface active agent and then remove a water-soluble no) component from the water solution (dispersion liquid). This process allows the removal of a part of the water-soluble component which has eluted as laminar silicic acid ions from the laminar silicate. The pH of the water-soluble component is about seven and precipitates in the form of amorphous silica gel.

In the process of removing the water-soluble component, after the condensate of the laminar silicate and the surface active agent is formed, a solid content is separated from the water solution (dispersion liquid). More specifically, the separated solid content is dispersed in distilled water again to form a dispersion liquid. Then, the condensate is formed by adjusting the pH of the dispersion liquid to less than 10 and the temperature to 50° C. or more. Thereafter, the solid content is separated from the water solution (dispersion liquid) by filtration or centrifugation.

The water-soluble component-removing process allows the crystallizability of the mesopore material to be high.

The second aspect of the present invention will be described below.

A laminar silicic acid with a crystallographic regularity comprises a laminar silicon dioxide. The laminar silicon dioxide has a skeleton of a clay mineral having a 1:1 laminar structure or a 2:1 laminar structure consisting of an uninvertible tetrahedral sheet of a silicon dioxide and an octahedral sheet of an oxide of a metal and has a laminar six-membered ring skeleton.

Figure 28A:
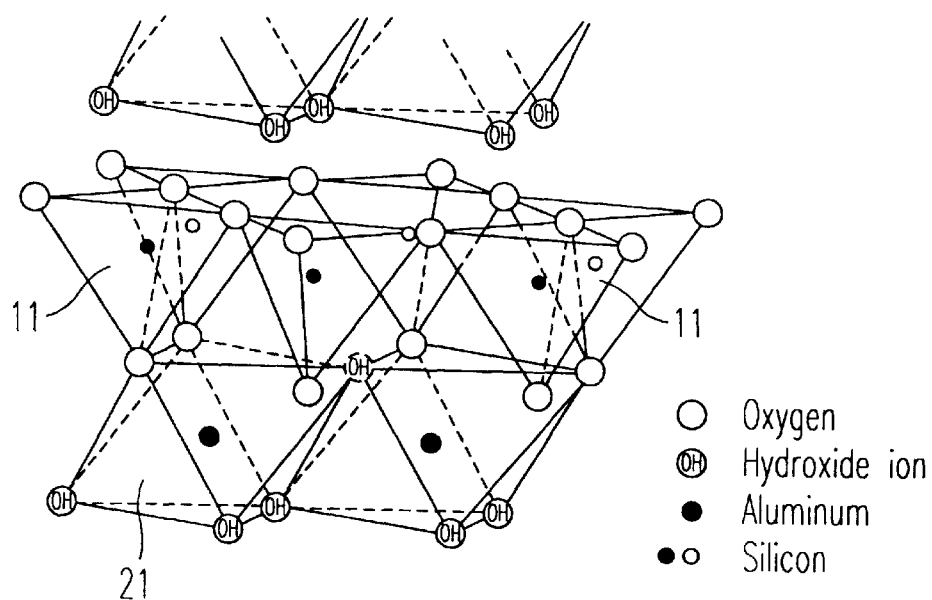
FIG. 28A is a view explaining the crystalline structure of a clay mineral (kaolinite) having a 1:1 laminar structure composed of an uninvertible tetrahedral sheet of silicon dioxide and an octahedral sheet of oxide of oxide (aluminum)
Figure 28B:
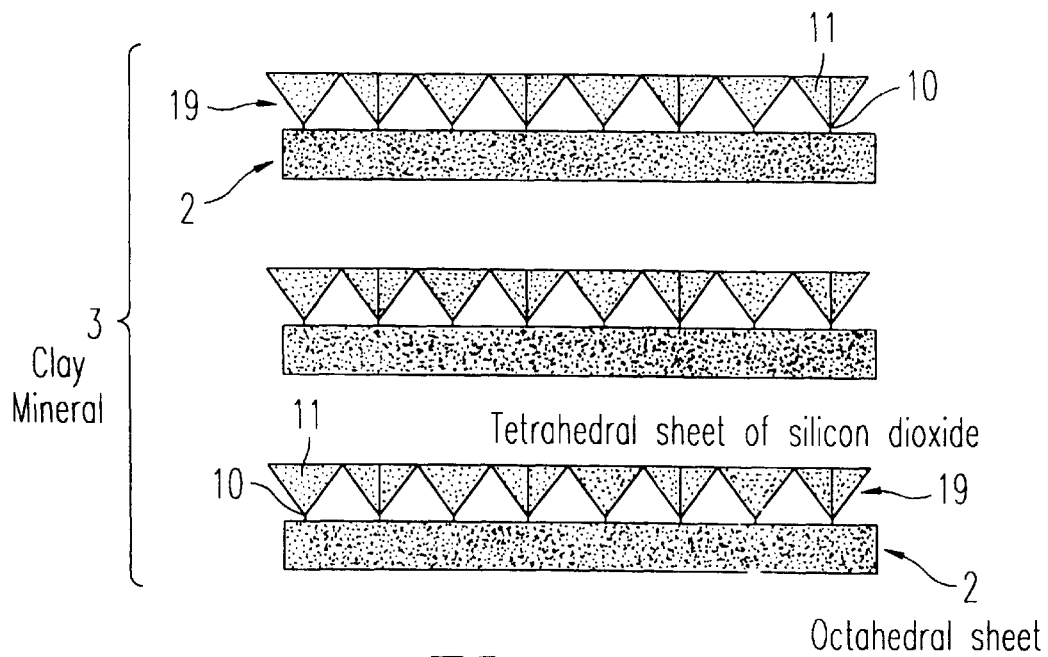
FIG. 28B is an explanatory view explaining the laminar structure of the clay mineral as viewed in layers-laminated direction.
Figure 29A:
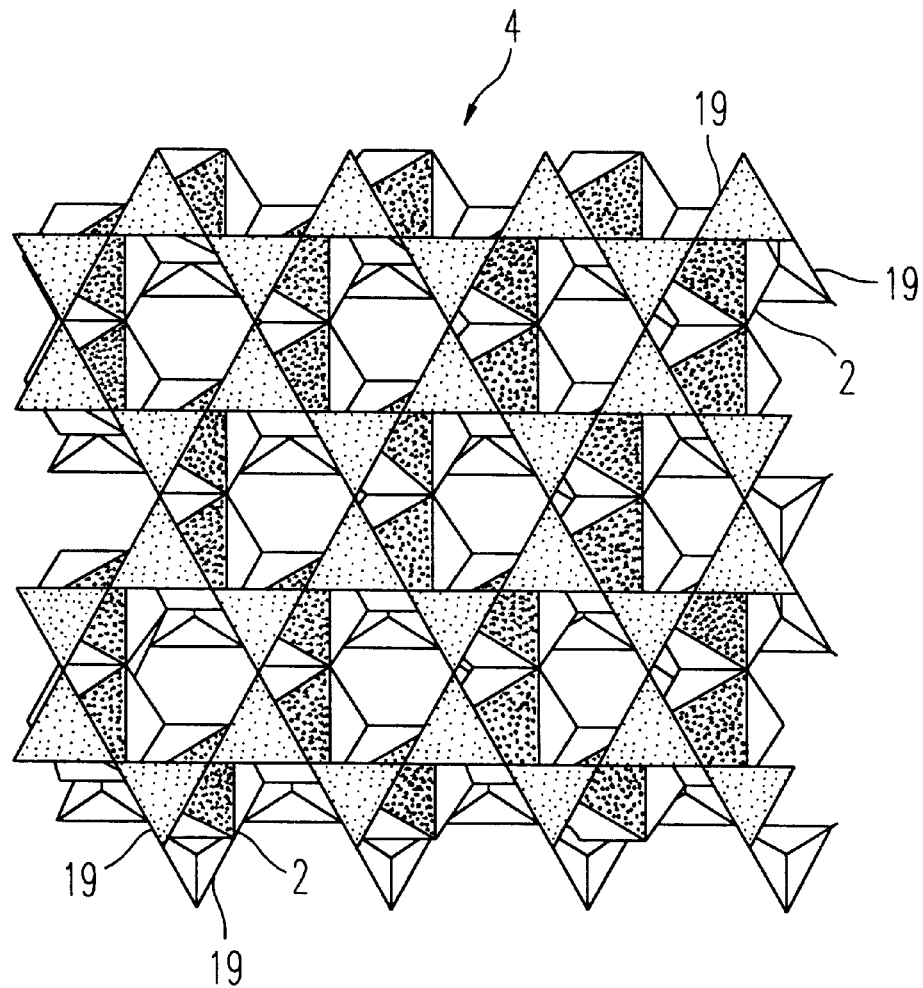
FIG. 29A is an explanatory plan view explaining the structure of a clay mineral (hectorite) having a 2:1 laminar structure composed of an uninvertible tetrahedral sheet of silicon dioxide and an octahedral sheet of oxide of metal (magnesium)
Figure 29B:
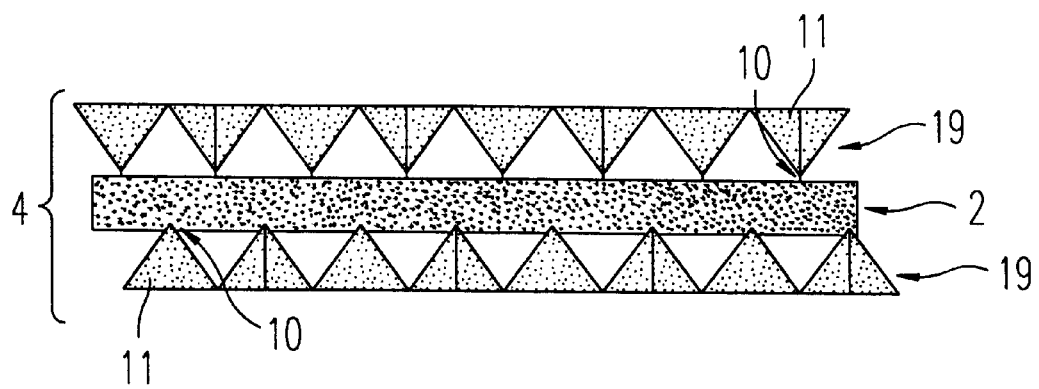
FIG. 29B is an explanatory view explaining the laminar structure of the clay mineral as viewed in layers-laminated direction.

As shown in FIGS. 28 and 29, the clay mineral consists of the uninvertible tetrahedral sheet of the silicon dioxide and a octahedral sheet of the oxide of a metal.

As shown in FIGS. 28 and 29, the tetrahedral sheet of the silicon dioxide consists of tetrahedrons each having oxygen positioned at apexes thereof and silicon located at the center thereof. A large number of tetrahedrons is planely connected with one another, thus forming a six-membered ring skeleton and a sheet-shaped skeleton.

The word "uninvertible" of the tetrahedral sheet of the silicon dioxide means that the apexes of the tetrahedrons of the tetrahedral sheet of the silicon dioxide are oriented to the same direction and thus the polarity on the upper surface of the tetrahedral sheet of the silicon dioxide is different from that on the lower surface thereof.

As shown in FIG. 28A, the octahedral sheet of the oxide of a metal is formed of a large number of octahedrons connected planely with each other. Each of the octahedron is composed of oxygen and hydroxide ions both positioned at the apexes thereof and metal elements positioned in the center thereof.

As shown in FIG. 28, the clay mineral having the 1:1 laminar structure means a structure having a large number of laminated pairs of one tetrahedral sheet and one octahedral sheet.

As shown in FIG. 29, the clay mineral having the 2:1 laminar structure means a structure having a large number of laminated groups each consisting of two tetrahedral sheets arranged on the upper and lower surfaces of one octahedral sheet.

As metallic elements constituting the octahedron, aluminum (1:1 laminar structure and 2:1 laminar structure), iron (2:1 laminar structure), magnesium (1:1 laminar structure and 2:1 laminar structure), nickel (2:1 laminar structure), manganese (2:1 laminar structure), and chromium (2:1 laminar structure) are exemplified.

Clay minerals are exemplified as follows:

As clay minerals having the 1:1 laminar structure, kaolinite, dickite, nacrite, halloysite each having the 1:1 laminar structure composed of the uninvertible tetrahedral sheet of the silicon dioxide and the octahedral sheet of the oxide of aluminum; and chrysotile and lizardite each having the laminar structure composed of the uninvertible tetrahedral sheet of the silicon dioxide and the octahedral sheet of the oxide of magnesium.

As clay minerals having the 2:1 laminar structure, pyrophyllite, muscovite, montmorillonite, beidelite, and dioctahedral-sheet-type vermiculite each having the 2:1 laminar structure composed of the uninvertible tetrahedral sheet of the silicon dioxide and the octahedral sheet of the oxide of aluminum; talc, phlogopite, saponite, hectorite, and Mg vermiculite each having the 2:1 laminar structure composed of the uninvertible tetrahedral sheet of the silicon dioxide and the octahedral sheet of the oxide of magnesium; trioctahedral sheet type vermiculite and nontronite each having the 2:1 laminar structure composed of the uninvertible tetrahedral sheet of the silicon dioxide and the octahedral sheet of the oxide of iron.

The advantage of the second aspect of the present invention will be described below.

The skeleton of the clay mineral having the structure as shown in FIGS. 28 and 29 is maintained in the laminar silicic acid of the present invention.

That is, as shown in FIG. 26, the laminar silicic acid consists of the laminar silicon dioxide having a laminar six-membered ring skeleton formed of the silicon dioxide. The skeleton of the silicon dioxide composing the laminar silicon dioxide has the skeleton of the silicon dioxide present in the clay mineral.

As shown in FIGS. 28 and 29, the clay mineral consists of the tetrahedral sheet of silicon dioxide and the octahedral sheet of the oxide of metal. The apexes of the tetrahedron of the silicon dioxide constituting the tetrahedral sheet of silicon dioxide are all oriented to the octahedral sheet.

Accordingly, as shown in FIG. 26, the apexes of the tetrahedron of the silicon dioxide constituting the laminar silicic acid of the present invention in which the six-membered ring skeleton has remained are oriented to the same direction.

As apparent from the foregoing description, the polarity of the laminar silicic acid on the upper surface of the layer thereof is different from that on the lower surface of the layer.

In the laminar silicic acid in which the skeleton of the clay mineral having the 2:1 laminar structure, between one layer and the other layer adjacent to each other, the apex of one silicon dioxide tetrahedron confront the bottom surface of the other silicon dioxide tetrahedron, as shown in FIG. 28B. Thus, hydrogen connection is formed between the two layers, thus stabilizing the entire structure.

In the laminar silicic acid in which the skeleton of the clay mineral having the 1:1 laminar structure, between one layer and the other layer adjacent to each other, an interlaminar space in which an apex of one silicon dioxide tetrahedron confront an apex of the other silicon dioxide tetrahedron alternates with an interlaminar space in which the bottom surface of one silicon dioxide tetrahedron confront the bottom surface of the other silicon dioxide tetrahedron. That is, the interlaminar spaces each having a high polarity alternates with the interlaminar spaces each having a low polarity. In the interlaminar spaces having the high polarity, the apexes of the confronting silicon dioxide tetrahedrons may be connected partially with each other. In this case, the entire structure is stabilized. Therefore, the laminar silicic acid seems to have only the interlaminar spaces having a low polarity.

Because the polarity on the upper surface of the layer of the laminar silicic acid is different from that on the lower surface of the layer thereof, unlike the conventional laminar silicic acid, the laminar silicic acid is capable of packing a guest compound by orienting it in a specific direction and in a specific interlaminar space thereof. For example, the laminar silicic acid can be used as a carrier which can be selectively used for catalyst, pigment, medicine, and the like depending on the size and orientation thereof and as adsorbing agent which can be selectively used for hydrocarbon and the like.

Further, because the laminar silicic acid is prepared from natural clay minerals composed of the laminar silicon dioxide uniform in size and configuration and has the skeleton thereof, the laminar silicic acids are uniform in the size and configuration thereof.

Therefore, the laminar silicic acid can act as a stable catalyst carrier and a clathrate compound (adsorbing agent).

As apparent from the foregoing description, the laminar silicic acid is novel.

It can be confirmed by utilizing an observation by a transparent type electron microscope and an X-ray diffraction measurement that the laminar silicic acid of the second aspect of the present invention maintains the skeleton of the silicon dioxide contained in the clay mineral, is laminar, and has a crystallographic regularity.

The present invention provides the laminar silicic acid consisting of the uninvertible tetrahedral sheet of silicon dioxide and uniform in the configuration and size thereof.

It is preferable that the laminar silicic acid contains an impurity in the form of metal atoms of 1–7 atom % relative to silicon atoms and has a specific surface area of 700–50 $m^2/g$ when it is determined by BET method in which nitrogen adsorption is used.

Thus, the laminar silicic acid contains the silicon dioxide at a high percentage and has a space between adjacent layers. Accordingly, the laminar silicic acid has an effect that it acts as a heat-resistant catalyst carrier and an adsorbing agent.

The laminar silicic acid in which the silicic acid is of a rectangular or a polygonal sheet having a diameter in a range of 10 nm to 50 mm, and 50% or more of the laminar silicic acid has a diameter of a sheet in a range of −40% to +40% of a sheet diameter at a maximum distribution.

The size of the sheet-shaped laminar silicic acid is variable and uniform in its configuration.

If the diameter of the sheet is smaller than 10 nm, it may be difficult that the laminar silicic acids are laminated one upon another. If the diameter of the sheet is greater than 50 mm, there is a possibility that it is difficult to obtain natural clay mineral.

Further, if the diameters of less than 50% of all the sheets of the laminar silicic acid are included in the range of −40%–+40% of a mesopore diameter showing a maximum distribution, the diameter of the laminar silicic acid sheet may be nonuniform.

A method of manufacturing a laminar silicic acid with a crystallographic regularity comprises a laminar silicon dioxide is provided. The laminar silicon dioxide has a clay mineral structure of a 1:1 laminate or a 2:1 laminate of an univertible tetrahedral sheet of a silicon dioxide and an octahedral sheet of an oxide of a metal and has a laminar six-membered ring structure, which comprises the step of making an acid act on the clay mineral.

It is possible to obtain the laminar silicic acid consisting of the uninvertible tetrahedral sheet of silicon dioxide and having uniform shape and size. Further, it is possible to form the clay mineral into the laminar silicic acid which can be utilized in industry effectively, by only acting acid on the clay mineral.

As the clay mineral, those similar to the above-described ones can be used.

The method of manufacturing the laminar silicic acid will be described in detail below.

Generally, as the condition in which acid acts on the clay mineral, the use of acid having a low concentration, a short reaction time period, and pressurized condition is considered appropriate. But the reaction condition depends on the kind of the clay mineral.

For example, in treating the clay mineral having the 1:1 laminar structure composed of the uninvertible tetrahedral sheet of silicon dioxide and the octahedral sheet of the oxide of aluminum with acid, it is preferable to use the concentration of 12N acid, set the reaction time period to 19 hours under a pressurized condition so as to obtain the laminar silicic acid having crystallographic regularity. But in treating the clay mineral having the 1:1 laminar structure composed of the uninvertible tetrahedral sheet of silicon dioxide and the octahedral sheet of the oxide of magnesium with acid, it is preferable to use 3N acid, set the reaction time period to 4 hours, and at the atmospheric pressure so as to obtain the laminar silicic acid having the crystallographic regularity.

As the acid which is used in treating the clay mineral, it is preferable to use one which has such a high solubility A in water as to allow aluminum salt and magnesium salt resulting from the reaction to be removed in a subsequent process. Thus, it is possible to use a water solution of hydrochloric acid sulfuric acid, nitric acid, phosphoric acid, and a water solution of a mixture thereof.

Preferably, the concentration of the acid is set to 3N–12N.

There is a possibility that the oxide of aluminum elutes insufficiently when the clay mineral is treated with acid whose concentration is lower than 3N. It is dangerous to handle acid having a concentration higher than 12N.

It is preferable to use a water solution containing at least two moles of acid relative to 100 g of the clay mineral in treating the clay mineral. If the amount of the acid is less than two moles, metal oxide constituting the octahedral sheet of silicon dioxide of the clay mineral may not elute sufficiently.

It is preferable to set the reaction time period to 4–20 hours in the above-described treatment of the clay mineral with the acid. If the reaction time period is less than four hours, the oxide of metal constituting the octahedral sheet of the clay mineral may not elute sufficiently. When 20 hours have passed, the reaction of the acid with the clay mineral reaches equilibrium fully. Thus, it is unnecessary to react the acid with the clay mineral for more than 20 hours.

The reaction temperature which is set in treating the clay mineral with the acid is not limited to a specific one, but preferably set to 70–150° C.

As the method of treating the clay mineral with the acid under a pressurized condition, it is preferable to heat and stir the acid-contained water solution in which the clay mineral is immersed, by using an autoclave as a pressuring/reaction apparatus.

As the method of treating the clay mineral with the acid at the atmospheric pressure, it is preferable to heat and stir the acid-contained water solution in which the clay mineral is immersed, by using a reaction apparatus provided with a cooling condenser.

In treating the clay mineral with the acid at the atmospheric pressure, it is preferable to use 3–6N acid and set the reaction temperature to 80–100° C. and the reaction time period to 4–12 hours.

It is possible to select the shape and size of the laminar silicic acid by selecting the clay mineral.

That is, many kinds of clay minerals can be utilized as the material of the laminar silicic acid. The laminar silicic acid having different sizes and shapes can be obtained by selecting the kind of the clay mineral.

It is possible to obtain the laminar silicic acids having different polar distributions by using the clay mineral having the 1:1 laminar structure or the 2:1 laminar structure. That is, in the laminar silicic acid obtained from the clay mineral having the 1:1 laminar structure, the polarity on the upper surface of the layer thereof is inverse to that of the lower surface of the layer (see FIG. 26). That is, the orientation of the polarity between the adjacent layers is coincident with each other in the direction in which the laminar silicic acids are laminated one upon another. In the laminar silicic acid obtained from the clay mineral having the 2:1 laminar structure, the polarity on the upper surface of the layer thereof is inverse to that of the lower surface of the layer (see FIG. 26), but the interlaminar spaces each having a high polarity alternates with the interlaminar spaces each having a low polarity. In this case, the apexes of the confronting silicon dioxide tetrahedrons are connected partially with each other. Therefore, the laminar silicic acid seems to have only the interlaminar spaces having a low polarity.

A laminar silicic acid without a crystallographic regularity comprising a laminar silicon dioxide is provided. The laminar silicon dioxide has a skeleton of a clay mineral having a 1:1 laminar structure or a 2:1 laminar structure consisting of an uninvertible tetrahedral sheet of a silicon dioxide and an octahedral sheet of an oxide of a metal and has a laminar six-membered ring skeleton.

The laminar silicic acid according to this embodiment is similar to that described previously except that it does not have the crystallographic regularity, i.e., it is amorphous.

Because the laminar silicic acid is amorphous, the intervals between adjacent layers are not uniform. Thus, the layers can be easily separated from each other. By utilizing the structure of the laminar silicic acid of this embodiment, it can be mixed with other compounds uniformly to form a composite compound.

The laminar silicic acid is provided in which the silicic acid is of a rectangular or a polygonal sheet having a diameter in a range of 10 nm to 50 mm, and 50% or more of the laminar silicic acid has a diameter of a sheet in a range of −40% to +40% of a sheet diameter at a maximum distribution.

It is possible to provide the laminar silicic acid having various sizes and a uniform configuration. The other points of the laminar silicic acid according to this embodiment are similar to those of the laminar silicic acid described above.

A method of manufacturing a laminar silicic acid without a crystallographic regularity comprising a laminar silicon dioxide is provided. The laminar silicon dioxide has a skeleton of a clay mineral having a 1:1 laminar structure or a 2:1 laminar structure consisting of an uninvertible tetrahedral sheet of a silicon dioxide and an octahedral sheet of an oxide of a metal and has a laminar six-membered ring skeleton, which comprises the step of making an acid act on a clay mineral.

The method of manufacturing the laminar silicic acid according to this embodiment is similar to that described above except that the laminar silicic acid does not have the crystallographic regularity, i.e., it is amorphous. The laminar silicic acid is composed of the uninvertible tetrahedral sheet of silicon dioxide. It is possible to obtain the laminar silicic acid consisting of the uninvertible tetrahedral sheet of silicon dioxide and having uniform shape and size. Further, it is possible to form the clay mineral into the laminar silicic acid which can be utilized in industry effectively, by only acting acid on the clay mineral.

The method of manufacturing the laminar silicic acid will be described in detail below.

Contrary to the condition described above, the use of acid having a high concentration, a long reaction time period, and pressurized condition are considered appropriate. But the reaction condition depends on the kind of the clay mineral, and amorphous laminar silicic acid can be obtained even though acid having a low concentration is used and the reaction time period is short at the atmospheric pressure.

For example, in treating the clay mineral having the 1:1 laminar structure composed of the uninvertible tetrahedral sheet of silicon dioxide and the octahedral sheet of the oxide of aluminum with acid, the laminar silicic acid having crystallographic regularity cannot be eliminated when acid having a concentration of 12N is used, the reaction time period is set to 19 hours under a pressurized condition. But in treating it with 3N acid in a condition in which the reaction time period is set to 4 hours at the atmospheric pressure, the laminar silicic acid not having crystallographic regularity was obtained at the atmospheric pressure.

The reaction condition in treating various kinds of clay minerals with acid could not be specified by the amount of metallic ions constituting the octahedral sheet which remains in the obtained laminar silicic acid.

As the acid which is used in treating the clay mineral, it is preferable to use one which has such a high solubility in water as to allow aluminum salt and magnesium salt resulting from the reaction to be removed in a subsequent process. Thus, it is possible to use a water solution of hydrochloric acid, sulfuric acid, nitric acid, phosphoric acid, and a water solution of a mixture thereof.

Preferably, the concentration of the acid is set to 3N–12N.

There is a possibility that the oxide of aluminum elutes insufficiently when the clay mineral is treated with acid whose concentration is lower than 3N. I t is dangerous to handle acid having a concentration higher than 12N.

When 8–12N acid is used, the reaction speed is fast, which is preferable. It:is preferable to use a water solution containing at least two moles of acid relative to 100 g of the clay mineral in treating the clay mineral therewith. If the amount of the acid is less than two moles, metal oxide constituting the octahedral sheet of the clay mineral may not elute sufficiently.

It is preferable to set the reaction time period to 8–20 hours i n treating the clay mineral with the acid. If the reaction time period is less than eight hours, oxides of metal constituting the octahedral sheet of the clay mineral, those other than the oxide of magnesium, namely, the oxide of aluminum and oxide of iron do not elute sufficiently. Thus, the amount of metallic atoms of metal oxide remaining in the laminar silicic acid may not be reduced to less than 3 atom %. When 20 hours have passed, the reaction of the acid with the clay mineral reaches equilibrium fully. Thus, it is unnecessary to react the acid with the clay mineral for more than 20 hours.

Preferably, the reaction temperature which is set in treating the clay mineral with the acid is 90° C. or more.

As the method of treating the clay mineral with the acid at the atmospheric pressure, it is preferable to heat and stir the acid-contained water solution in which the clay mineral is immersed, by using a reaction apparatus provided with a cooling condenser. Further, it is preferable to react the acid with the clay mineral at reflux temperature of 100° C. or higher by heating the acid-contained water solution sufficiently.

As the method of treating the clay mineral with the acid under a pressurized condition, it is preferable to heat and stir the acid-contained water solution in which the clay mineral is immersed, by using an autoclave as a pressuring/reaction apparatus. In this case, it is very favorable to set the reaction temperature to 120° C. or higher.

Under the above-described reaction condition, delamination of the clay mineral proceeds. Thus, when the octahedral sheet of the oxide of metal elutes and is removed, the tetrahedral sheet of the silicon dioxide loses its crystallographic regularity. But in this state, the skeleton of the silicon dioxide contained in the clay mineral remains therein and the orientation of apexes thereof remains in the obtained laminar silicic acid.

It is possible to select the shape and size of the laminar silicic acid by selecting the kind of the clay mineral.

That is, many kinds of clay minerals can be utilized as the material of the laminar silicic acid. The laminar silicic acid having different sizes and shapes can be obtained by selecting the kind of the clay mineral.

It is possible to obtain the laminar silicic acid having different polar distributions by using the clay mineral having the 1:1 laminar structure or the 2:1 laminar structure. That is, in the laminar silicic acid obtained from the clay mineral having the 1:1 laminar structure, the polarity on the upper surface of the layer thereof is inverse to that of the lower surface of the layer (see FIG. 26). That is, the orientation of the polarity between the adjacent layers is coincident with each other in the direction in which the laminar silicic acids are laminated one upon another.

In the laminar silicic acid obtained from the clay mineral having the 2:1 laminar structure, the polarity on the upper surface of the layer thereof is inverse to that of the lower surface of the layer (see FIG. 26), but the interlaminar spaces each having a high polarity alternates with the interlaminar spaces each having a low polarity. In this case the apexes of the confronting silic on dioxide tetrahedrons are connected partially with each other. Therefore, the laminar silicic acid seems to have only the interlaminar spaces having a low polarity.

According to a further embodiment, a laminar silicate comprises a laminar silicon dioxide. The laminar silicon dioxide has a skeleton of a clay mineral having a 1:1 laminar structure or a 2:1 laminar structure consisting of an uninvertible tetrahedral sheet of a silicon dioxide and an octahedral sheet of an oxide of a metal and has a laminar six-membered ring skeleton.

The laminar silicate is manufactured by acting the alkali metal compound on the laminar silicic acid prepared from the clay mineral and exchanging the protons of silanol group of the laminar silicic acid with positive ions of alkali metal.

The laminar silicate has the same structure as that of the laminar silicic acid from which the laminar silicate is prepared and thus has a feature, operation, and effect similar to those of the laminar silicic acid described previously.

In the laminar silicate of this embodiment, the polarity on the upper surface of the layer thereof is different from that of the lower surface of the layer. Thus, for example, the laminar silicate can be used as a carrier which can be selectively used for catalyst, pigment, medicine, and the like depending on the size and orientation thereof and as adsorbing agent which can be selectively used for hydrocarbon and the like.

The laminar silicate can be also used as a covering material capable of controlling the polarity of an object surface and imparting heat resistance thereto.

The laminar silicate is provided, in which the silicic acid is of a rectangular or a polygonal sheet having a diameter in a range of 10 nm to 50 mm, and 50% or more of the laminar silicic acid has a diameter of a sheet in a range of –40% to +40% of a sheet diameter at a maximum distribution.

The sheet-shaped laminar silicate is variable in its size and uniform in its configuration. The other points of the laminar silicate are similar to those of the laminar silicic acid described above.

According to a further embodiment if the invention, a laminar silicate comprises a laminar silicon dioxide. The laminar silicon dioxide has a skeleton of a clay mineral having a 1:1 laminar structure or a 2:1 laminar structure consisting of an uninvertible tetrahedral sheet of a silicon dioxide and an octahedral sheet of an oxide of a metal and has a laminar six-membered ring skeleton.

The laminar silicate is similar to that described above except that it does not have the crystallographic regularity, i.e., it is amorphous.

Because the laminar silicate is amorphous, the intervals between adjacent layers thereof are not uniform. Thus, the layers can be easily separated from each other. By utilizing the structure of the laminar silicate, it can be mixed with other compounds uniformly to form a composite compound.

The laminar silicate is provided, in which the silicic acid is of a rectangular or a polygonal sheet having a diameter in a range of 10 nm to 50 mm, and 50% or more of the laminar silicic acid has a diameter of a sheet in a range of –40% to +40% of a sheet diameter at a maximum distribution.

It is possible to provide the laminar silicate having various sizes and a uniform configuration. The other points of the laminar silicate are similar to those of the laminar silicate described previously.

The method of manufacturing the laminar silicate is described below.

In order to manufacture the laminar silicate, the alkali metal compound acts on the laminar silicic acid having the crystallographic regularity described previously or the laminar silicic acid not having the crystallographic regularity described previously. Then, an ion exchange process is carried out: The protons of the silanol group is exchanged with positive ions of the alkali metal.

The ion exchange process is described below.

It is preferable that a reaction-caused compound having protons and anions of the alkali metal compound used in the ion exchange process is sufficiently low in its acidity. More specifically, hydroxides, carbonate, hydrogen carbonate, and acetate of the alkali metal can be preferably used as the reaction-caused compound.

Although the concentration of the alkali metal compound is not limited to a specific one, preferably, it is adjusted to less than 1N because the alkali metal compound having such a concentration restricts the hydrolysis of the skeleton of the silicon dioxide.

The reaction temperature in the ion exchange process is not restricted to a specific one, but it is preferable to set it to lower than the room temperature, which restricts the hydrolysis of the skeleton of the silicon dioxide.

It is preferable to set the reaction time period in the ion exchange process to less than 30 minutes. If the reaction time period is more than 30 minutes, the hydrolysis of the skeleton of the silicon dioxide may be accelerated.

EMBODIMENT

Embodiment 1

The mesopore material according to an embodiment 1 of the present invention and a method for manufacturing the mesopore material will be described below with reference to FIG. 1.

As shown in FIG. 1, the mesopore material 5 of the embodiment 1 has mesopores 50 having diameters in a range of 2–10 nm. The mesopore material 5 consists of primary particles having major axes in a range of 10 nm–1 $\mu$m.

The diameter of the mesopore 50 which shows a maximum peak in a mesopore distribution curve is in the range of 2–10 nm, and 75% or more of all the mesopores 50 have diameters in a range of –40–+40% of the mesopore diameter which show the maximum peak in the mesopore distribution curve.

The mesopore material 5 is manufactured by a method described below.

As shown in FIG. 1, acid acted on clay mineral to form laminar silicic acid. Then, an alkali metal compound acted on the laminar silicic acid to form a laminar silicate 51. Then, a surface active agent 55 acted on the laminar silicate 51 to form a three-dimensional honeycomb-shaped structure 54 consisting of the silicate and to form a condensate 53 containing the surface active agent 55 therein. The three-dimensional honeycomb-shaped structure 54 has a large number of pores, namely, mesopores 540 in which the surface active agent 55 forms a rod-shaped micell 550. Then, the surface active agent 55 is removed from the condensate 53. Through the above procedure, the three-dimensional honeycomb-shaped structure 54 is obtained as the mesopore material 5.

In the embodiment 1, as the clay mineral, sepiolite was used. The sepiolite is band-shaped and has a 2:1 laminar structure consisting of an invertible tetrahedral sheet of silicon dioxide and an octahedral sheet of an oxide of magnesium.

As the alkali metal compound, a water solution of NaOH was used. As the surface active agent 55, cetyl trimethyl ammonium chloride (CTMA-Cl) was used.

The mesopore material and the method for manufacturing it will be described in detail below.

Initially, at the atmospheric pressure, acid acted on the sepiolite which is clay mineral to manufacture the laminar silicic acid in which the band-shaped skeleton of the silicate contained in the sepiolite remained.

β-sepiolite produced in Turkey was roughly pulverized by using a jaw crusher and then, pulverized with a ball mill comprising a steel ball mill having a diameter of 10 mm to obtain particles of sepiolite, the average diameter of which was 10 μm.

250 g of the pulverized sepiolite and 2000 milliliters of 3N hydrochloric acid were put into a reflux condenser-equipped separable flask of two liters so that the contents were heated in hot water bath at 90° C. for 10 hours, while the contents were being stirred by a stirring motor.

The solid contents of the flask were separated from the solution by filtration in heating. The obtained solid product was washed on a funnel by using 1000 milliliters of 1.2N hydrochloric acid heated to about 70° C.–90° C. and 2000 milliliters of hot ion exchange water.

The washed solid product and 2000 milliliters of 1N hydrochloric acid were put into the reflux condenser-equipped separable flask of two liters so that the contents were heated in hot water bath at 90° C. for one hour while the contents were being stir red by the stirring motor. Then, a solid product separated from the contents in the flask by filtration was washed on the funnel by using 10000 milliliters of hot ion exchange water. Then, the solid product was dried at 80° C. for three days under vacuum to obtain 115.4 g of a rough product. The rough product contained humic acid which was an impurity.

In order to remove the humic acid, 110 g of the rough product and 600 milliliters of 30% hydrogen peroxide-contained solution were put into the reflux condenser-equipped separable flask of two liters so that the contents were heated in a water bath at 90° C. for four hours while the contents were being stirred by the stirring motor. Then, a solid product separated from the heated contents in the flask by filtration was washed on the funnel by using 2000 milliliters of hot ion exchange water having a temperature of about 70° C.–90° C.

The washed solid product and 2000 milliliters of the ion exchange water were put into the reflux condenser-equipped separable flask of two liters so that the contents were heated in a water bath at 90° C. for one hour while the contents were being stirred by the stirring motor. Then, a solid product separated from the contents in the flask by filtration was washed. Then, the solid product was repeatedly heated and washed by using 1000 milliliters of 1N hydrochloric acid in the same manner as that described above. The solid end product separated from the contents by filtration was dried at 80° C. for three days under vacuum to obtain 105.3 g of a product. The end product is hereinafter referred to as NS-1a.

An elemental analysis revealed that the product NS-1a was silicic acid composed mainly of silicon. Further, a photographic observation by means of the transparent type electron microscope indicated that the product NS-1a was the band-shaped laminar silicic acid in which the band-shaped skeleton of the silicate contained in the sepiolite remained.

Then a water solution of NaOH which was an alkali metal compound acted on the band-shaped laminar silicic acid NS-1a. At this time, the mole ratio between Si atoms of the laminar silicic acid and Na ions of the water solution of NaOH was: Na/Si=about 0.3 (mole/mole).

10 g of the laminar silicic acid NS-1a and 200 milliliters of ion exchange water were put into a plastic beaker of one liter to heat the contents at 95° C. in water bath while the contents were being stirred by the stirring motor.

50 milliliters of a hot water solution of 1N NaOH was put into the beaker. Then, the contents were heated in a water bath for 30 minutes, with the temperature of the dispersion liquid kept at about 70° C. while the content was being stirred by the stirring motor. At this time, the pH of the dispersion liquid was 10.7 –10.2.

Then, a heated solution consisting of 4.0 g of cetyl trimethyl ammonium chloride (CTMA-Cl) and 400 milliliters of ion exchange water was mixed with the dispersion liquid of the laminar silicic acid. Then, the dispersion liquid was heated in water bath for one hour, with the temperature of the dispersion liquid kept at about 70° C. while the dispersion liquid was being stirred by the stirring motor.

2N HCl was added dropwise to the dispersion liquid to adjust the pH thereof to 8.5. Then, the dispersion liquid was heated in a water bath at about 70° C. for two hours while the dispersion liquid was being stirred by the stirring motor. A solid product separated by filtration from the heated contents contained in the beaker was washed on the funnel by using 2000 milliliters of hot ion exchange water having a temperature of about 70° C.–90° C. Then, the solid product was dried at 110° C. overnight under vacuum. The obtained end solid product was calcined at 650° C. for four hours to obtain a 6.8 g of a mesopore material. The mesopore material is hereinafter referred to as FS-1.

The observation of the X-ray diffraction pattern of the mesopore material FS-1 and the photographic observation by the transparent type electron microscope (see description of embodiments 8 and 12) indicate that the mesopore material FS-1 has high uniformity in the diameters of the mesopores, had a high degree of crystallizability, and had a hexagonal structure. It was also revealed that primary particles of the mesopore material FS-1 were in a range of 10 nm–1 μm in the major axes thereof and that the primary particles thereof were uniform in the sizes thereof.

As apparent from the foregoing description, the mesopore material of the present invention comprises primary particles small and uniform in the size thereof. Further, the diameters of the mesopores are uniform and had a high degree of crystallizability. Thus, the mesopore material of the embodiment 1 can be preferably used as a catalyst carrier and an adsorbing agent.

Further, the manufacturing method of the present invention allows the mesopore material to be manufactured easily and is capable of manufacturing it at a low cost, because the manufacturing method eliminates the need for the provision of a particular operation or a particular apparatus.

Embodiment 2

In the embodiment 2, the mesopore material and the manufacturing method thereof will be described.

The length of the major axes of primary particles that form the mesopore material range from 10 nm to 1 μm. The primary particle is obtained by reacting the band-shaped laminar silicic acid NS-1a prepared in the embodiment 1 with a water solution of NaOH at 70° C. for 30 minutes to produce a laminar silicic acid salt, which is further reacted with ammonium alkyl salt for combining.

The mole ratio between Si atoms of the laminar silicic acid and Na ions of the water solution of NaOH was: Na/Si=about 1.0 (mole/mole).

Utilizing a manufacturing method similar to that of the embodiment 1, the laminar silicic acid salt was obtained by reacting 10 g of the laminar silicic acid NS-1a with 150 milliliters of a hot water solution of NaOH (1N). The resultant laminar silicic acid salt was further reacted with ammonium alkyl salt to provide 6.5 g of a mesopore material which is hereinafter referred to as FS-2. The pH of the laminar silicic acid-contained dispersion liquid to which 150 milliliters of the heated solution of 1N NaOH added was about 12.

An observation of the X-ray diffraction pattern of the mesopore material FS-2 and the photographic observation by the transparent type electron microscope (see description of embodiments 8 and 12) indicate that the mesopore material has high uniformity in the diameters of the mesopores thereof, had a high degree of crystallizability, and had a hexagonal structure. It was also revealed that the primary particles of the mesopore material FS-2 were in a range of 10 nm–1 $\mu$m in the major axes thereof and uniform in the sizes thereof.

Embodiment 3

In the embodiment 3, at the atmospheric pressure, acid acted on chrysotile which is a clay mineral having a 1:1 laminar structure of an uninvertible tetrahedral sheet of silicon dioxide and an octahedral sheet of an oxide of magnesium to manufacture laminar silicic acid in which the tubular skeleton contained in the chrysotile remained.

The method of manufacturing the mesopore material by using the laminar silicic acid and the mesopore material will be described below.

The method of manufacturing the laminar silicic acid NC-2a will be described in detail later in the description of the embodiment 15.

A water solution of NaOH acted on the tubular laminar silicic acid NC-2a. At this time, the mole ratio between Si atoms of the laminar silicic acid and Na ions of the water solution of NaOH was: Na/Si=about 2.0 (mole/mole).

10 g of the laminar silicic acid NC-2a and 200 milliliters of ion exchange water are put into a plastic beaker of one liter. The contents were heated in a water bath at 95° C. while the contents were being stirred by the stirring motor.

300 milliliters of hot water solution of 1N NaOH was put into the beaker, and then, the contents were heated in a water bath for 30 minutes, with the temperature of the dispersion liquid kept at about 70° C. while the contents were being stirred by the stirring motor. At this time, the pH of the dispersion liquid was 11.7–11.3.

Then, a hot solution consisting of 4.0 g of cetyl trimethyl ammonium chloride (CTMA-Cl) and 400 milliliters of ion exchange water was mixed with the dispersion liquid of the laminar silicic acid. Then, the dispersion liquid was heated in water bath for one hour, with the temperature of the dispersion liquid kept at about 70° C., while the dispersion liquid was being stirred by the stirring motor.

2N HCl was added dropwise to the dispersion liquid to adjust the pH thereof to 8.5. Then, the dispersion liquid was heated in a water bath at about 70° C. for two hours while the dispersion liquid was being stirred by the stirring motor. A solid product separated from the heated contents contained in the beaker was washed on the funnel by using 2000 milliliters of hot ion exchange water having a temperature of about 70° C.–90° C.

Then, the washed solid product was dried at 110° C. overnight under vacuum. The obtained solid product was calcined at 650° C. for four hours to obtain a 8.4 g of a mesopore material. The mesopore material is hereinafter referred to as FC-3.

An observation of the X-ray diffraction pattern of the mesopore material FC-3 and the photographic observation by the transparent type electron microscope (see description of embodiments 8 and 12) indicate that the mesopore material FC-3 has high uniformity in the diameters of the mesopores thereof, had a high degree of crystallizability, and had a hexagonal structure. It was also revealed that primary particles of the mesopore material FC-3 were in a range of 10 nm–1 $\mu$m in the lengths of the major axes thereof and uniform in the sizes thereof.

Embodiment 4

In the embodiment 4, the mesopore material and the manufacturing method thereof will be described. The length of the major axes of primary particles of the mesopore material range from 10 nm to 1 $\mu$m. The primary particle was obtained by reacting the tubular silicic acid NC-2a prepared in the embodiment 15 with a water solution of NaOH at a room temperature for 30 minutes to produce a laminar silicic acid salt, which is further reacted with ammonium alkyl salt.

The mole ratio between Si atoms of the laminar silicic acid and Na ions of the water solution of NaOH was: Na/Si=about 2.0 (mole/mole).

10 g of the laminar silicic acid NC-2a and 200 milliliters of ion exchange water were put into a plastic beaker of one liter. The contents were heated in a water bath at the room temperature while the content was being stirred by the stirring motor.

300 milliliters of hot water solution of 1N NaOH was put into the beaker, and then, the contents were stirred by the stirring motor. At this time, the pH of the dispersion liquid was 12.2 (27° C.).

Then, a hot solution consisting of 4.0 g of cetyl trimethyl ammonium chloride (CTMA-Cl) and 400 milliliters of ion exchange water was mixed with the dispersion liquid of the laminar silicic acid. Then, the dispersion liquid was immersed in a water bath.

Then, the mixture was heated in the water bath for one hour, with the temperature of the dispersion liquid kept at about 70° C., while the dispersion liquid was being stirred by the stirring motor.

Then, 2N HCL was dripped to the dispersion liquid to adjust the pH of the solution to 8.5.

Then, the dispersion liquid was heated in a water bath for two hours, with the temperature of the dispersion liquid kept at about 70° C., while the dispersion liquid was being stirred by the stirring motor.

The heated dispersion liquid was filtered to obtain a 20 solid product. The obtained solid product was washed on a funnel by using 2000 milliliters of hot ion exchange water heated to about 70° C.–90° C.

Then, the washed solid product was dried under vacuum overnight at 110° C.

Then, the solid product was calcinated at 650° C. in air for four hours to obtain a 8.4 g of a mesopore material.

The mesopore material is hereinafter referred to as FC-4.

An observation of the X-ray diffraction pattern of the mesopore material FC-4 and the photographic observation by the transparent type electron microscope (see description of embodiments 8 and 12) indicated that the mesopore material FC-4 has high uniformity in the diameters of the mesopores thereof, had a high degree of crystallizability, and had a hexagonal structure. It was also revealed that primary particles of the mesopore material FC-4 were in a range of 10 nm–1 μm in the lengths of the major axes thereof and uniform in the sizes thereof.

Embodiment 5

In the embodiment 5, at the atmospheric pressure, acid acted on hectorite which is clay mineral sheet-shaped and has a 2:1 laminar structure of an uninvertible tetrahedral sheet of silicon dioxide and an octahedral sheet of magnesium to manufacture laminar silicic acid in which the small-sized sheet-shaped skeleton contained in the hectorite remained.

The mesopore material and the method of manufacturing the mesopore material by using the laminar silicic acid will be described below.

The method of manufacturing the laminar silicic acid NH-5a will be described in detail later in the description of the embodiment 18.

102 A water solution of NaOH acted on the small sheet-shaped laminar silicic acid NH-5a. At this time, the mole ratio between Si atoms of the laminar silicic acid and Na ions of the water solution of NaOH was: Na/Si=about 1.7 (mole/mole).

10 g of the laminar silicic acid NH-5a and 200 milliliters of ion exchange water were put into a plastic beaker of one liter. The contents were heated in a water bath at 95° C. while the content was being stirred by the stirring motor.

250 milliliters of hot water solution of 1N NaOH was put into the beaker. Then, the contents were heated in a water bath for 30 minutes, with the temperature of the dispersion liquid kept at about 70° C. while the contents were being stirred by the stirring motor. At this time, the pH of the dispersion liquid was 12.2 –11.7.

Then, a hot solution consisting of 4.0 g of cetyl trimethyl ammonium chloride (CTMA-Cl) and 400 milliliters of ion exchange water was mixed with the dispersion liquid of the laminar silicic acid. Then, the dispersion liquid was heated in water bath for one hour, with the temperature of the dispersion liquid kept at about 70° C., while the dispersion liquid was being stirred by the stirring motor.

2N HCl was added dropwise to the dispersion liquid to adjust the pH thereof to 8.5. Then, the dispersion liquid was heated in a water bath at about 70° C. for two hours while the dispersion liquid was being stirred by the stirring motor. A solid product separated from the heated contents contained in the beaker was washed on the funnel by using 3000 milliliters of hot ion exchange water having a temperature of about 70° C.–90° C.

Then, the solid product was dried at 110° C. overnight under vacuum. The obtained solid product was calcined at 650° C. for four hours to obtain a 7.6 g of a mesopore material. The mesopore material is hereinafter referred to as FH-5.

An observation of the X-ray diffraction pattern of the mesopore material FH-5 and the photographic observation by the transparent type electron microscope (see description of embodiments 8 and 12) indicate that the mesopore material FH-5 has high uniformity in the diameters of the mesopores thereof, had a high degree of crystallizability, and had a hexagonal structure. It was also revealed that primary particles of the mesopore material FH-5 were in a range of 10 nm–1 μm in the lengths of the major axes thereof and uniform in the size thereof.

Embodiment 6

In the embodiment 6, under a pressurized condition, acid acted on kaolinite which is clay mineral sheet-shaped and has a 1:1 laminar structure composed of an uninvertible tetrahedral sheet of silicon dioxide and an octahedral sheet of oxide of aluminum to manufacture laminar silicic acid in which the sheet-shaped skeleton contained in the kaolinite remained.

The mesopore material and the method of manufacturing the mesopore material by using the laminar silicic acid will be described below.

The method of manufacturing the laminar silicic acid NK-1p will be described in detail later in the description of the embodiment 14.

A water solution of NaOH acted on the large sheet-shaped laminar silicic acid NK-1p. At this time, the mole ratio between Si atoms of the laminar silicic acid and Na ions of the water solution of NaOH was: Na/Si=about 1.3 (mole/mole).

10 g of the laminar silicic acid NK-1p and 200 milliliters of ion exchange water were put into a plastic beaker of one liter. The contents were heated in a water bath at 95° C. while the contents were being stirred by the stirring motor.

200 milliliters of hot water solution of 1N NaOH was put into the beaker. Then, the contents were heated in a water bath for 30 minutes, with the temperature of the dispersion liquid kept at about 70° C. while the content was being stirred by the stirring motor. At this time, the pH of the dispersion liquid was 11.2.

Then, a hot solution consisting of 4.0 g of cetyl trimethyl ammonium chloride (CTMA-Cl) and 400 milliliters of ion exchange water was mixed with the dispersion liquid of the laminar silicic acid. Then, the dispersion liquid was heated in water bath for one hour, with the temperature of the dispersion liquid kept at about 70° C., while the dispersion liquid was being stirred by the stirring motor.

2N HCl was added dropwise to the dispersion liquid to adjust the pH thereof to 8.5. Then, the dispersion liquid was heated in a water bath at about 70° C. for two hours while the dispersion liquid was being stirred by the stirring motor. A solid product separated from the heated contents contained in the beaker was washed on the funnel by using 3000 milliliters of hot ion exchange water having a temperature of about 70° C.–90° C.

Then, the solid product was dried at 110° C. overnight under vacuum. The obtained solid product was calcined at 650° C. for four hours to obtain a 8.8 g of a mesopore material. The mesopore material is hereinafter referred to as FK-6.

An observation of the X-ray diffraction pattern of the mesopore material FK-6 and the photographic observation by the transparent type electron microscope (see description of embodiments 8 and 11) indicate that the mesopore material FK-6 has high uniformity in the diameters of the mesopores thereof, had a high degree of crystallizability, and had a hexagonal structure. It was also revealed that primary particles of the mesopore material FK-6 were in a range of 10 nm–1 μm in the lengths of the major axes thereof and uniform in the size thereof.

Embodiment 7

In the embodiment 7, at the atmospheric pressure, acid acted on vermiculite which is clay mineral large sheet-shaped and has a 2:1 laminar structure composed of an uninvertible tetrahedral sheet of silicon dioxide and an octahedral sheet of oxide of aluminum, iron, and magnesium to manufacture laminar silicic acid in which the sheet-shaped skeleton contained in the vermiculite remained.

The mesopore material and the method of manufacturing the mesopore material by using the laminar silicic acid will be described below.

The method of manufacturing the laminar silicic acid NV-6a will be described in detail later in the description of the embodiment 19.
119 A water solution of NaOH acted on the large sheet-shaped laminar silicic acid NV-6a. At this time, the mole ratio between Si atoms of the laminar silicic acid and Na ions of to the water solution of NaOH was: Na/Si=about 1.3 (mole/mole).

10 g of the laminar silicic acid NV-6a and 200 milliliters of ion exchange water were put into a plastic beaker of one liter. The contents were heated in a water bath at 95° C. while the contents were being stirred by the stirring motor.

200 milliliters of hot water solution of 1N NaOH was put into the beaker. Then, the contents were heated in a water bath for 30 minutes, with the temperature of the dispersion liquid kept at about 70° C. while the contents were being stirred by the stirring motor. At this time, the pH of the dispersion liquid was 11.8–11.1.

Then, a hot solution consisting of 4.0 g of cetyl trimethyl ammonium chloride (CTMA-Cl) and 400 milliliters of ion exchange water was mixed with the dispersion liquid of the laminar silicic acid. Then, the dispersion liquid was heated in water bath for one hour, with the temperature of the dispersion liquid kept at about 70° C., while the dispersion liquid was being stirred by the stirring motor.

2N HCl was added dropwise to the dispersion liquid to adjust the pH thereof to 8.5. Then, the dispersion liquid was heated in a water bath at about 70° C. for two hours while the dispersion liquid was being stirred by the stirring motor. A solid product separated from the heated contents contained in the beaker was washed on the funnel by using 3000 milliliters of hot ion exchange water having a temperature of about 70° C.–90° C.

Then, the solid product was dried at 110° C. overnight under vacuum. The obtained solid product was calcined at 650° C. for four hours to obtain a 7.6 g of a mesopore material. The mesopore material is hereinafter referred to as FV-7.

An observation of the X-ray diffraction pattern of the mesopore material FV-7 and the photographic observation by the transparent type electron microscope (see description of embodiments 8 and 11) indicate that the mesopore material FV-7 has high uniformity in the diameters of the mesopores thereof, had a high degree of crystallizability, and had a hexagonal structure. It was also revealed that primary particles of the mesopore material FV-7 were in a range of 50 nm–2 μm in the lengths of the major axes thereof and uniform in the size thereof.

Embodiment 8

In the embodiment 8, the X-ray diffraction patterns of the respective mesopore materials obtained in the embodiments 1 through 7 are described below with reference to FIGS. 2 through 8.

The X-ray diffraction patterns of the respective mesopore materials are shown in FIGS. 2 through 8. Considering that three to four peaks based on hexagonal structures were observed in each of FIGS. 2 through 8, each mesopore material has a hexagonal structure and a high degree of crystallizability.

Figure 2:
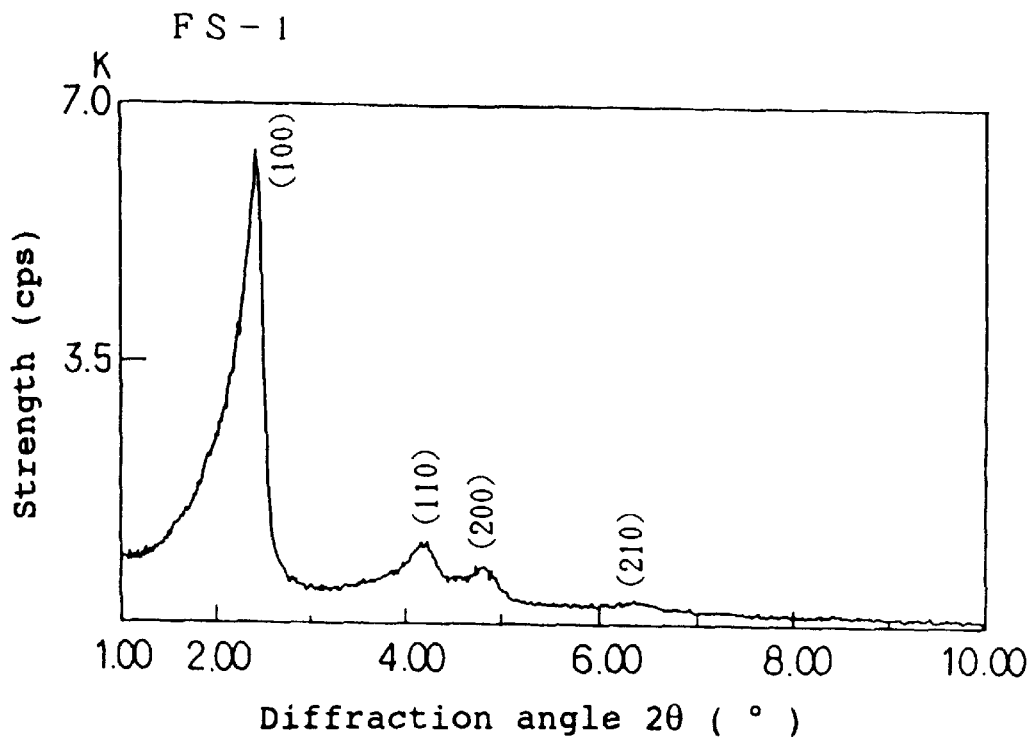
FIG. 2 is a diagram showing an X-ray diffraction pattern of a mesopore material FS-1 (embodiment 1) according to the embodiment 8.
Figure 3:
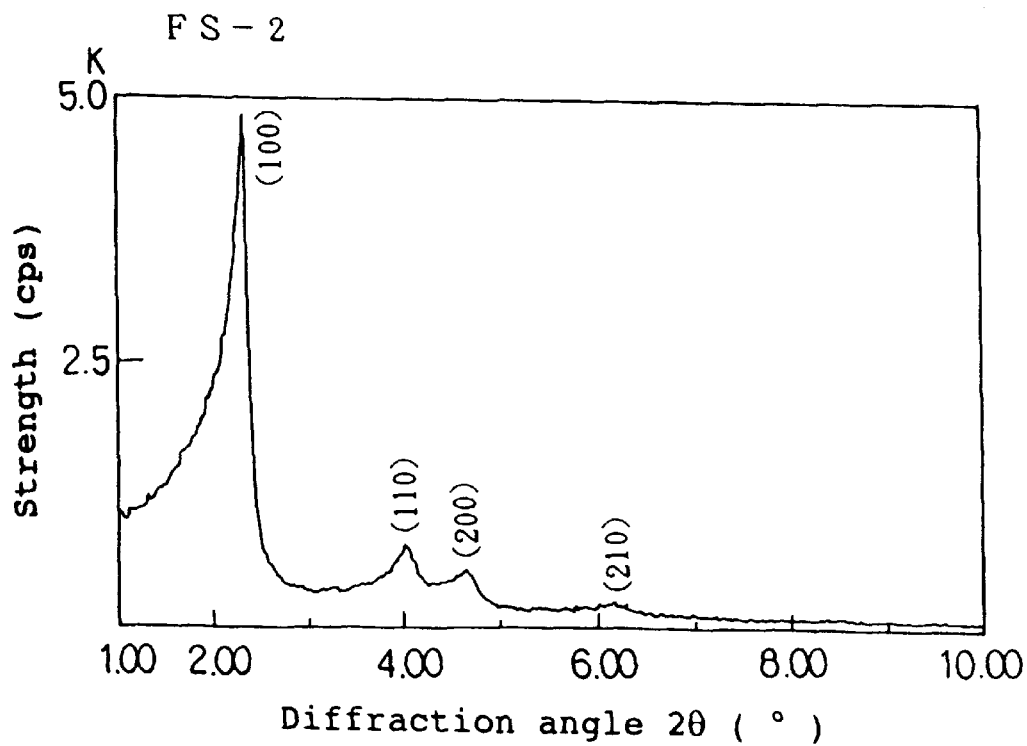
FIG. 3 is a diagram showing an X-ray diffraction pattern of a mesopore material FS-2 (embodiment 2) according to the embodiment 8.

Comparing FIGS. 2 and 3 with each other, based on the hexagonal structure, the diffraction strength of the three to four peaks of the mesopore material FS-2 (embodiment 2) shown in FIG. 3 is higher than that of the peaks of the mesopore material FS-1 (embodiment 1) shown in FIG. 2. This indicates that supposing that the other reaction conditions are the same, the crystallizability of the mesopore material can be allowed to be higher by increasing the ratio of the alkali metal compound relative to the laminar silicic acid in the reaction of the laminar silicic acid and the alkali metal compound.

Figure 4:
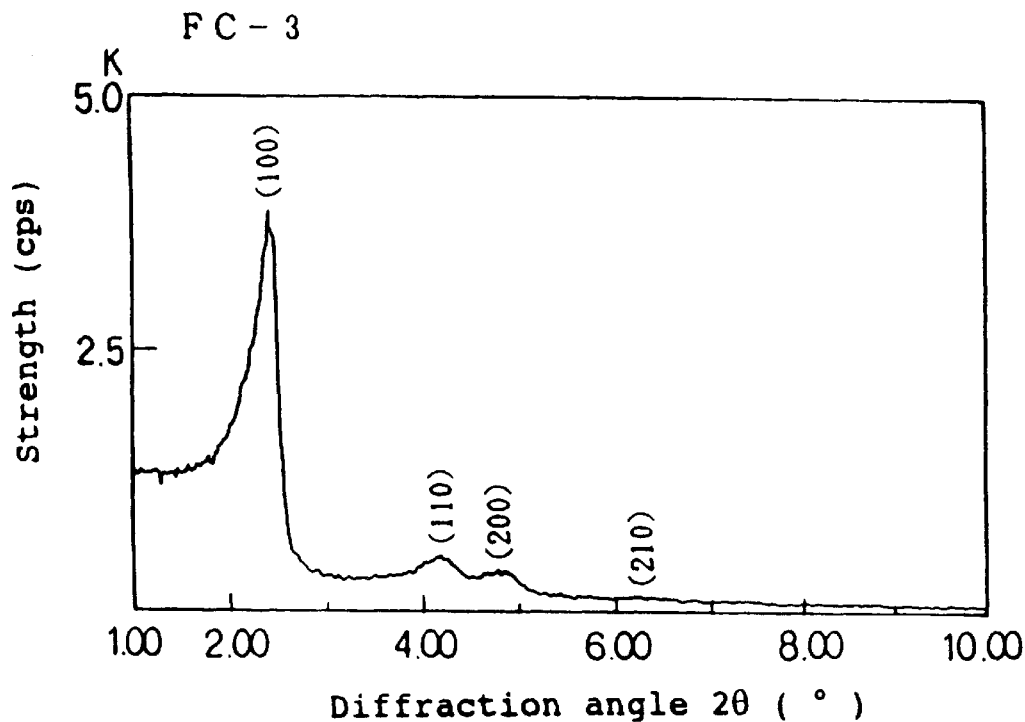
FIG. 4 is a diagram showing an X-ray diffraction pattern of a mesopore material FC-3 (embodiment 3) according to the embodiment 8.
Figure 5:
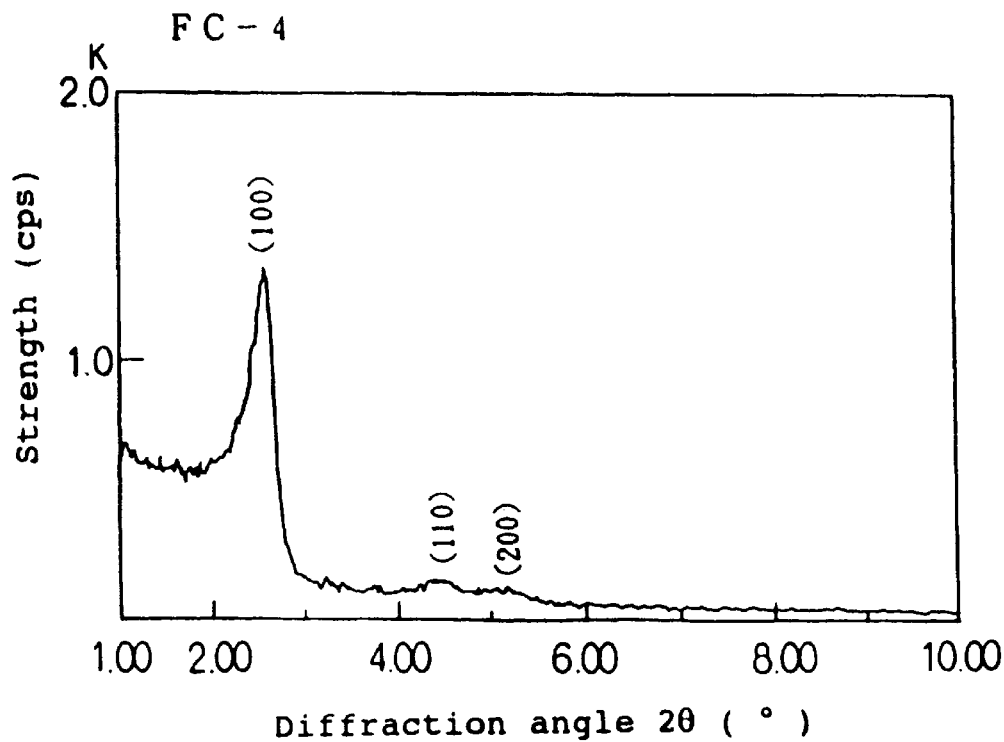
FIG. 5 is a diagram showing an X-ray diffraction pattern of a mesopore material FC-4 (embodiment 4) according to the embodiment 8.
Figure 6:
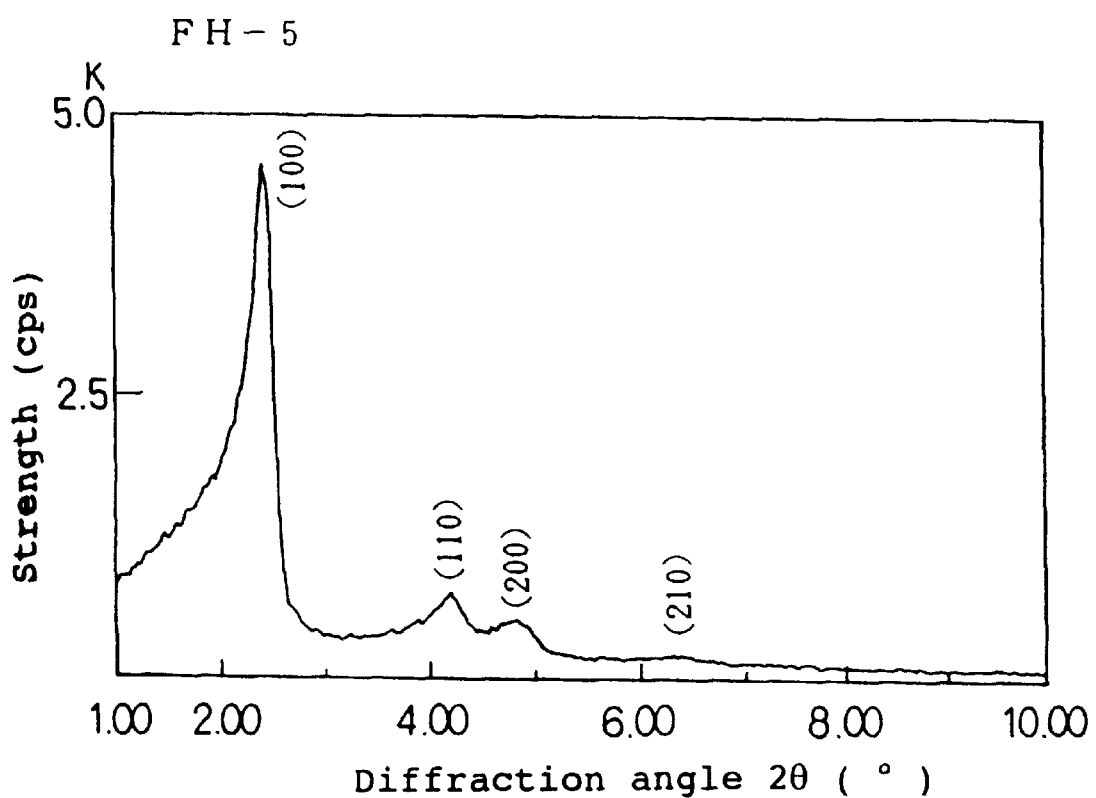
FIG. 6 is a diagram showing an X-ray diffraction pattern of a mesopore material FH-5 (embodiment 5) according to the embodiment B.
Figure 7:
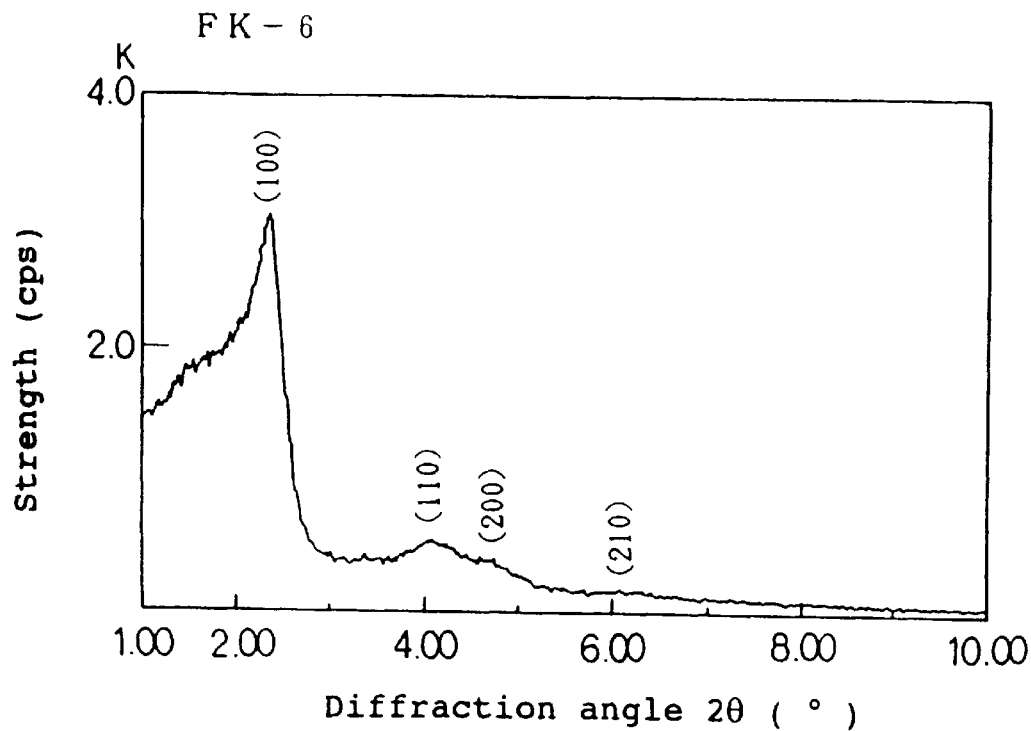
FIG. 7 is a diagram showing an X-ray diffraction pattern of a mesopore material FE-6 (embodiment 6) according to the embodiment 8.
Figure 8:
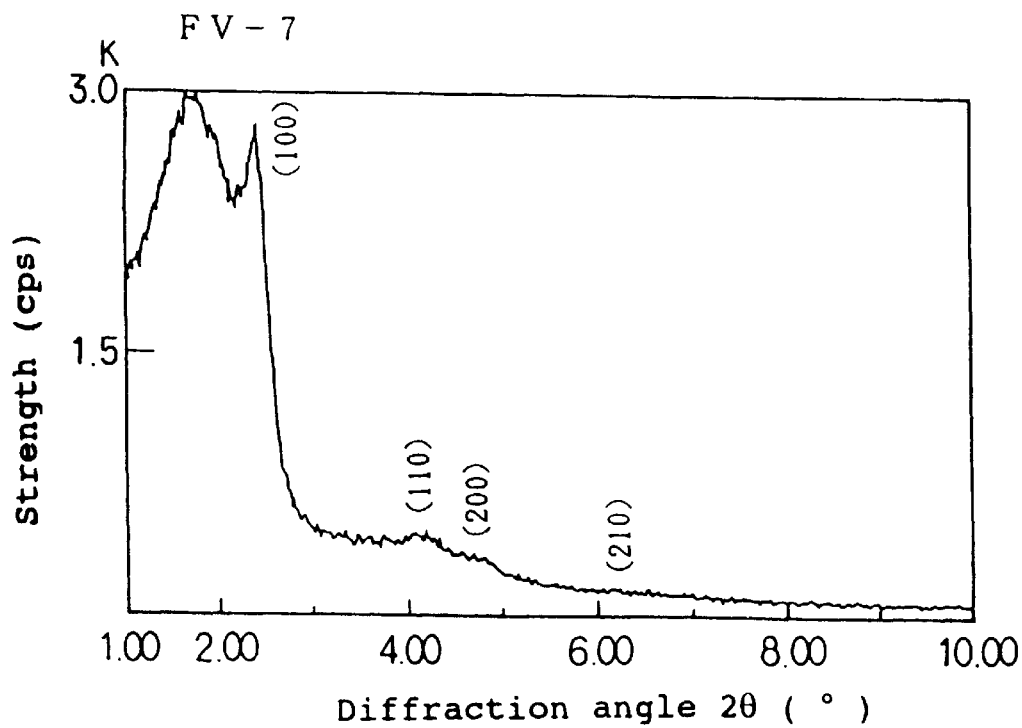
FIG. 8 is a diagram showing an X-ray diffraction pattern of a mesopore material FV-7 (embodiment 7) according to the embodiment 8.

Comparing FIGS. 4 and 5 with each other, the diffraction strength of the peaks of the mesopore material FC-4 (embodiment 4) shown in FIG. 5 is higher than that of the peaks of the mesopore material FC-3 (embodiment 3) shown in FIG. 4.

This indicates that supposing that the other reaction conditions are the same, the crystallizability of the mesopore material can be allowed to be higher by raising the reaction temperature higher in the reaction of the laminar silicic acid and the alkali metal compound.

Embodiment 9

In the embodiment 9 the specific surface area of the mesopore materials obtained in the embodiments 1 through 7 by means of the adsorption of nitrogen used by BET method.

Table 1 indicates that the specific surface area of each mesopore material is more than 800 m²/g. This indicates that the mesopore material is a porous material having many mesopores formed therein.

Table 1

Embodiment 10

Figure 9:
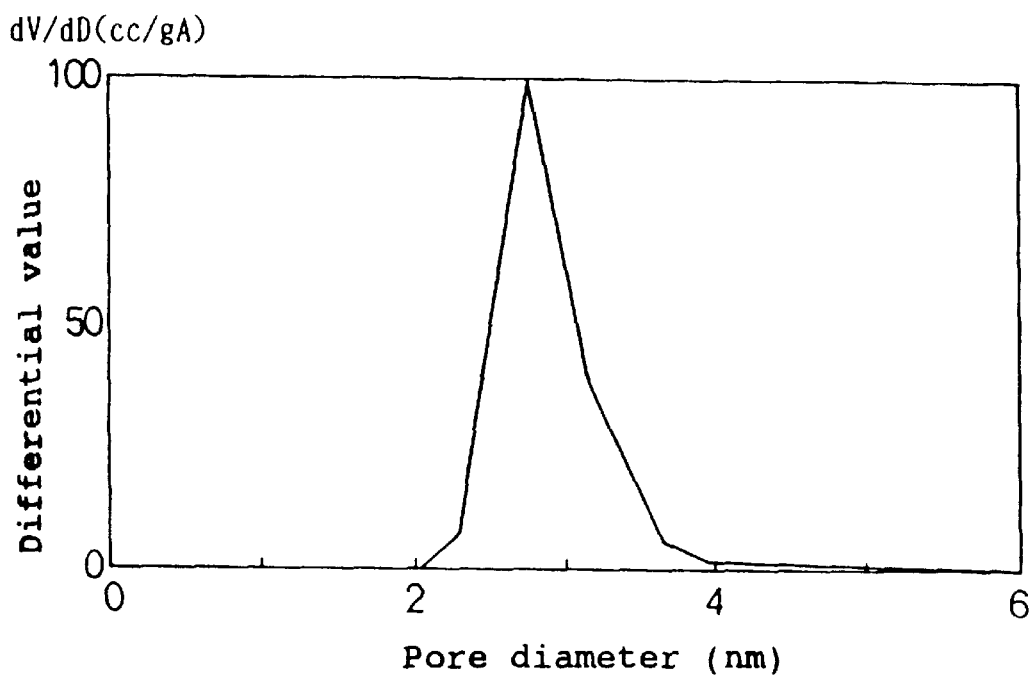
FIG. 9 is a diagram showing a pore distribution curve of a mesopore material FS-2 (embodiment 2) according to an embodiment 10.
Figure 10:
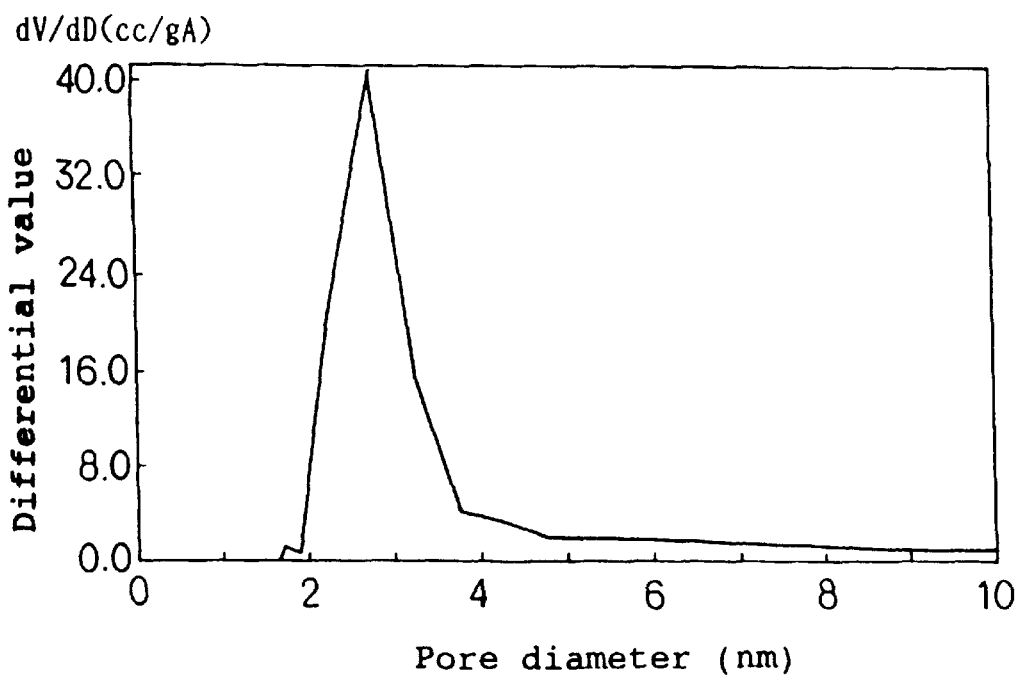
FIG. 10 is a diagram showing a pore distribution curve of a mesopore material FV-7 (embodiment 7) according to the embodiment 10.

As shown in FIGS. 9 and 10, the pore distribution of the mesopore material FS-2 of the embodiment 2 and that of the mesopore material FV-7 of the embodiment 7 were determined by nitrogen adsorption. The results will be described below.

The method of measuring the mesopore distribution is described below.

Initially, an isothermal line of nitrogen adsorption was prepared by the following apparatus and method.

The apparatus used was a vacuum line provided with an absolute pressure type transducer (Baratron 127AA manufactured by Japan M.K.S. Co., Ltd.) and a control valve (248A manufactured by Japan M.K.S. Co., Ltd.)

The pore distribution was measured by a quantitative method.

In the measurement, initially, a sample of about 50 mg was put into a sample tube and the sample tube was vacuum-deaerated at 150° C. for two hours to obtain a vacuum degree of $10^{-3}$ torr. Then, the nitrogen adsorption degree was measured while the sample tube was immersed in liquid nitrogen to obtain isothermal lines of nitrogen adsorption.

FIGS. 9 and 10 show pore distribution curves determined by Cranston-Inclay method, based on isothermal lines of nitrogen adsorption.

The diameter of a center pore, namely, the pore diameter indicating a maximum peak determined from the peak position of the pore distribution curves was 2.8 nm in both the pore materials FS-2 and FS-7.

Then, an integration curve showing the ratio of the specific surface area of the mesopore material to the mesopore diameter was determined by Cranston-Inclay method. The ratio (+–40% pore percentage) of the specific surface area of the mesopore material in a range of −40%−+40% of the center pore diameter to the whole surface area of the mesopore material was 96% in the mesopore material FS-2.

The above value is described in claims of the present invention as "the pore diameter indicating a maximum peak in a pore distribution curve is in a range of 2–10 nm, and more than 75% of the whole pores have diameters in a range of 40%−+40% of a pore diameter showing a maximum peak in the pore distribution curve."

The above-indicated value was higher than that of a mesopore material obtained from the conventional laminar silicate.

The ratio (+−40% pore percentage) of the specific surface area of the mesopore material in a range of −40%−+40% of the center pore diameter to the whole surface area of the mesopore material was 67% in the pore material FV-7. The uniformity of the pore diameter of the pore material FV-7 was almost equal to that of the conventional mesopore material.

The ratio (+−40% pore percentage) of the specific surface area of the mesopore material in a range of −40% −+40% of the center pore diameter to the whole surface area of the mesopore material was determined for the mesopore materials FS-1 (embodiment 1), FC-3 (embodiment 3), FH-5 (embodiment 5), and FK-6 (embodiment 6). The result was that the above-described ratios of the mesopore materials FS-1, FC-3, FH-5, and FK-6 were higher than 75% which was higher than that of the conventional one.

Embodiment 11

Figure 11:
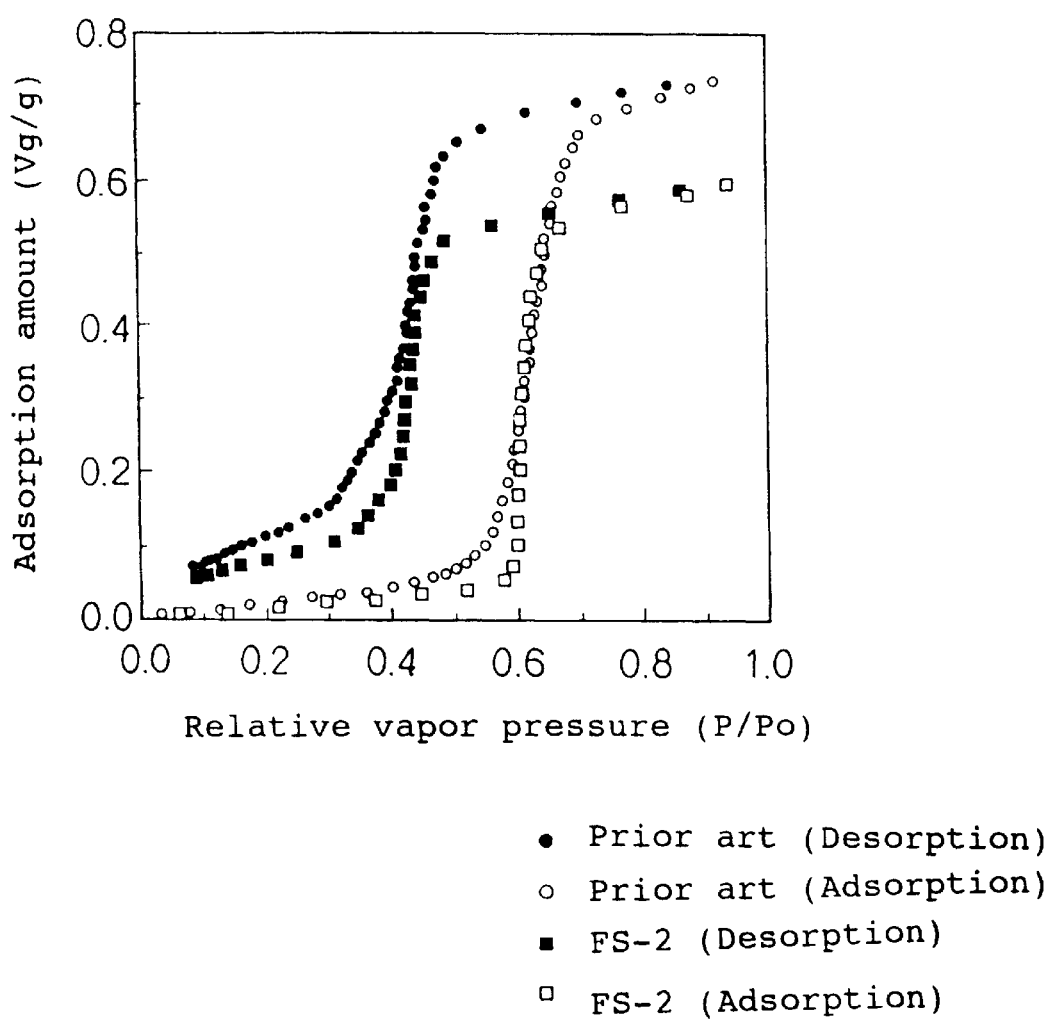
FIG. 11 is a diagram showing a vapor adsorbing isothermal curve of a mesopore material FS-2 (embodiment 2) and a conventional mesopore material.

In embodiment 11, as shown in FIG. 11, an adsorption isothermal line of the mesopore material FS-2 of the embodiment 2 was determined by water vapor adsorption. The result is described below.

The method of measuring the adsorption isothermal line is described below. A measuring apparatus used in the embodiment 11 was similar to that used in embodiment 9, and quantitative method was used. Initially, a sample of about 50 mg was put into a sample tube, and the sample tube was vacuum-deaerated at 150° C. for two hours to obtain a vacuum degree of $10^{-3}$ torr. Then, the water vapor adsorption degree was measured while the temperature of the sample tube was maintained at 25° C. to obtain an isothermal line of water vapor adsorption.

A water vapor adsorption isothermal line of a conventional mesopore material prepared from kanemite which is a synthesized laminar silicate, by using a method similar to the above-described one. The two isothermal lines are also shown in FIG. 11.

As indicated in FIG. 11, the peak—shape of the water vapor adsorption isothermal line of the mesopore material FS-2 of the embodiment 2 sharpen and really vertical compound with those of the conventional mesopore material. This indicates that the diameters of the pores of the mesopore material FS-2 of the embodiment 2 were uniform and had a higher degree of crystallizability.

Embodiment 12

Figure 13:
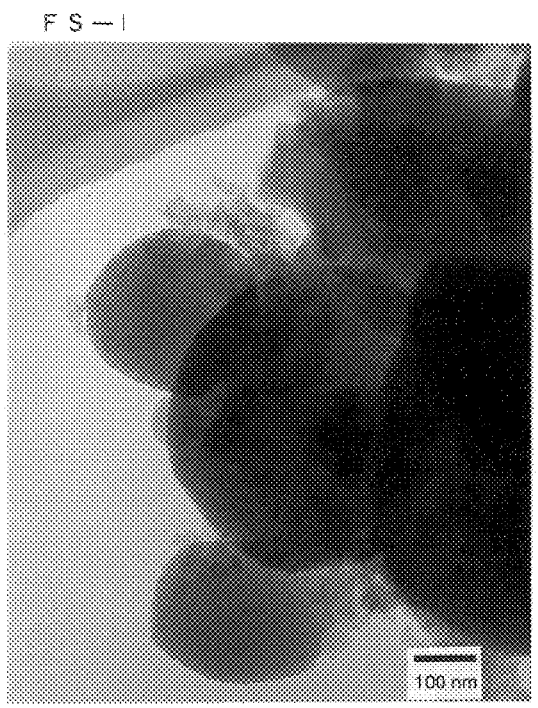
FIG. 13 is a photograph (magnification: 120000) replacing a drawing showing a mesopore material FS-1 (embodiment 1) according to the embodiment 12.
Figure 12:
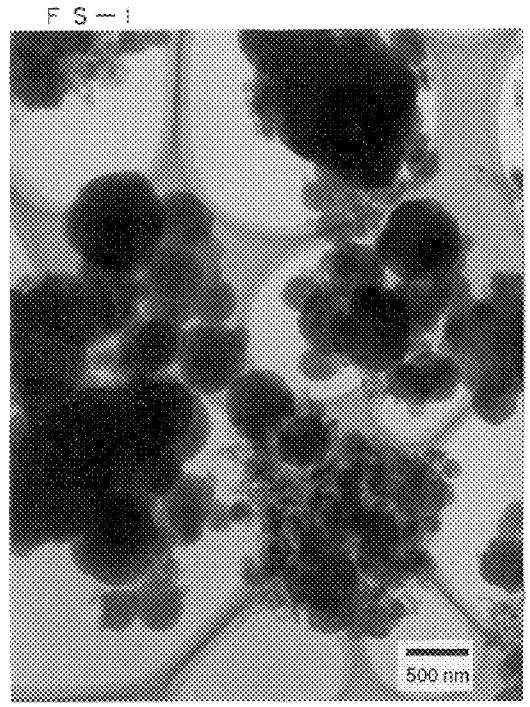
FIG. 12 is a photograph (magnification: 24000) replacing a drawing showing a mesopore material FS-1 (embodiment 1) according to an embodiment 12.
Figure 15:
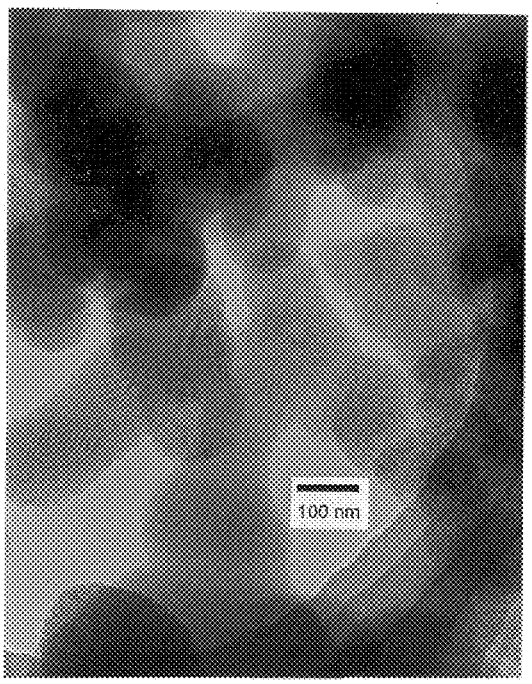
FIG. 15 is a photograph (magnification: 120000) replacing a drawing showing a mesopore material FS-2 (embodiment 2) according to the embodiment 12.
Figure 14:
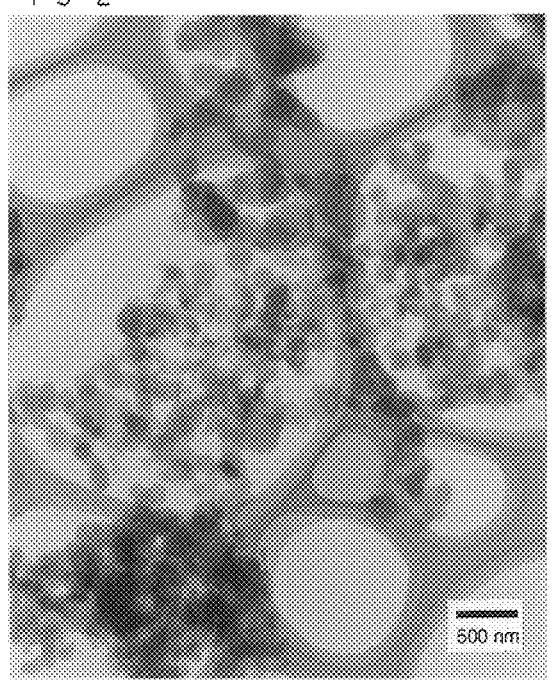
FIG. 14 is a photograph (magnification: 24000) replacing a drawing showing a mesopore material FS-2 (embodiment 2) according to the embodiment 12.
Figure 17:
FIG. 17 is a photograph (magnification: 120000) replacing a drawing showing a mesopore material FC-3 (embodiment 3) according to the embodiment 12.
Figure 16:
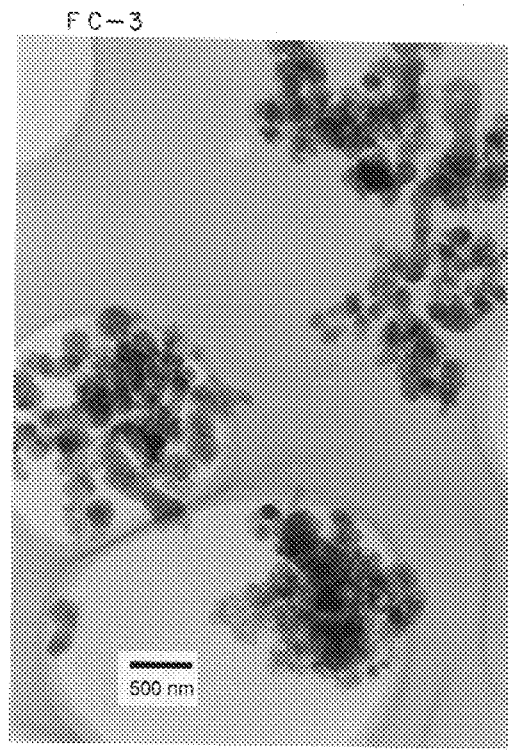
FIG. 16 is a photograph (magnification: 24000) replacing a drawing showing a mesopore material FC-3 (embodiment 3) according to the embodiment 12.

In the embodiment 12, the mesopore materials obtained in the embodiments 1 through 7 were observed photographically by the transparent type electron microscope. They were shown in FIG. 12 through 25. FIGS. 12 and 13 show the mesopore material FS-1 obtained in the embodiment 1. FIGS. 14 and 15 show the mesopore material FS-2 obtained in the embodiment 2. FIGS. 16 through 25 also show the mesopore materials obtained in the embodiments 3 through 7.

In addition to the particle-shaped mesopore material, reticulate objects are present in FIGS. 12 through 25. A stage on which a sample is placed was enlargedly photographed together with the mesopore material when they were observed by the transparent type electron microscope. This occurs when an object is observed by the transparent type electron microscope at a high magnification.

As shown in FIGS. 12 and 13, the major axes of the primary particles of the mesopore material FS-1 of the embodiment 1 are in a range of 10 nm–1 μm. As shown in FIGS. 14 and 15, the major axes of the primary particles of the mesopore material FS-2 of the embodiment 2 are in a range of 10 nm–500 nm.

The major axes of the primary particles of both the mesopore materials FS-1 and FS-2 are in the range of 10 nm–1 μm, but the major axes of the primary particles of the mesopore material FS-1 are greater than those of the primary particles of the mesopore material FS-2.

That is, supposing that the other reaction conditions are the same in a reaction of the laminar silicic acid and the alkali metal compound, the particle diameter of the mesopore material becomes smaller by increasing the ratio of the alkali metal compound relative to the laminar silicic acid.

The magnification used in photographing the mesopore material in FIG. 13 was higher than that used in photographing the mesopore material in FIG. 12. As shown in FIG. 13, the mesopore material has a high crystallizability.

As shown in FIGS. 16, 17, 20, 21, 22, and 23, the major axes of the primary particles of the mesopore materials FC-3, FH-5, and FK-6 are also in the range of 10 nm–1 μm. The major axes of the primary particles of these mesopore materials are mostly smaller than 200 nm.

Figure 25:
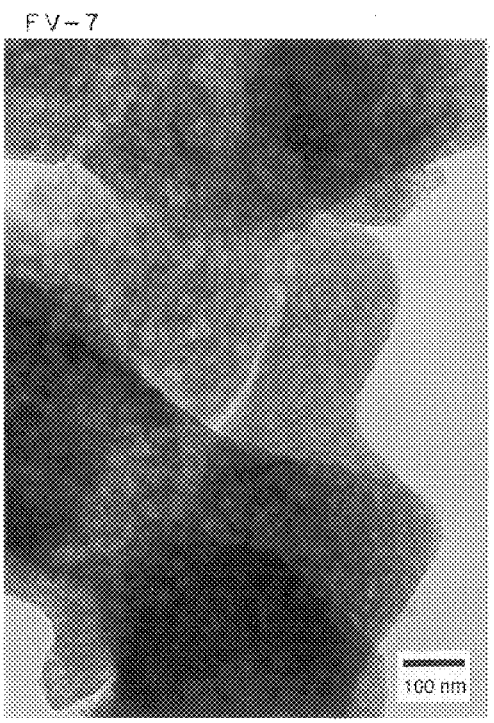
FIG. 25 is a photograph (magnification: 120000) replacing a drawing showing a mesopore material FV-7 (embodiment 7) according to the embodiment 12.
Figure 24:
FIG. 24 is a photograph (magnification: 24000) replacing a drawing showing a mesopore material FV-7 (embodiment 7) according to the embodiment 12.

As shown in FIGS. 24 and 25, the major axes of the primary particles of the mesopore material FV-7 of the embodiment 7 are in a range of 50 nm–2 μm.

As the diameter of the sheet of the laminar silicic acid FV-7 used as the material is 7 μm or more, it is difficult for the hydroxideion to uniformly contact with the tetrahedral sheet of the silicon dioxide. The sheet diameter of the resultant laminar silicic acid salt becomes larger than those of other embodiments. When reacting the aforementioned laminar silicic acid salt with ammonium alkyl salt, the major axes of the primary particles of the thus obtained mesopore material may range from 50 nm to 2 μm.

Figure 19:
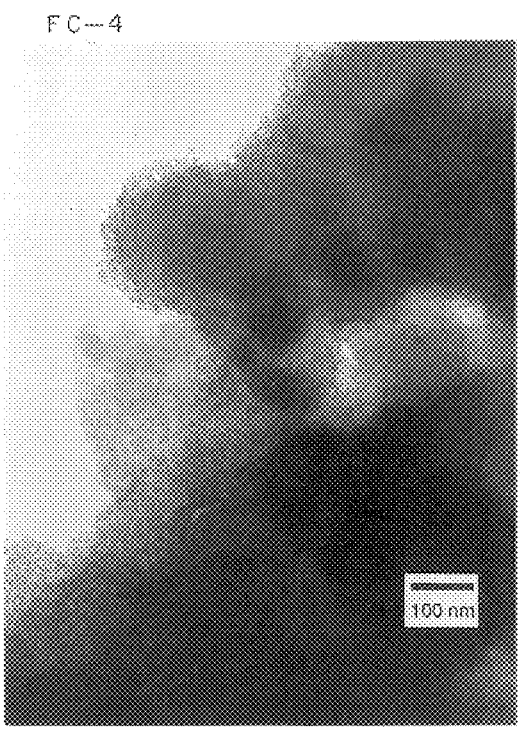
FIG. 19 is a photograph (magnification: 120000) replacing a drawing showing a mesopore material FC-4 (embodiment 4) according to the embodiment 12.
Figure 18:
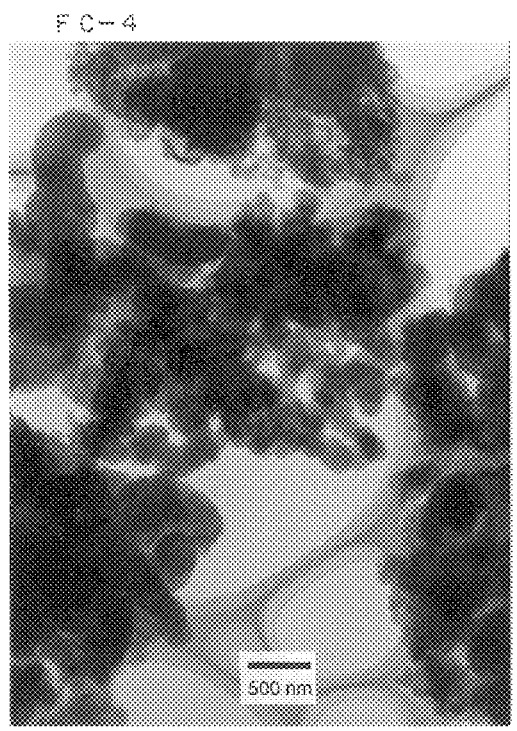
FIG. 18 is a photograph (magnification: 24000) replacing a drawing showing a mesopore material FC-4 (embodiment 4) according to the embodiment 12.
Figure 21:
FIG. 21 is a photograph (magnification: 120000) replacing a drawing showing a mesopore material FH-5 (embodiment 5) according to the embodiment 12.
Figure 20:
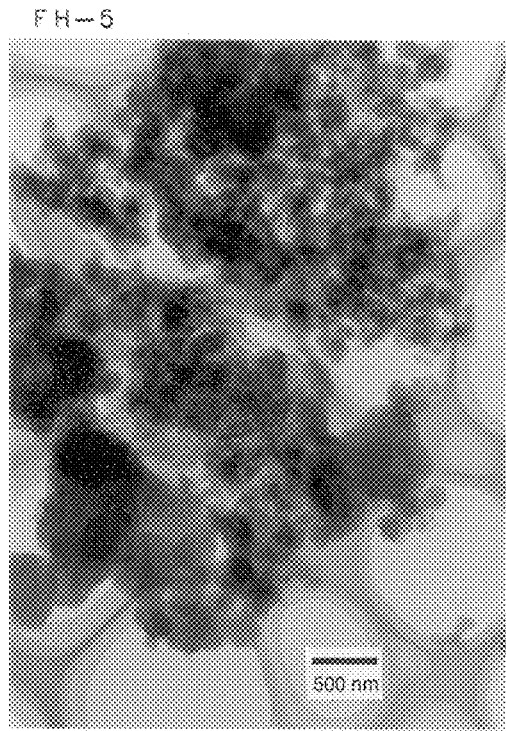
FIG. 20 is a photograph (magnification: 24000) replacing a drawing showing a mesopore material FH-5 (embodiment 5) according to the embodiment 12.
Figure 23:
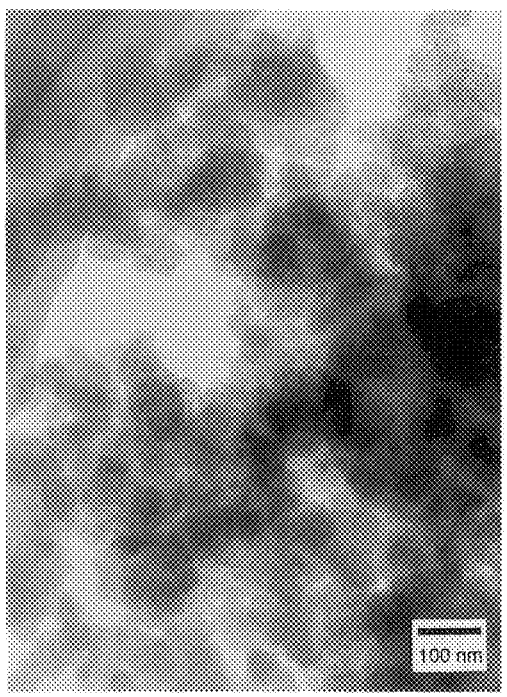
FIG. 23 is a photograph (magnification: 120000) replacing a drawing showing a mesopore material FK-6 (embodiment 6) according to the embodiment 12.
Figure 22:
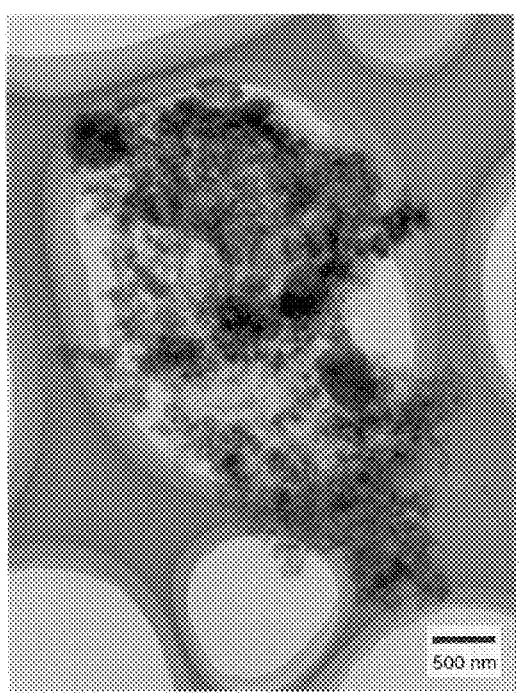
FIG. 22 is a photograph (magnification: 24000) replacing a drawing showing a mesopore material FK-6 (embodiment 6) according to the embodiment 12.

As shown in FIGS. 18 and 19, the major axes of the primary particles of the mesopore material FC-4 of the embodiment 4 are in the range of 10 nm–1 μm.

Comparing the major axis of the primary particles of the mesopore material FC-4 of the embodiment 4 with the major axis of the primary particles of the mesopore material FC-3, the major axis of the former is greater than that of the latter.

That is, supposing that the other reaction conditions are the same in a reaction of the laminar silicic acid and the alkali metal compound, the major axis of particle diameter of the mesopore material becomes smaller by increasing the reaction temperature.

Embodiment 13

In the embodiment 13, using table 2, the dispersibility of the mesopore material FS-2 of the embodiment 2 and that of the conventional mesopore material in organic solvent are compared with each other.

The conventional mesopore material was obtained from kanemite which is synthesized laminar silicate.

The dispersibility test was conducted by putting about 10 mg of a solid sample and about one milliliter of an organic solvent into a test tube of 10 milliliters. After deaeration in a pressure-reduced state by using aspirator, dispersion states were visually observed while the contents were being heated and stirred. Organic solvents S1–S9 were used in the test. Table 2 shows the test result.

In the case of the organic solvents S1, S5, and S7, the dispersibility of the conventional mesopore material and that of the present invention are almost equal to each other.

In the case of the organic solvents S2, S3, S4, S6, S8, and S9, the dispersibility of the mesopore material of the present invention is superior to that of the conventional mesopore material.

Accordingly, the dispersibility of the mesopore material of the present invention is more favorable than that of the conventional mesopore material.

Embodiment 14

The laminar silicic acid and the method of manufacturing the laminar silicic acid according to the embodiment 14 are described below with reference to FIGS. 26 through 28.

As shown in FIGS. 26 and 28, the laminar silicic acid 1 of the embodiment 14 retaining the skeleton of the clay mineral 3 having a 1:1 laminar structure composed of an uninvertible tetrahedral sheet 19 of silicon dioxide and an octahedral sheet 2 of oxide of aluminum that is kaolinite. The laminar silicic acid 1 consists of the laminar silicon dioxide having a laminar six-membered ring skeleton composed of the silicon dioxide and has the crystallographic regularity.

As shown in FIG. 28, the clay mineral 3 comprises the uninvertible tetrahedral sheet 19 of silicon dioxide and the octahedral sheet 2 of the oxide of aluminum. A large number of a pair of one tetrahedral sheet 19 and one octahedral sheet 2 is laminated one upon another.

As shown in FIGS. 28A and 28B, the tetrahedral sheet 19 of silicon dioxide consists of tetrahedrons each having oxygen positioned at apexes 10 thereof and silicon located at the center thereof, thus forming a six-membered ring skeleton skeleton. A large number of tetrahedrons is planely connected with one another, thus forming a sheet-shaped skeleton.

The word "uninvertible" means that the apexes 10 of the tetrahedron 11 of silicon dioxide are oriented in one or the same direction and thus the polarity of the upper surface of the laminar silicic acid 1 is different from that of the lower surface thereof.

As shown in FIG. 28A, the octahedral sheet 2 of the oxide of aluminum consists of octahedrons 21 each having oxygen and hydroxide ions positioned at apexes thereof and aluminum located at the center thereof. A large number of octahedrons 21 is planely connected with one another, thus forming a sheet-shaped skeleton.

Figure 27A:
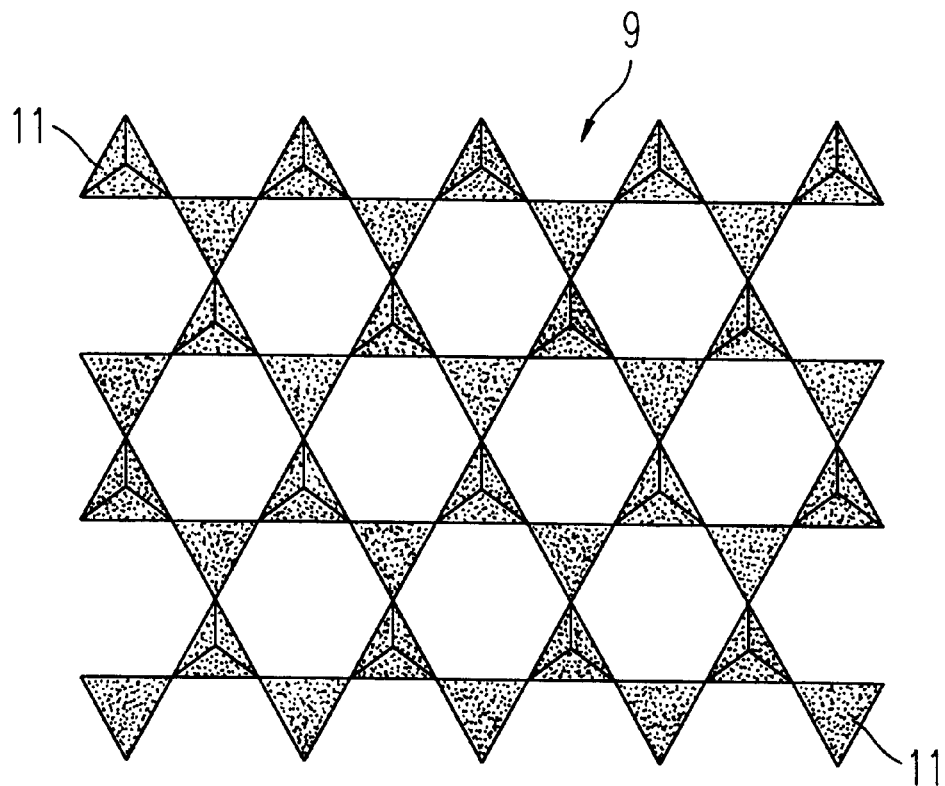
FIG. 27A is an explanatory plan view explaining the structure of a conventional invertible laminar silicic acid in which apexes of a tetrahedron of silicon dioxide are oriented in one direction.
Figure 27B:
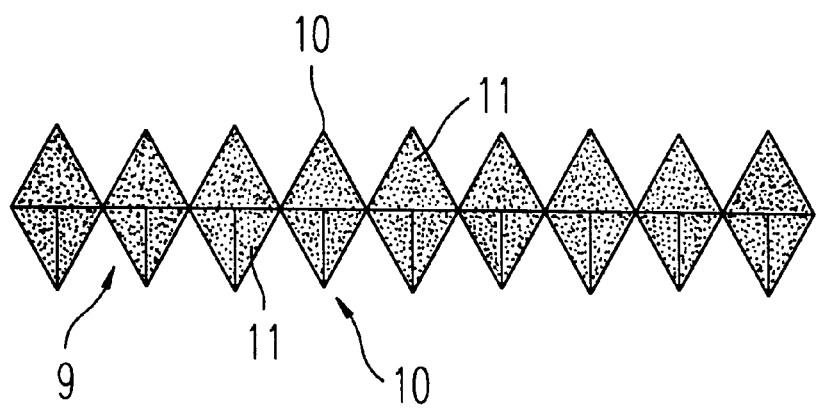
FIG. 27B is an explanatory side view explaining the structure of the conventional laminar silicic acid.

As a reference example, a conventional laminar silicic acid 9 is shown in FIG. 27. Different from the laminar silicic acid 1 of the embodiment 14, the apexes 10 of the tetrahedron 11 of the silicon dioxide of the conventional laminar silicic acid 9 are not oriented to the same direction.

The method of manufacturing the laminar silicic acid of the embodiment 14 is described below.

As the kaolinite which is the clay mineral, kaolin produced in Georgia of U.S.A was used. Initially, a mixture of 25 g of kaolin and 100 milliliters of 12N sulfuric acid was put into each of two autoclaves having Teflon container of 300 milliliters, and the containers were sealed. Then, the contents were heated in a constant-temperature drying oven at 120° C. for 19 hours while the contents were being stirred. After the contents were cooled, a solid product separated from the contents were washed on a funnel by using 1000 milliliters of ion exchange water.

The obtained solid product and 500 milliliters of 1N hydrochloric acid were put into a reflux condenser-equipped separable flask of one liter. Then, the contents were heated in a water bath while the contents were being stirred by the stirring motor at 90° C. for one hour. Then, a solid product separated from the content of the flask was washed on a funnel by using 2000 milliliters of hot ion exchange water and freeze-dried to obtain 24.0 g of a product. The product is hereinafter referred to as NK-1p.

It was confirmed by an elemental analysis made in the embodiment 22 which is described later that the product was silicic acid composed mainly of silicon. Further, a photographic observation by means of the transparent type electron microscope made in the embodiment 24 which will be described later indicated that the skeleton of the silicate contained in the clay mineral remained in the product NK-1p. In addition, an observation of the X-ray diffraction pattern in the embodiment 23 which will be described later revealed that the product NK-1p had the crystallographic regularity.

From the above, it was confirmed that the product NK-1p was the laminar silicic acid of the embodiment 14.

The operation and effect of the embodiment 14 are described below.

The skeleton of the clay mineral 3 having the structure shown in FIG. 28 remains in the laminar silicic acid 1 of the embodiment 14. That is, as shown in FIG. 26, the laminar silicic acid 1 is composed of the laminar silicon dioxide having the six-membered ring skeleton of the silicon dioxide. The skeleton of the silicon dioxide constituting the laminar silicon dioxide consists of the skeleton of the silicon dioxide present in the clay mineral 3.

As shown in FIG. 28, the clay mineral 3 comprises the tetrahedron sheet 19 of the silicon dioxide and the octahedral sheet 2 of the oxide of aluminum. The apexes 10 of the tetrahedron 11 of the silicon dioxide composing the tetrahedral sheet 19 of the silicon dioxide are oriented toward the tetrahedral sheet 2. Thus, as shown in FIG. 26, the apexes 10 of the tetrahedron 11 of the silicon dioxide constituting the laminar silicic acid 1 of the present invention in which the skeleton of the silicon dioxide remained are oriented to the same direction.

Therefore, unlike the conventional laminar silicic acid, the polarity on the upper surface of the layer of the laminar silicic acid 1 is different from that on the lower surface of the layer thereof and the polarity is uniform interlaminarly. Therefore, the laminar silicic acid 1 acts as a laminar contact-packing host, i.e., it is capable of packing a guest compound between layers thereof, with the guest compound orienting to one direction. For example, the laminar silicic acid 1 can be utilized as a carrier and adsorbing agent for carrying or adsorbing catalyst, pigment, medicine, and the like depending on the size and orientation thereof.

Because the laminar silicic acid is manufactured from natural kaolinite uniform in size and configuration, with the skeleton thereof maintained, the laminar silicic acid is uniform in its size and configuration.

Thus, the laminar silicic acid which is novel can be utilized as a favorable catalyst carrier and adsorbing agent, thus displaying catalyzing and adsorbing actions uniformly.

Therefore, according to the embodiment 14, the laminar silicic acid consists of uninvertible tetrahedral sheet and is uniform in its size and configuration.

Embodiment 15

In the embodiment 15, at the atmospheric pressure, acid acted on chrysotile which is a clay mineral having a 1:1 laminar structure consisting of an uninvertible tetrahedral sheet of silicon dioxide and an octahedral sheet of oxide of magnesium to manufacture laminar silicic acid having crystallographic regularity.

As the chrysotile, Calidri Asbestos H. P. P. manufactured by Union Carbide Corp. was used.

b 200g of chrysotile pulverized with a mortar and 2000 milliliters of 3N hydrochloric acid were put into a reflux condenser-equipped separable flask of two liters. The contents were heated in a water bath at 90° C. for four hours while the contents were being stirred by the stirring motor.

Then, a solid product was separated from the heated contents in the flask by filtration and washed on a funnel by using 1000 milliliters of 1N hydrochloric acid heated to about 70° C.–90° C. and 2000 milliliters of ion exchange water heated to about 70° C.–90° C.

The resulting solid product and 1200 milliliters of 1N hydrochloric acid were put into the reflux condenser-equipped separable flask of two liters. The contents were heated in a water bath at 90° C. for one hour while the contents were being stirred by the stirring motor.

Then, a solid product separated from the contents in the flask by filtration was washed on a funnel by using 2000 milliliters of hot ion exchange water and freeze-dried to obtain 84.5 g of a product. The product is hereinafter referred to as NC-2a.

It was confirmed by an elemental analysis made in the embodiment 22 which is described later that the product was silicic acid composed mainly of silicon. Further, a photographic observation by means of the transparent type electron microscope indicated that the skeleton of the silicate contained in the clay mineral remained in the product NC-2a. In addition, an observation of the X-ray diffraction pattern in the embodiment 23 which will be described later revealed that the product NC-2a had the crystallographic regularity.

From the above, it was confirmed that the product NC-2a was the laminar silicic acid of the embodiment 15.

Embodiment 16

In the embodiment 16, under a pressurized condition, acid acted on chrysotile which is a clay mineral having a 1:1 laminar structure consisting of an uninvertible tetrahedral sheet of silicon dioxide and an octahedral sheet of oxide of magnesium to manufacture laminar silicic acid not having the crystallographic regularity.

As the chrysotile, the same one as that used in the embodiment 15 was used.

Initially, 20 g of the chrysotile pulverized with a mortar and 40 milliliters of 12N sulfuric acid were put into an autoclave having a Teflon container of 100 milliliters and the container was sealed. Then, the contents were heated in a constant-temperature drying oven at 120° C. for 19 hours while the contents were being stirred. After the contents were cooled, a solid product separated by filtration from the contents in the container was washed on a funnel by using 600 milliliters of ion exchange water.

The resulting solid product and 350 milliliters of 1N hydrochloric acid were put into the reflux condenser-equipped separable flask of 500 milliliters. The contents were heated in a oil bath at 100° C. for one hour while the contents were being stirred by the stirring motor. Then, a solid product separated from the contents in the flask by filtration was washed on a funnel by using 500 milliliters of hot ion exchange water and freeze-dried to obtain 3.4 g of a product. The product is hereinafter referred to as NC-3p.

It was confirmed by an elemental analysis made in the embodiment 22 which is described later that the product was silicic acid composed mainly of silicon. Further, a photographic observation by means of the transparent type electron microscope made in the embodiment 24 which will be described later indicated that the skeleton of the silicate contained in the clay mineral remained in the product NC-3p. In addition, an observation of the X-ray diffraction pattern in the embodiment 23 which will be described later revealed that the product NC-3p did not have the crystallographic regularity.

From the above, it was confirmed that the product NC-3p was the laminar silicic acid of the embodiment 16.

Embodiment 17

In the embodiment 17, at the atmospheric pressure, acid acted on kaolinite which is a clay mineral having a 1:1 laminar structure consisting of an uninvertible tetrahedral sheet of silicon dioxide and an octahedral sheet of oxide of aluminum to manufacture laminar silicic acid not having the crystallographic regularity.

As the kaolinite, the same one as that used in the embodiment 14 was used.

Initially, 50.0 g of the kaolinite and 200 milliliters of 12N sulfuric acid were put into a reflux condenser-equipped separable flask of 500 milliliters. Then, the contents were heated in a oil bath at 120° C. for 19 hours while the contents were being stirred by the stirring motor. A solid product separated by filtration from the heated contents in the flask was washed on a funnel at about 70–90° C. by using 300 milliliters of hot ion exchange water.

Then, the resulting solid product and 500 milliliters of 1N hydrochloric acid were put into the reflux condenser-equipped separable flask of 500 milliliters. The contents were heated in a water bath at 90° C. for one hour while the contents were being stirred by the stirring motor. Then, a solid product separated by filtration from the content in the flask was washed on a funnel by using 500 milliliters of hot ion exchange water and freeze-dried to obtain 21.6 g of a product. The product is hereinafter referred to as NK-4a.

It was confirmed by an elemental analysis made in the embodiment 22 which is described later that the product was silicic acid composed mainly of silicon. Further, a photographic observation made by means of the transparent type electron microscope indicated that the skeleton of the silicate contained in the clay mineral remained in the product NK-4p. In addition, an observation of the X-ray diffraction pattern in the embodiment 23 which will be described later revealed that the product NK-4p did not have the crystallographic regularity.

From the above, it was confirmed the resulting product was the laminar silicic acid of the embodiment 17.

Embodiment 18

In the embodiment 18, at the atmospheric pressure, acid acted on hectorite which is a clay mineral having a 2:1 laminar structure consisting of an uninvertible tetrahedral sheet of silicon dioxide and an octahedral sheet of oxide of magnesium to manufacture laminar silicic acid not having the crystallographic regularity.

As shown in FIG. 29, the clay mineral 4 is composed of an uninvertible tetrahedral sheet 19 of the silicon dioxide and an octahedral sheet 2 of oxide of magnesium. The tetrahedral sheet 19 is laminated on the upper and lower surfaces of the octahedral sheet 2. The clay mineral 4 is composed of a large number of groups each consisting of two tetrahedral sheets 19 and one octahedral sheet 2.

The method of manufacturing the laminar silicic acid of the embodiment 18 is described below.

As the hectorite, a standard sample of the US clay society was used.

Initially, 200.5 g of the hectorite and 1600 milliliters of 3N hydrochloric acid were put into a reflux condenser-equipped separable flask of two liters. Then, the contents were heated at 30° C. in a water bath for 0.5 hours. Then, the contents were heated in a water bath at 90° C. for four hours while they were being stirred by the stirring motor.

A solid product separated by filtration from the hot content in the flask was washed on a funnel at 70–90° C. by using 1000 milliliters of 1N hydrochloric acid and 2000 milliliters of hot ion exchange water.

The resulting solid product and 1600 milliliters of 1N hydrochloric acid were put into the reflux condenser-equipped separable flask of two liters. The contents were heated in a water bath at 90° C. for one hour while the contents were being stirred by the stirring motor.

Then, a solid product separated by filtration from the content in the flask was washed on a funnel by using 3000 milliliters of hot ion exchange water and then freeze-dried to obtain 72.6 g of a product. The product is hereinafter referred to as NH-5a.

It was confirmed by an elemental analysis made in the embodiment 22 which is described later that the product was silicic acid composed mainly of silicon. Further, a photographic observation by means of the transparent type electron microscope indicated that the skeleton of the silicate contained in the clay mineral remained in the product NH-5a. In addition, an observation of X-ray diffraction pattern in the embodiment 23 which will be described later revealed that the product NK-1p did not have the crystallographic regularity.

From the above, it was confirmed the resulting product was the laminar silicic acid of the embodiment 18.

Embodiment 19

In the embodiment 19, at the atmospheric pressure, acid acted on vermiculite which is clay mineral sheet-shaped and has a 2:1 laminar structure composed of an uninvertible tetrahedral sheet of silicon dioxide and an octahedral sheet of oxide of aluminum, iron, and magnesium to manufacture laminar silicic acid not having the crystallographic regularity.

The vermiculite used in the embodiment 19 was serpentine produced in the People's Republic of China.

Initially, 40.0 g of the vermiculite was put in a beaker of 500 milliliters. Then, 100 milliliters of 30% hydrogen peroxide solution was put into the beaker for acid treatment. Consequently, volume of the vermiculite was expanded owing to heat generated by this oxidation.

The beaker was left at the room temperature for an hour and then left in a constant-temperature dryer for three days to mature the reaction of the contents. The reason of the expansion of the vermiculite is as follows: The interval between layers thereof was expanded and the layers thereof were separated from each other owing to the boiled water present interlaminarly caused by the heat generated by the iron contained in the vermiculite when it was oxidized.

The vermiculite having been subjected to oxidation and 1200 milliliters of 3N hydrochloric acid were put into a reflux condenser-equipped separable flask of two liters so that the contents were heated in hot water bath at 95° C. for eight hours, while the contents were being stirred by the stirring motor.

The contents of the flask were separated from each other by filtration. The obtained solid product was washed on the funnel by using 600 milliliters of hot 1N hydrochloric acid heated to about 70° C.–90° C. and 800 milliliters of hot ion exchange water.

The washed solid product and 400 milliliters of 1N hydrochloric acid were put into the reflux condenser-equipped separable flask of two liters so that the contents were heated in water bath at 90° C. for one hour while the contents were being stirred by the stirring motor.

Then, a solid product separated from the contents in the flask by filtration was washed on the funnel by using 2000 milliliters of hot ion exchange water. Then, the solid product was freeze-dried to obtain 14.7 g of a product.

The obtained product is hereinafter referred to as NV-6a.

It was confirmed by an elemental analysis made in the embodiment 22 which is described later that the product was silicic acid composed mainly of silicon. Further, a photographic observation made by means of the transparent type electron microscope in the embodiment 24 which is described later indicated that the skeleton of the silicate contained in the clay mineral remained in the product NV-6a. In addition, an observation of the X-ray diffraction pattern in the embodiment 23 which will be described later revealed that the product NV-6a did not have the crystallographic regularity.

From the above, it was confirmed the resulting product was the laminar silicic acid of the embodiment 19.

Embodiment 20

In the embodiment 20, under a pressurized condition, acid acted on vermiculite which is clay mineral sheet-shaped and has a 2:1 laminar structure composed of an uninvertible tetrahedral sheet of silicon dioxide and an octahedral sheet of oxide of aluminum, iron, and magnesium to manufacture laminar silicic acid not having the crystallographic regularity. The method of manufacturing the laminar silicic acid is described below.

The vermiculite used in the embodiment 20 was the same as that used in the embodiment 19.

Initially, 25.0 g of the vermiculite was put in a beaker of 500 milliliters for oxidation, similarly to the embodiment 19.

Half of the whole amount of the vermiculite having been subjected to oxidation 200 milliliters of 12N sulfuric acid were put into an autoclave having a 300 milliliter-container made of Teflon, and the container was sealed. Then, the contents were heated in a constant-temperature dryer at 120° C. for 19 hours, while the contents were being stirred. After the contents were cooled, a solid product separated by filtration from the contents in the container was washed on a funnel by using 600 milliliters of ion exchange water.

The resulting solid product and 800 milliliters of 1N hydrochloric acid were put into the reflux condenser-equipped separable flask of one liter. The contents were heated in a water bath at 100° C. for one hour while the contents were being stirred by the stirring motor.

Then, a solid product separated by filtration from the contents in the flask was washed on a funnel by using 2000 milliliters of hot ion exchange water and freeze-dried to obtain 5.1 g of a product. The product is hereinafter referred to as NV-7p.

It was confirmed by an elemental analysis made in the embodiment 22 which is described later that the product was silicic acid composed mainly of silicon. Further, a photographic observation made by means of the transparent type electron microscope in the embodiment 24 which is described later indicated that the skeleton of the silicate contained in the clay mineral remained in the product NV-7p. In addition, an observation of the X-ray diffraction pattern in the embodiment 23 which will be described later revealed that the product NV-7p did not have the crystallographic regularity.

From the above, it was confirmed the resulting product was the laminar silicic acid of the embodiment 20.

Embodiment 21

In the embodiment 21, an alkali metal compound acted on the laminar silicic acid obtained in the embodiment 15 to manufacture laminar silicate.

Initially, 10 g of the laminar silicic acid NC-2a obtained in the embodiment 15 was put in a 500-milliliter beaker made of plastic. Then, 200 milliliters of ion exchange water was added to the laminar silicic acid NC-2a. Then the contents were stirred by a magnetic stirrer at the room temperature to disperse the laminar silicic acid NC-2a in the ion exchange water.

300 milliliters of 1N sodium hydroxide was added to the dispersion liquid, and the contents were stirred at the room temperature for 30 minutes. The reaction contents were dialyzed for a day by ion exchange water and freeze-dried to obtain 10.5 g of a product.

It was confirmed by an elemental analysis that the product was silicate composed mainly of silicon and sodium. Further, a photographic observation made by means of the transparent type electron microscope indicated that the skeleton of the silicate contained in the clay mineral remained in some extent in the product.

It was also confirmed that the product was the laminar silicate of the embodiment 21.

Embodiment 22

In the embodiment 22, elemental analyses were carried out on the clay minerals used as the material of the laminar silicic acids and the products obtained in the embodiments 14 through 20.

Tables 3 and 4 show atom % of Al, Fe, Mg, and Ti relative to silicon atom (Si), namely, the percentage of metal atoms constituting the octahedron of the laminar silicic acid.

As indicated in tables 3 and 4, the percentage of the metal atoms contained in the clay mineral and constituting the octahedron is reduced to less than five atom % relative to the silicon atom when the clay mineral is treated with acid at the atmospheric pressure or in a pressurized condition.

But only the amount of the metal atoms which remained in the obtained silicic acid was not enough to determine whether the silicic acid had the crystallographic regularity.

Table 3

Table 4

Embodiment 23

In the embodiment 23, the X-ray diffraction pattern of the clay mineral used as the material of the laminar silicic acid and that of the laminar silicic acid obtained by treating the clay mineral with acid were observed.

FIGS. 30 through 40 show the X-ray diffraction pattern, of each kind of clay mineral, based on which whether or not each laminar silicic acid had the crystallographic regularity was examined.

Figure 30:
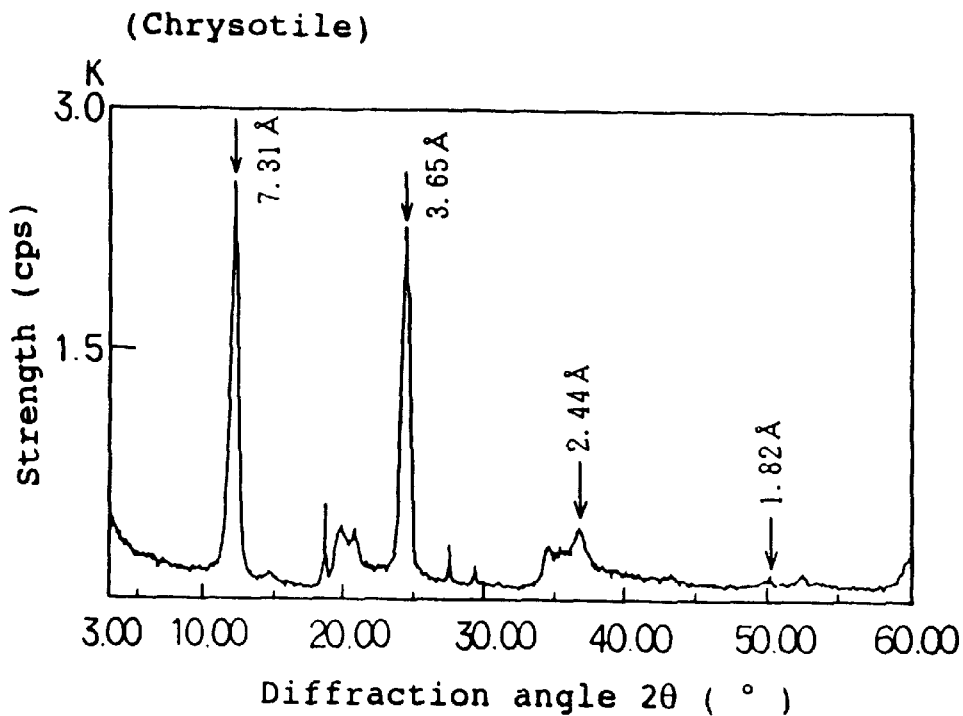
FIG. 30 is a diagram showing an X-ray diffraction pattern of chrysotile according to an embodiment 23.
Figure 31:
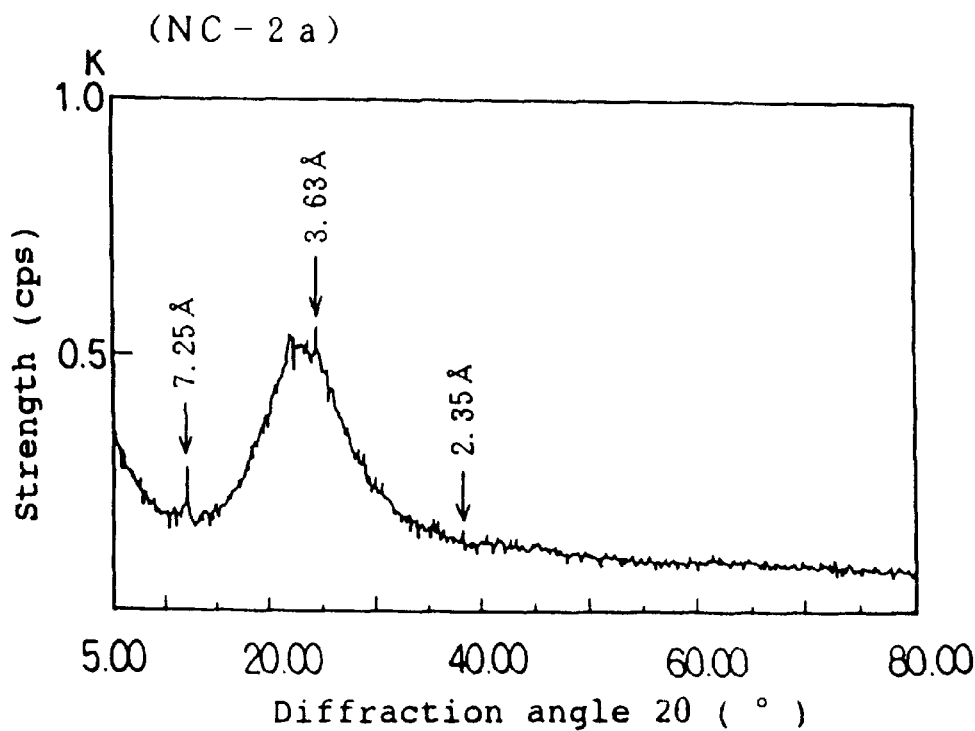
FIG. 31 is a diagram showing an X-ray diffraction pattern of NC-2a according to the embodiment 23.
Figure 32:
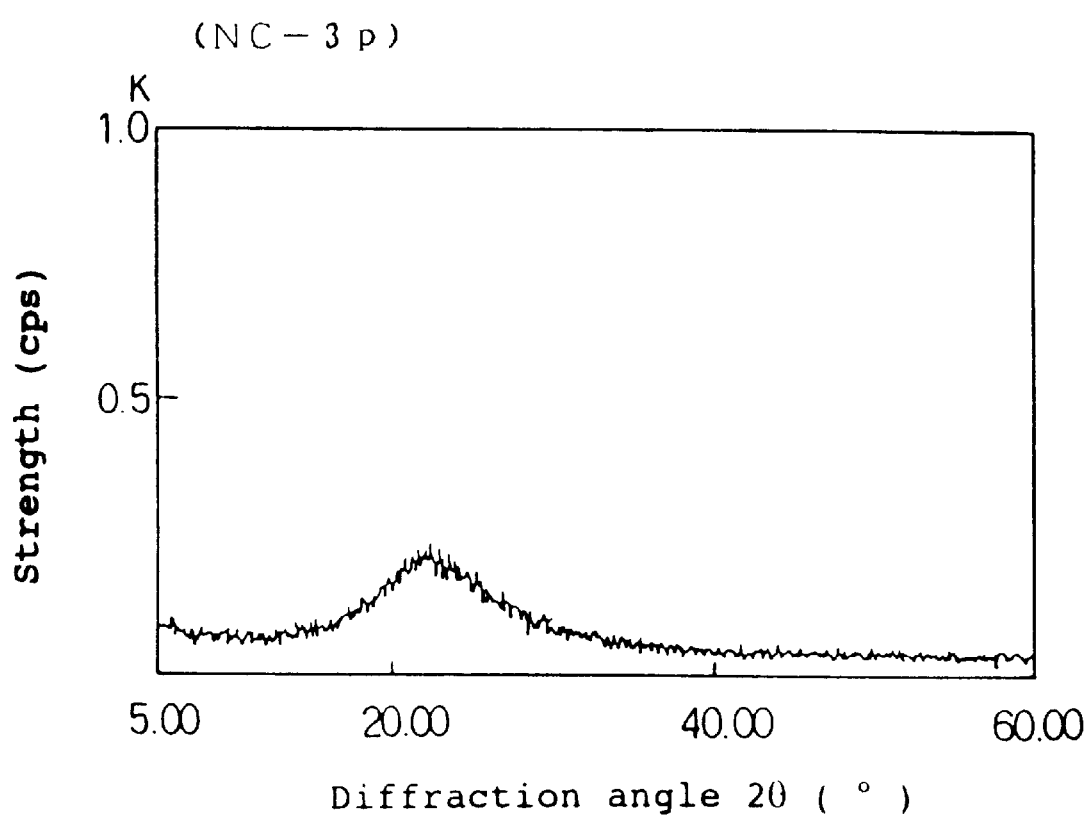
FIG. 32 is a diagram showing an x-ray diffraction pattern of NC-3p according to the embodiment 23.

FIG. 30 shows the X-ray diffraction pattern of chrysotile. FIG. 31 shows the X-ray diffraction pattern of the laminar silicic acid NC-2a obtained in the embodiment 15. FIG. 32 shows the X-ray diffraction pattern of the laminar silicic acid NC-3p obtained in the embodiment 16.

In the X-ray diffraction pattern of the laminar silicic acid NC-2a shown in FIG. 31, three peaks (7.25 Å, 3.63 Å, 2.35 Å) having a regularity in the direction in which layers were ax laminated on each other were observed, similarly to the X-ray diffraction pattern (see FIG. 30) of the chrysotile.

In the X-ray diffraction pattern of the laminar silicic acid NC-3p shown in FIG. 32, only a broad hollow peak was observed and peaks based on the crystallographic regularity were not observed.

Figure 33:
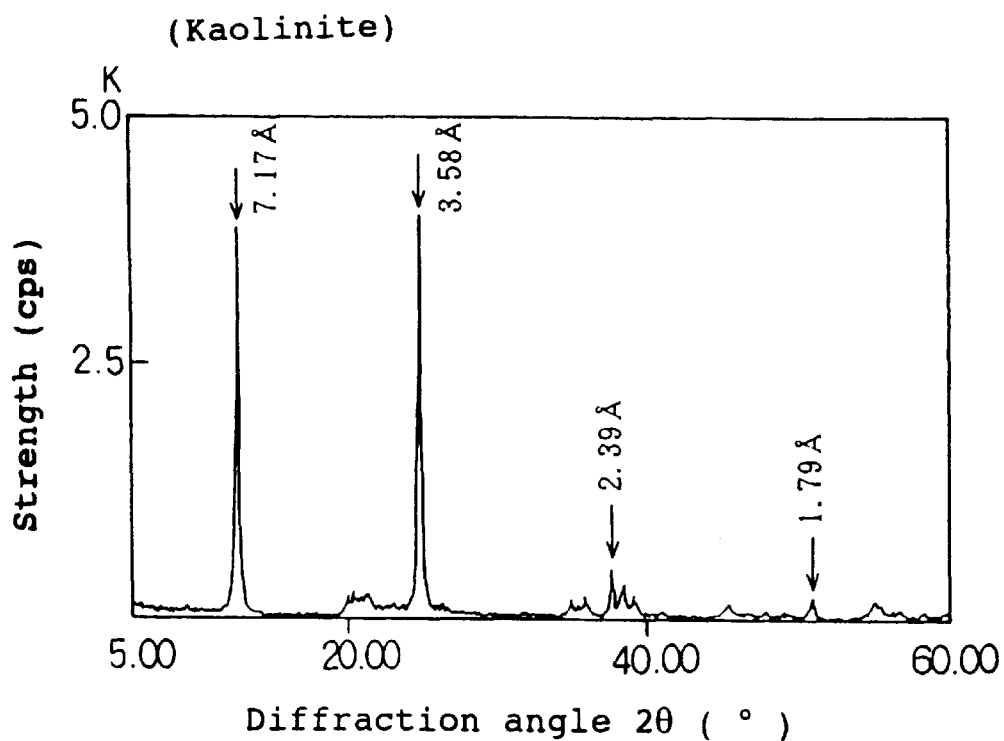
FIG. 33 is a diagram showing an X-ray diffraction pattern of kaolinite according to the embodiment 23.
Figure 34:
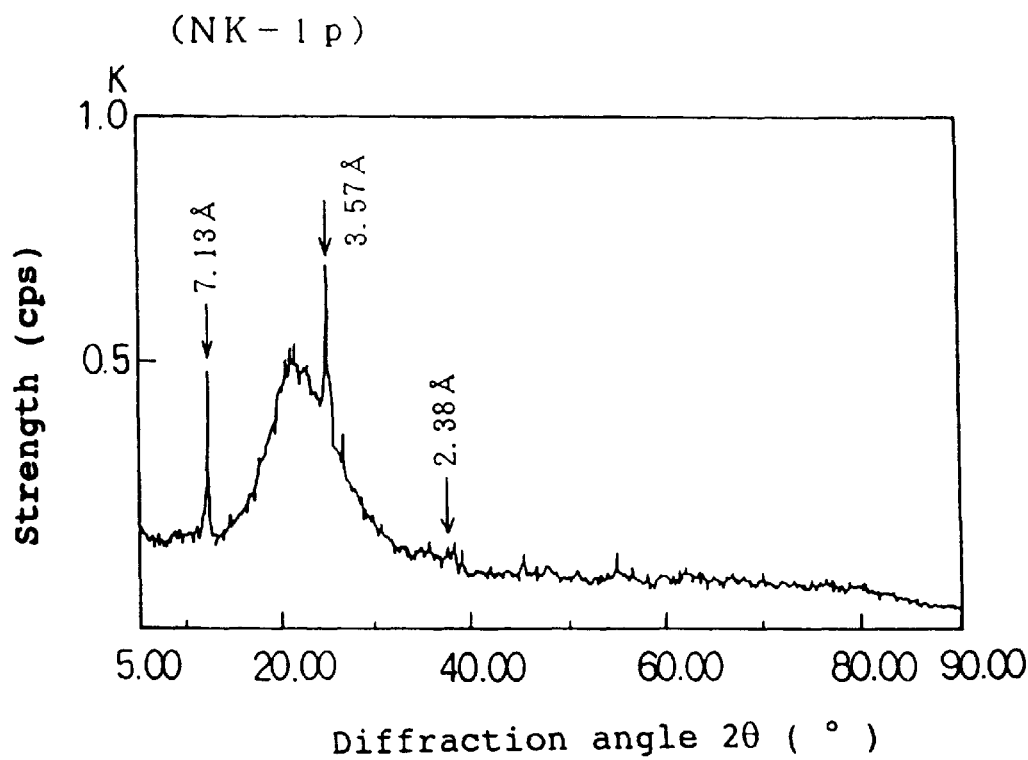
FIG. 34 is a diagram showing an X-ray diffraction pattern of NK-1p according to the embodiment 23.
Figure 35:
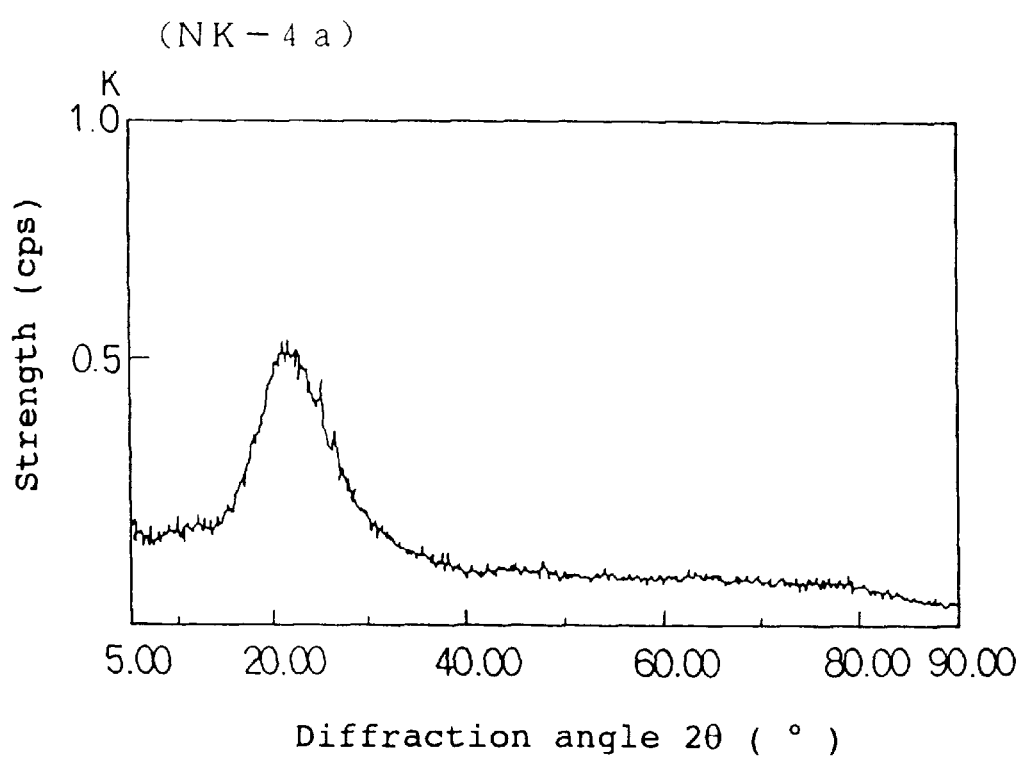
FIG. 35 is a diagram showing an X-ray diffraction pattern of NK-4a according to the embodiment 23.

FIG. 33 shows the X-ray diffraction pattern of kaolinite. FIG. 34 shows the X-ray diffraction pattern of the laminar silicic acid NK-1a obtained in the embodiment 14. FIG. 35 shows the X-ray diffraction pattern of the laminar silicic acid NK-4a obtained in the embodiment 17.

In the X-ray diffraction pattern of the laminar silicic acid NK-1p shown in FIG. 34, three peaks (7.13 Å, 3.57 Å, 2.38 Å) having a regularity in the direction in which layers were laminated on each other were observed, similarly to the X-ray diffraction pattern (see FIG. 33) of the kaolinite.

In the X-ray diffraction pattern of the laminar silicic acid NK-4a shown in FIG. 35, only a broad hollow peak was observed and peaks based on the crystallographic regularity were not observed.

Figure 36:
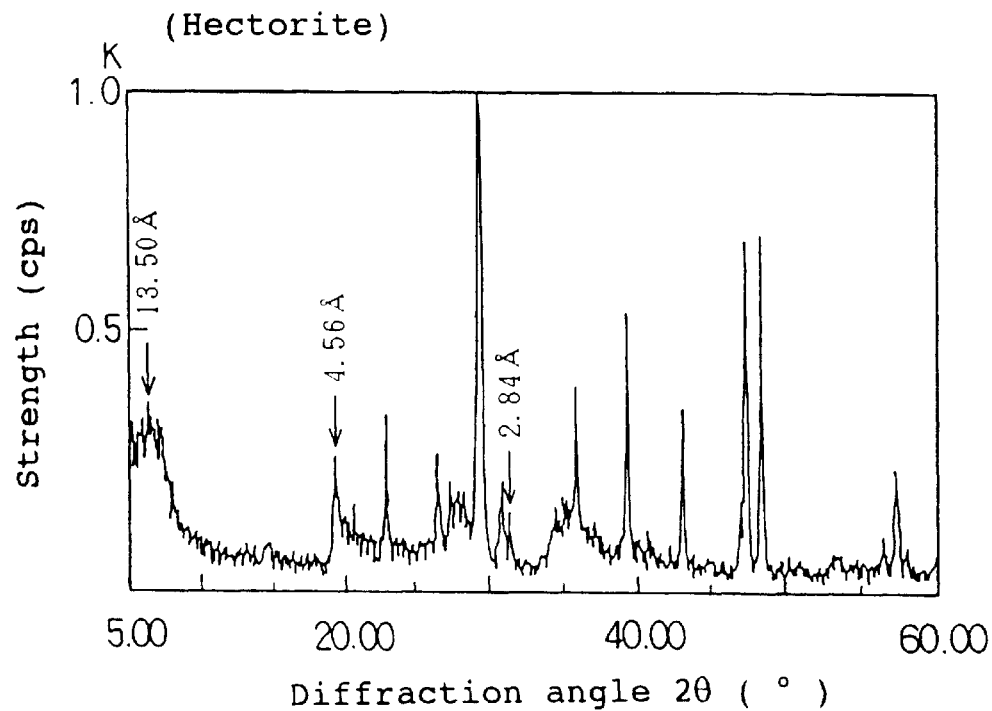
FIG. 36 is a diagram showing an X-ray diffraction pattern of hectorite according to the embodiment 23.
Figure 37:
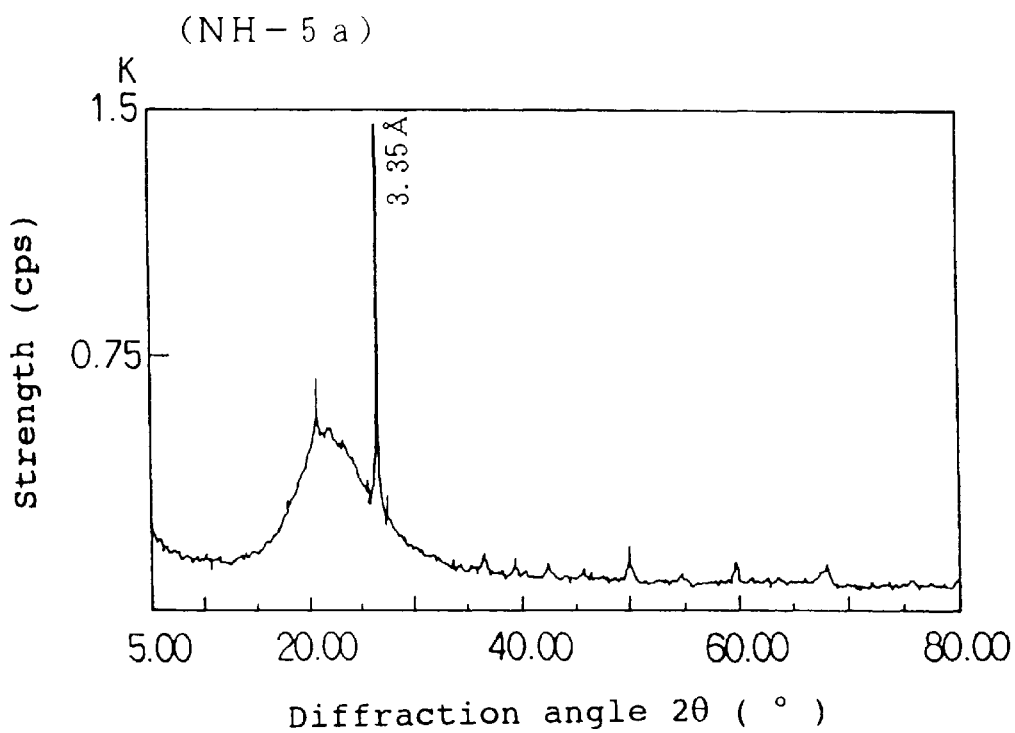
FIG. 37 is a diagram showing an X-ray diffraction pattern of NH-5a according to the embodiment 23.

FIG. 36 shows the X-ray diffraction pattern of hectorite. FIG. 37 shows the X-ray diffraction pattern of the laminar silicic acid NH-5a obtained in the embodiment 18.

In the X-ray diffraction pattern of the laminar silicic acid NH-5a shown in FIG. 37, peaks as observed in the X-ray diffraction pattern (see FIG. 35) were not observed, but only a broad hollow peak was observed. Accordingly, it was confirmed that the laminar silicic acid NH-5a did not have the crystallographic regularity.

In the X-ray diffraction pattern of the hectorite shown in FIG. 36, a peak of calcium carbonate contained therein was observed in addition to the peaks based on the crystalline structure of the hectorite.

In the X-ray diffraction pattern of the laminar silicic acid NH-5a shown in FIG. 37, a peak of 3.35 Å and several small peaks observed were based on a-quartz contained in the material thereof.

Figure 38:
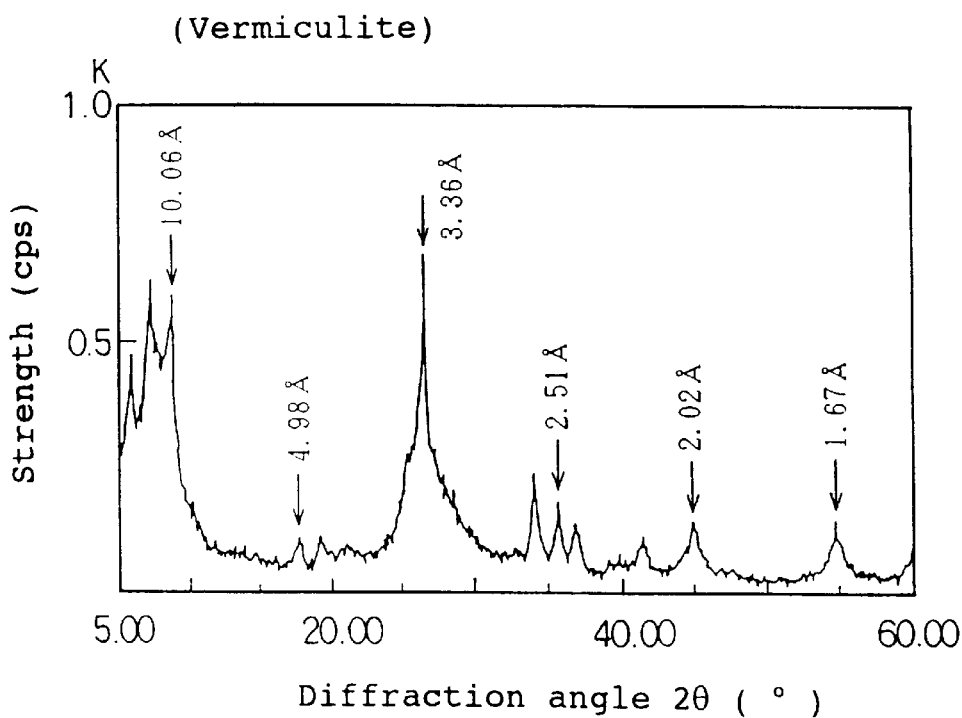
FIG. 38 is a diagram showing an X-ray diffraction pattern of vermiculite according to the embodiment 23.
Figure 39:
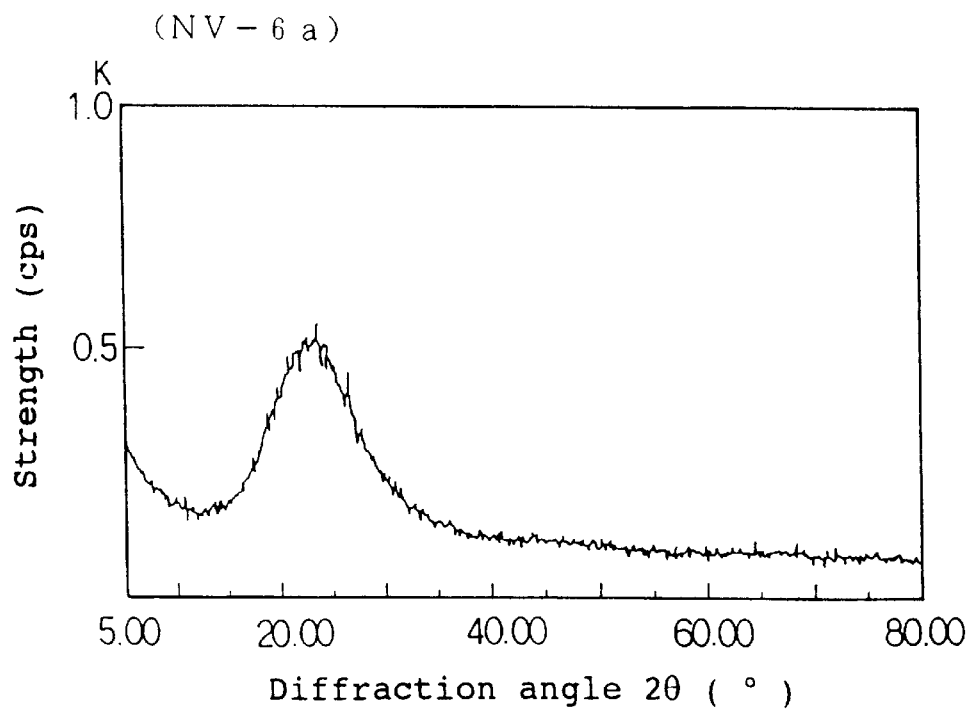
FIG. 39 is a diagram showing an X-ray diffraction pattern of NV-6a according to the embodiment 23.
Figure 40:
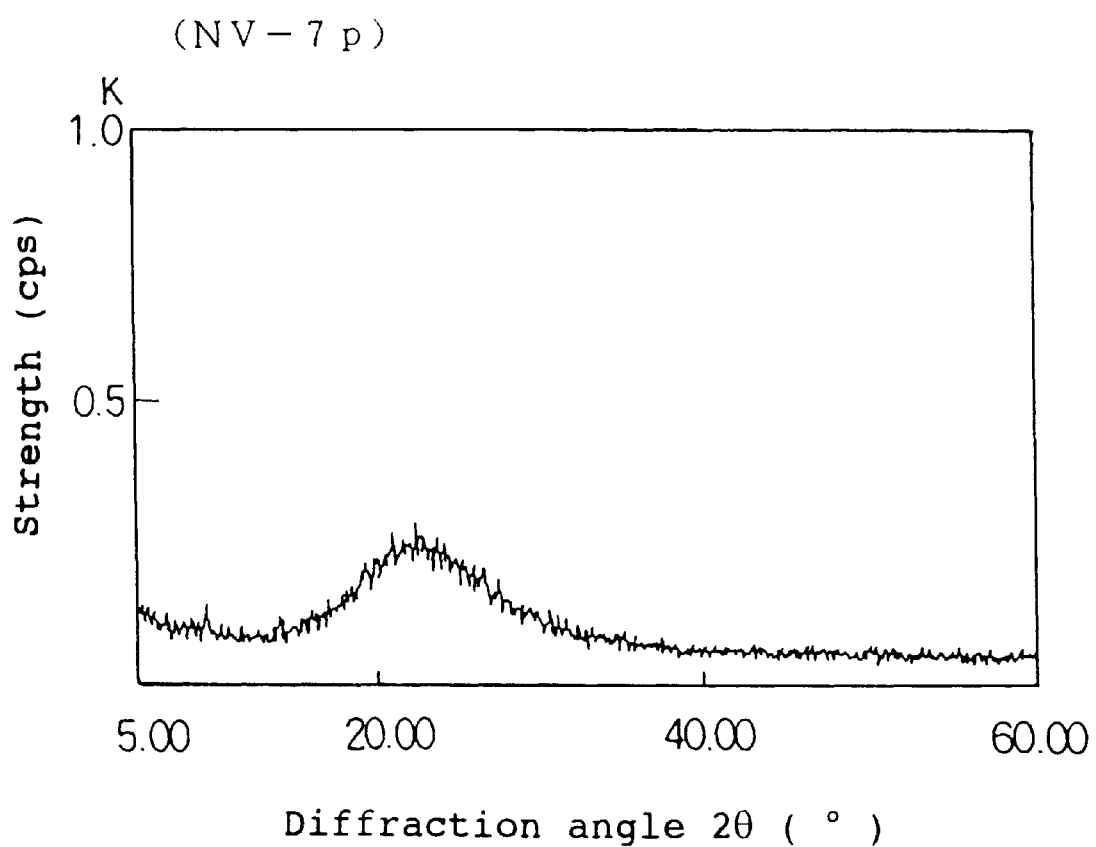
FIG. 40 is a diagram showing an X-ray diffraction pattern of NV-7p according to the embodiment 23.

FIG. 38 shows the X-ray diffraction pattern of the vermiculite. FIG. 39 shows the X-ray diffraction pattern of the laminar silicic acid NV-6a obtained in the embodiment 19. FIG. 40 shows the X-ray diffraction pattern of the laminar silicic acid NV-7p obtained in the embodiment 20.

In the X-ray diffraction pattern of the laminar silicic acid NV-6a shown in FIG. 39 and that of laminar silicic acid NV-7p shown in FIG. 40, peaks based on the regularity oriented in the direction in which layers were laminated on each other were not observed, unlike the X-ray diffraction pattern (see FIG. 38) of the vermiculite, but only a broad hollow peak was observed. Accordingly, it was confirmed that the laminar silicic acid NV-6a and NV-6p did not have the crystallographic regularity.

Embodiment 24

In the embodiment 24, the products obtained in the embodiments 14, 16, 19, and 20 were photographically observed by the transparent type electron microscope.

Figure 42:
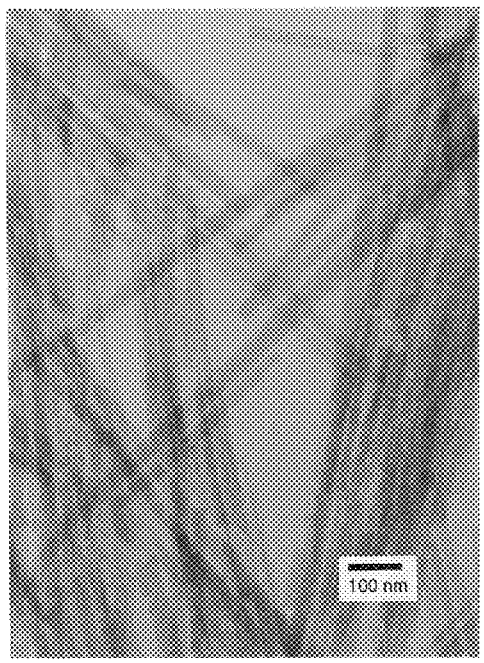
FIG. 42 is a photograph (magnification: 120000) replacing a drawing showing an NC-3p according to the embodiment 24.
Figure 41:
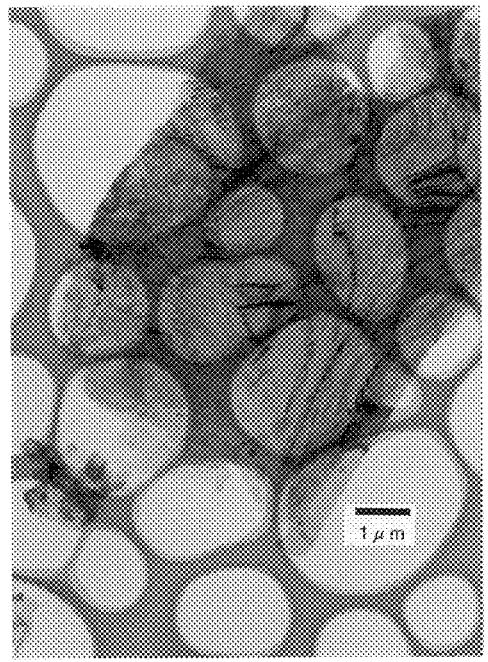
FIG. 41 is a photograph (magnification: 12000) replacing a drawing showing an NK-1p according to an embodiment 24.
Figure 44:
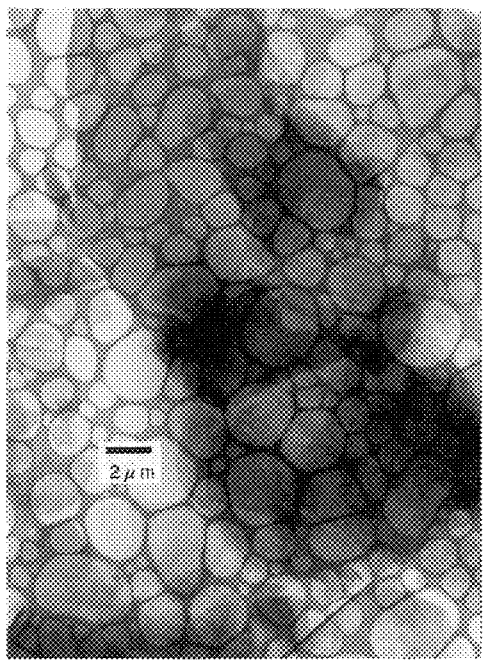
FIG. 44 is a photograph (magnification: 6000) replacing a drawing showing an NV-7p according to the embodiment 24.
Figure 43:
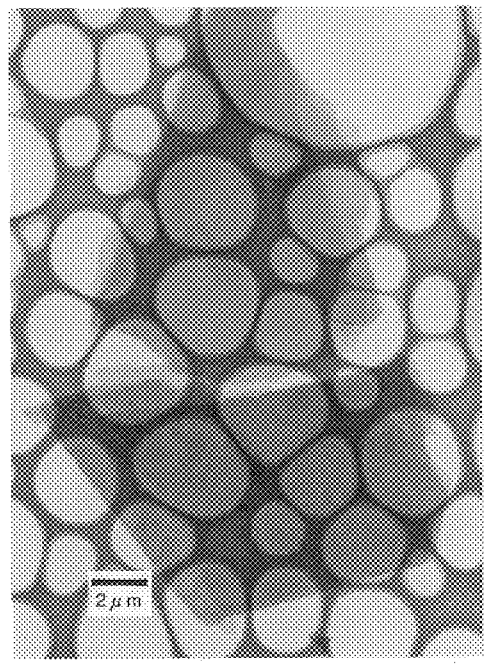
FIG. 43 is a photograph (magnification: 6000) replacing a drawing showing an NV-6a according to the embodiment 24.

FIG. 41 shows the product NK-1p of the embodiment 14.
FIG. 42 shows the product NC-3p of the embodiment 16.
FIG. 43 shows the product NV-6a of the embodiment 19.
FIG. 44 shows the product NV-7p of the embodiment 20.

As shown in FIG. 41, the product NK-1p has a laminar structure consisting of a plurality of sheets each having a diameter of about 10 μm. It was confirmed that the sheets were uniform in size and that the skeleton of the silicon dioxide sheets contained in the kaolinite remained in the product NK-1p. Because moire is seen in the photograph, it was confirmed that the product NK-1p had a regular laminar structure.

In FIG. 41, reticulate objects and a grey thin sheet overlapping thereon are observed.

The thin sheet is the product NK-1p. The reticulate objects (a plurality of circles on grey background) is a stage on which the product NK-1p was placed. Therefore, the reticulate objects were enlargedly photographed together with the product NK-1p through the transparent type electron microscope. This occurs when an object is observed by the transparent type electron microscope at a high magnification.

The thin sheet looks as though it consists of one piece, but actually, a plurality of sheets is laminated one upon another. This applies to other photographs.

Referring to FIG. 42, the product NC-3p has a laminar structure composed of a band-shaped sheet wound in the form of a rod or a tube of having a diameter of about 30 nm. The photograph indicates that the diameters of the product NC-3p are equal to each other and that the skeleton of the silicon dioxide sheets contained in the chrysotile which was used as the material of the product NC-3p remained therein.

Referring to FIG. 43, the product NV-6a has a laminar structure composed of a plurality of sheets each having a diameter of about 7–11 μm. The photograph indicates that the sizes of the product NV-6a are equal to each other and that the skeleton of the silicon dioxide sheets contained in the vermiculite which was used as the material of the product NV-6a remained therein. In the photograph of the product NV-6a, moire based on the regular laminar structure is not seen, unlike the product NK-1p. That is, it was confirmed that the product NV-6a did not have the crystallographic regularity.

Referring to FIG. 44, the product NV-7p has a laminar structure composed of a plurality of sheets each having a diameter of about 7–11 μm. The photograph indicates that the sheet sizes of the product NV-7p are equal to each other and that the skeleton of the silicon dioxide sheets contained in the vermiculite which was used as the material of the product NV-7p remained therein. In the photograph of the product NV-6a, moire based on the regular laminar structure is not seen, unlike the product NK-2p. That is, it was confirmed that the product NV-7p did not have the crystallographic regularity.

Embodiment 25

In the embodiment 25, the specific surface areas were measured on the products obtained in the embodiments 14 through 20 by BET method in which nitrogen adsorption is utilized. The results are shown in Table 5.

According to the measurement, the specific surface areas of the laminar silicic acids NC-2a and NK-1p having the crystallographic regularity were 520–70 $m^2/g$. The specific surface areas of the other laminar silicic acids not having the crystallographic regularity were 440–70 $m^2/g$. This indicates that based on the specific surface area, it is impossible to determine whether the laminar silicic acid has the crystallographic regularity.

Table 5

While the invention has been described with reference to embodiments, it is to be understood that modifications or variations may be easily made by a person of ordinary skill in the art without departing from the scope of the invention which is defined by the appended claims.

TABLE 1

| Examples | Mesopore material | Specific surface area (m2/g) |
| --- | --- | --- |
| 1 | FS-1 | 1130 |
| 2 | FS-2 | 1280 |
| 3 | FC-3 | 920 |
| 4 | FC-4 | 890 |
| 5 | FH-5 | 970 |
| 6 | FH-6 | 960 |
| 7 | FV-7 | 880 |

TABLE 2

| | | Present invention · FS-2 | Prior art |
| --- | --- | --- | --- |
| S1 | Sulfolane | ⊚ | ⊚ |
| S2 | Nitrobenzene | ⊚ | ○ |
| S3 | NMP*1 | ○ | Δ |
| S4 | DMSO*2 | ○ | Δ |
| S5 | Anisole | Δ | Δ |
| S6 | Tetrachloroethane | ○ | Δ |
| S7 | Pyridine | ⊚ | ⊚ |
| S8 | Ethanol | Δ | × |
| S9 | THF*3 | Δ | × |

Organic solvent
*1:N-methyl-2-pyrrolidine
*2:dimethylsulfoxide
*3:Tetrahydrofuran
Solubility
⊚:Expanded at a room temperature · transparent — First highest solubility
○:Expanded at an increased temperature· transparent — Second highest solubility
Δ:Expanded at an increased temperature· Semitransparent — Third highest solubility
×:Opaque — Low solubility

TABLE 3

| Clay mineral | | Chrysotile | Kaolinite | Hectorite | Vermiculite |
| --- | --- | --- | --- | --- | --- |
| Si | | 100 | 100 | 100 | 100 |
| Metallic | Al | 1.6 | 105 | 4.7 | 50 |
| element | Fe | 6.3 | 0.6 | 0.8 | 50 |
| | Mg | 162 | 0.1 | 72 | 50 |
| | Ti | 0 | 0.1 | 0.1 | 6.4 |

(atom % to silicon atom)

TABLE 4

|  | NK-1p | NC-2a | NC-3p | NK-4a | NH-5a | NV-6a | NV-7p |
|---|---|---|---|---|---|---|---|
| Si | 100 | 100 | 100 | 100 | 100 | 100 | 100 |
| Metallic element | | | | | | | |
| Al | 4.44 | 0.05 | <0.03 | 1.32 | 0.23 | 0.35 | 0.10 |
| Fe | 0.01 | 0.12 | 0.01 | 0.04 | 0.05 | 0.13 | 0.03 |
| Mg | <0.03 | 1.11 | 0.17 | <0.03 | 0.03 | 0.03 | <0.03 |
| Ti | 0.52 | 0 | 0 | 0 | 0.04 | 0.26 | 0 |
| Clay mineral | Kaolinite | Chrysotile | Chrysotile | Kaolinite | Hectorite | Vermiculite | Vermiculite |

(atom % to silicon atom)

TABLE 5

|  | NK-1p | NC-2a | NC-3p | NK-4a | NH-5a | NV-6a | NV-7p |
|---|---|---|---|---|---|---|---|
| Specific surface area (m2/g) | 70 | 520 | 170 | 70 | 110 | 440 | 130 |
| Crystallinity | ○ | ○ | X | X | X | X | X |

What is claimed is:

1. A mesopore material comprising: a three-dimensional honeycomb-shaped structure formed from a laminar silicate, containing pores having a diameter in a range of 2 to 10 nm; and a primary particle having a major axis in a range of 10 nm and 1 μm, said diameter of the pores being defined at a maximum peak in a pore distribution curve, 75% or more of the pores being in a diameter range of −40% to +40% of the pore diameter at the maximum peak.

2. A mesopore material comprising: a three-dimensional honeycomb-shaped structure formed from a laminar silicate, containing pores having a diameter in a range of 2 to 10 nm; and a primary particle having a major axis in a range of 50 nm to 2 μm, said diameter range being defined at a maximum peak in a pore distribution curve, 60% or more of the pores being in a diameter range of −40% to +40% of the pore diameter at the maximum peak.

3. A method of manufacturing a mesopore material comprising the steps of:
    making an acid act on a clay mineral to form a laminar silicic acid;
    making an alkali metal compound act on the laminar silicic acid to form a laminar silicate;
    making a surface active agent act on the laminar silicate to form a condensate having three-dimensional structure composed of a silicate and containing the surface active agent therein; and removing the surface active agent from the condensate.

4. A method according to claim 3 wherein said laminar silicic acid is a laminar silicic acid with a crystallographic regularity comprising a laminar silicon dioxide, said laminar silicon dioxide having a skeleton of a clay mineral having a 1:1 laminar structure or a 2:1 laminar structure consisting of an uninvertible tetrahedral sheet of a silicon dioxide and an octahedral sheet of an oxide of a metal and having a laminar six-membered ring skeleton.

5. The method according to claim 4, wherein the silicic acid is of a rectangular or a polygonal sheet having a diameter in a range of 10 nm to 50 mm, and 50% or more of the laminar silicic acid has a diameter of a sheet in a range of −40% to +40% of a sheet diameter at a maximum distribution.

6. A method according to claim 4 wherein said laminar silicic acid with a crystallographic regularity comprising a laminar silicon dioxide, said laminar silicon dioxide having a clay mineral structure of a 1:1 laminate or a 2:1 laminate of an uninvertible tetrahedral sheet of a silicon dioxide and an octahedral sheet of an oxide of a metal and having a laminar six-membered ring structure, is manufactured by a process comprising the step of making an acid act on the clay mineral.

7. The method according to claim 6, further comprising the step of selecting a shape and/or a size of the clay mineral to change a shape and a size of the laminar silicic acid.

8. A method according to claim 3, wherein said laminar silicic acid is a laminar silicic acid without a crystallographic regularity comprising a laminar silicon dioxide, said laminar silicon dioxide having a skeleton of a clay mineral having a 1:1 laminar structure or a 2:1 laminar structure consisting of an uninvertible tetrahedral sheet of a silicon dioxide and an octahedral street of an oxide of a metal end having a laminar six-membered ring skeleton.

9. The method according to claim 8, wherein the silicic acid is of a rectangular or a polygonal sheet having a diameter in a range of 10 nm to 50 mm, and 50% or more of the laminar silicic acid has a diameter of a sheet in a range of −40% to +40% of a sheet diameter at a maximum distribution.

10. A method according to claim 8 wherein said laminar silicic acid without a crystallographic regularity comprising a laminar silicon dioxide, said laminar silicon dioxide having a skeleton of a clay mineral having a 1:1 laminar structure or a 2:1 laminar structure consisting of an uninvertible tetrahedral sheet of a silicon dioxide and an octahedral sheet of an oxide of a metal and having a laminar six-membered ring skeleton, is manufactured by a process comprising the step of making an acid act on a clay mineral.

11. The method according to claim 10, further comprising the step of selecting a shape and/or a size of the clay mineral to change a shape and a size of the laminar silicic acid.

12. A method according to claim 3 wherein said laminar silicate comprises a laminar silicon dioxide, said laminar silicon dioxide having a skeleton of a clay mineral having a 1:1 laminar structure or a 2:1 laminar structure consisting of an uninvertible tetrahedral sheet of a silicon dioxide and an octahedral sheet of an oxide of a metal and having a laminar six-membered ring skeleton.

13. The method according to claim 12, wherein the silicic acid is of a rectangular or a polygonal sheet having a diameter in a range of 10 nm to 50 mm, and 50% or more of the laminar silicic acid has a diameter of a sheet in a range of −40% to +40% of a sheet diameter at a maximum distribution.

14. A method according to claim 3, wherein said laminar silicate is amorphous and comprises a laminar silicon dioxide, said laminar silicon dioxide having a skeleton of a clay mineral having a 1:1 laminar structure or a 2:1 laminar structure consisting of an uninvertible tetrahedral sheet of a silicon dioxide and an octahedral sheet of an oxide of a metal and having a laminar six-membered ring skeleton.

15. The laminar silicate according to claim 14, wherein the silicic acid is of a rectangular or a polygonal sheet having a diameter in a range of 10 nm to 50 mm, and 50% or more of the laminar silicic acid has a diameter of a sheet in a range of −40% to +40% of a sheet diameter at a maximum distribution.

16. The method according to claim 6, wherein an amount of the acid is two moles or more with respect to 100 g of the clay mineral.

17. The method according to claim 10, wherein an amount of the acid is two moles or more with respect to 100 g of the clay mineral.

\* \* \* \* \*